us007211818B2

(12) United States Patent
Imai et al.

(10) Patent No.: US 7,211,818 B2
(45) Date of Patent: May 1, 2007

(54) IMAGE READ-OUT METHOD AND SYSTEM, SOLID IMAGE SENSOR, AND IMAGE DETECTING SHEET

(75) Inventors: Shinji Imai, Kaisei-machi (JP); Hiroaki Yasuda, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/267,674

(22) Filed: Oct. 10, 2002

(65) Prior Publication Data

US 2003/0057388 A1 Mar. 27, 2003

Related U.S. Application Data

(62) Division of application No. 09/534,204, filed on Mar. 24, 2000.

(30) Foreign Application Priority Data

Mar. 24, 1999 (JP) ............................... 1999/79984

(51) Int. Cl.
*G03B 42/08* (2006.01)
(52) U.S. Cl. ...................................... 250/586; 250/584
(58) Field of Classification Search ................ 250/584, 250/586
See application file for complete search history.

(56) References Cited

U.S. PATENT DOCUMENTS 4,239,968 A * 12/1980 Kotera et al. ................ 250/581
4,268,750 A * 5/1981 Cowart ..................... 250/315.3
4,272,477 A 6/1981 Hagedorn (Continued)

FOREIGN PATENT DOCUMENTS

JP 55-12492 1/1980

(Continued)

OTHER PUBLICATIONS

Patent Abstract JP 56011395 A Feb. 4, 1981.

(Continued)

*Primary Examiner*—David Porta
*Assistant Examiner*—Shun Lee
(74) *Attorney, Agent, or Firm*—Sughrue Mion, PLLC

(57) ABSTRACT

An image signal is read out by use of a stimulable phosphor sheet having a layer of stimulable phosphor which emits stimulated emission in proportion to the stored energy of radiation upon exposure to stimulating light and a solid image sensor having a photoconductive material layer which exhibits electric conductivity upon exposure to the stimulated emission from the stimulable phosphor sheet. Stimulating light is caused to scan a stimulable phosphor sheet which has been exposed to radiation and has stored an image, the photoconductive material layer is caused to be exposed to stimulated emission emitted from the stimulable phosphor sheet upon exposure to the stimulating light. Then electric charges generated in the photoconductive material layer upon exposure to the stimulated emission is detected by applying an electric field to the photoconductive material layer. The stimulable phosphor sheet has a layer of stimulable phosphor which is stimulated by stimulating light in a wavelength range of not shorter than 600 nm and emits stimulated emission in a wavelength range of not longer than 500 nm. The solid image sensor has a photoconductive material layer whose major component is a-Se, and the electric field is such as to generate an avalanche amplification effect in the photoconductive material layer.

22 Claims, 26 Drawing Sheets

U.S. PATENT DOCUMENTS

| | | | |
|---|---|---|---|
| 4,284,889 A | | 8/1981 | Kato et al. |
| 4,346,406 A | | 8/1982 | Kato et al. |
| 4,748,326 A | * | 5/1988 | Mori et al. .................. 250/585 |
| 4,816,679 A | | 3/1989 | Sunagawa et al. |
| 4,922,103 A | | 5/1990 | Kawajiri et al. |
| 5,059,794 A | * | 10/1991 | Takahashi et al. .......... 250/591 |
| 5,196,702 A | | 3/1993 | Tsuji et al. |
| 5,922,537 A | * | 7/1999 | Ewart et al. ................... 435/6 |
| 6,192,105 B1 | | 2/2001 | Hunter et al. |
| 2001/0020690 A1 | * | 9/2001 | Yasuda et al. .............. 250/586 |

FOREIGN PATENT DOCUMENTS

| | | |
|---|---|---|
| JP | 55-48672 | 4/1980 |
| JP | 55-50180 | 4/1980 |
| JP | 56-11348 | 2/1981 |
| JP | 56-11395 | 2/1981 |
| JP | 58-121874 | 7/1983 |
| JP | 60-111568 | 6/1985 |
| JP | 60-236354 | 11/1985 |
| JP | 63-259500 | 10/1988 |
| JP | 7-76800 | 3/1995 |

OTHER PUBLICATIONS

Patent Abstract JP 63259500 A Apr. 16, 1987.
Patent Abstract DE 3151570 Jul. 7, 1983.

* cited by examiner

F I G . 2
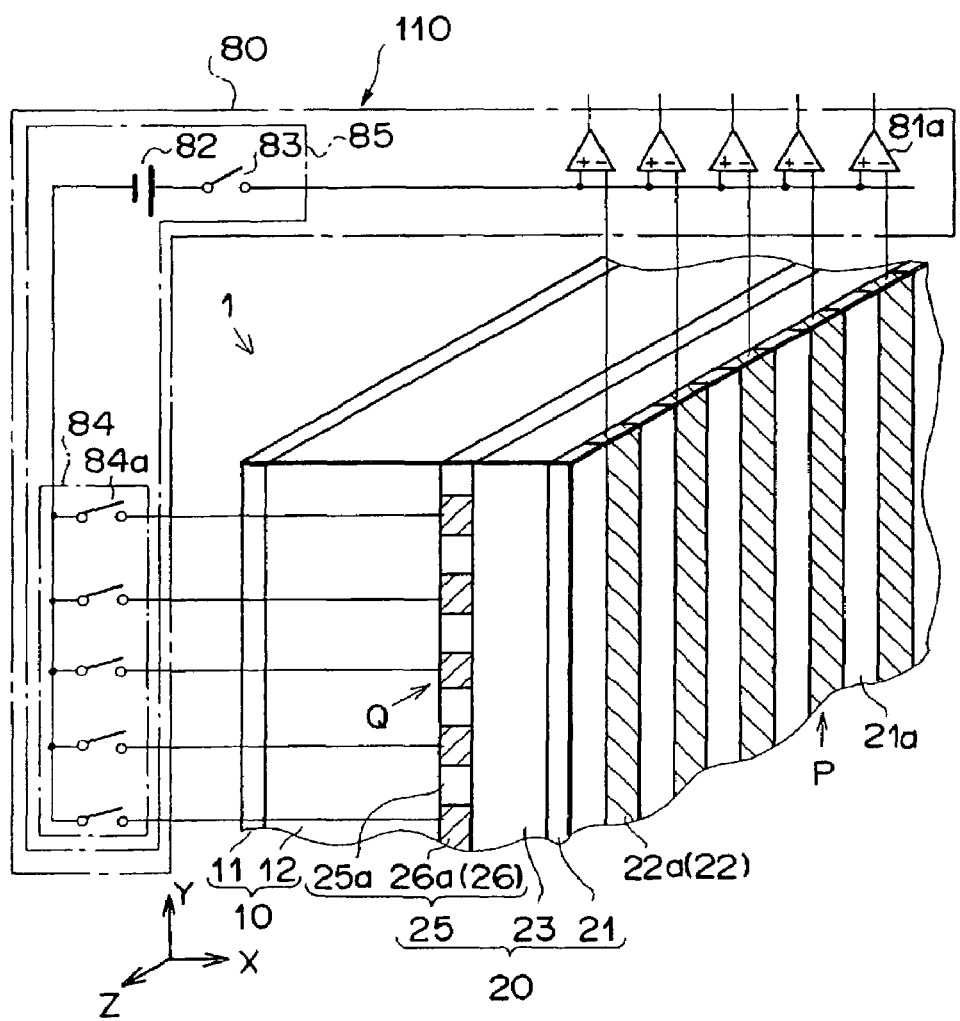

F I G. 5
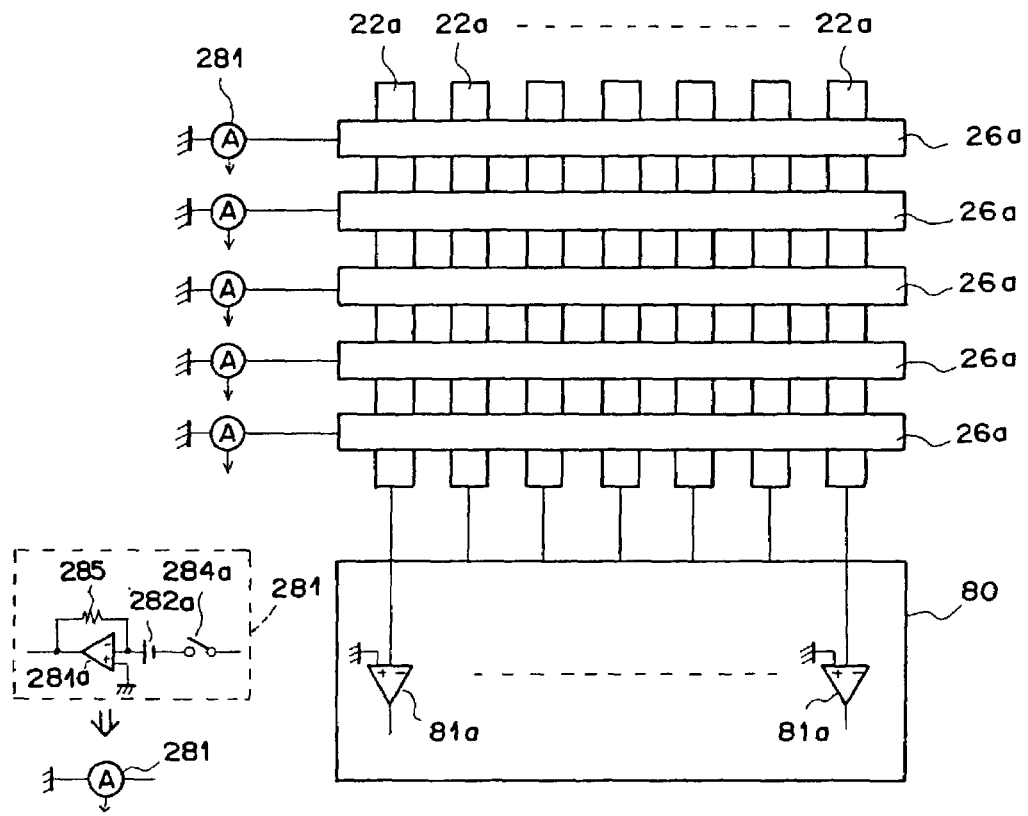

F I G. 8A
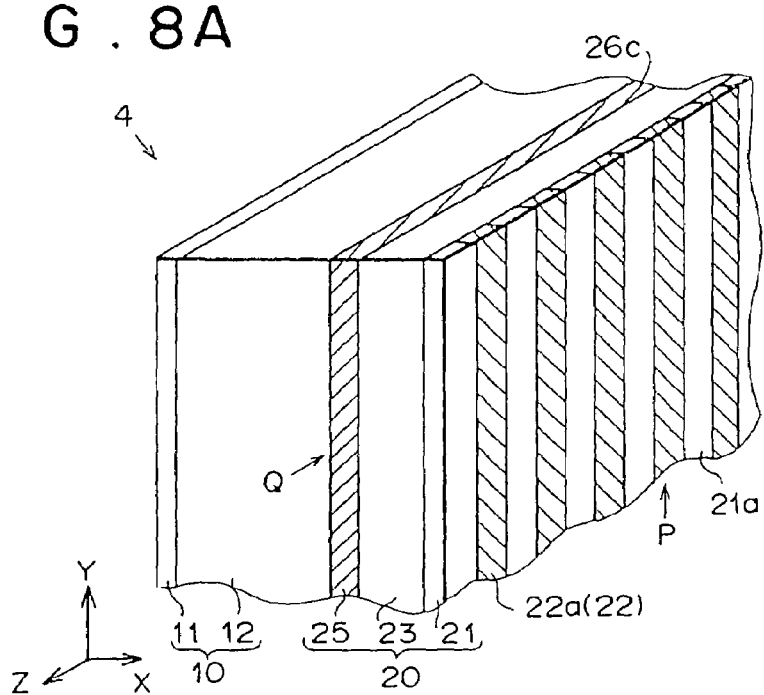
F I G. 8B
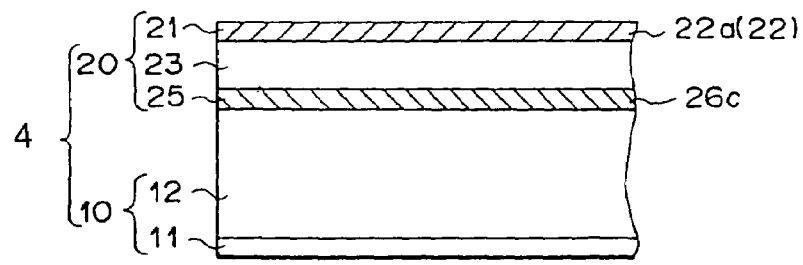
F I G. 8C
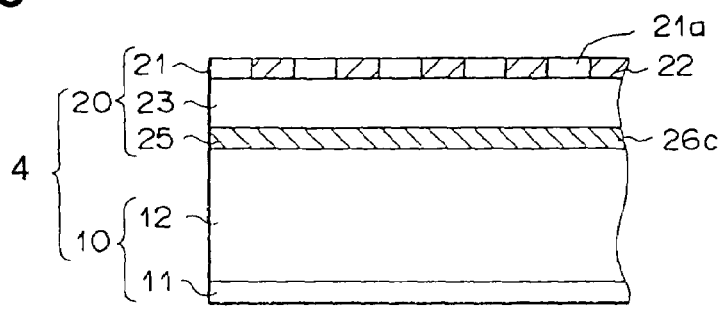

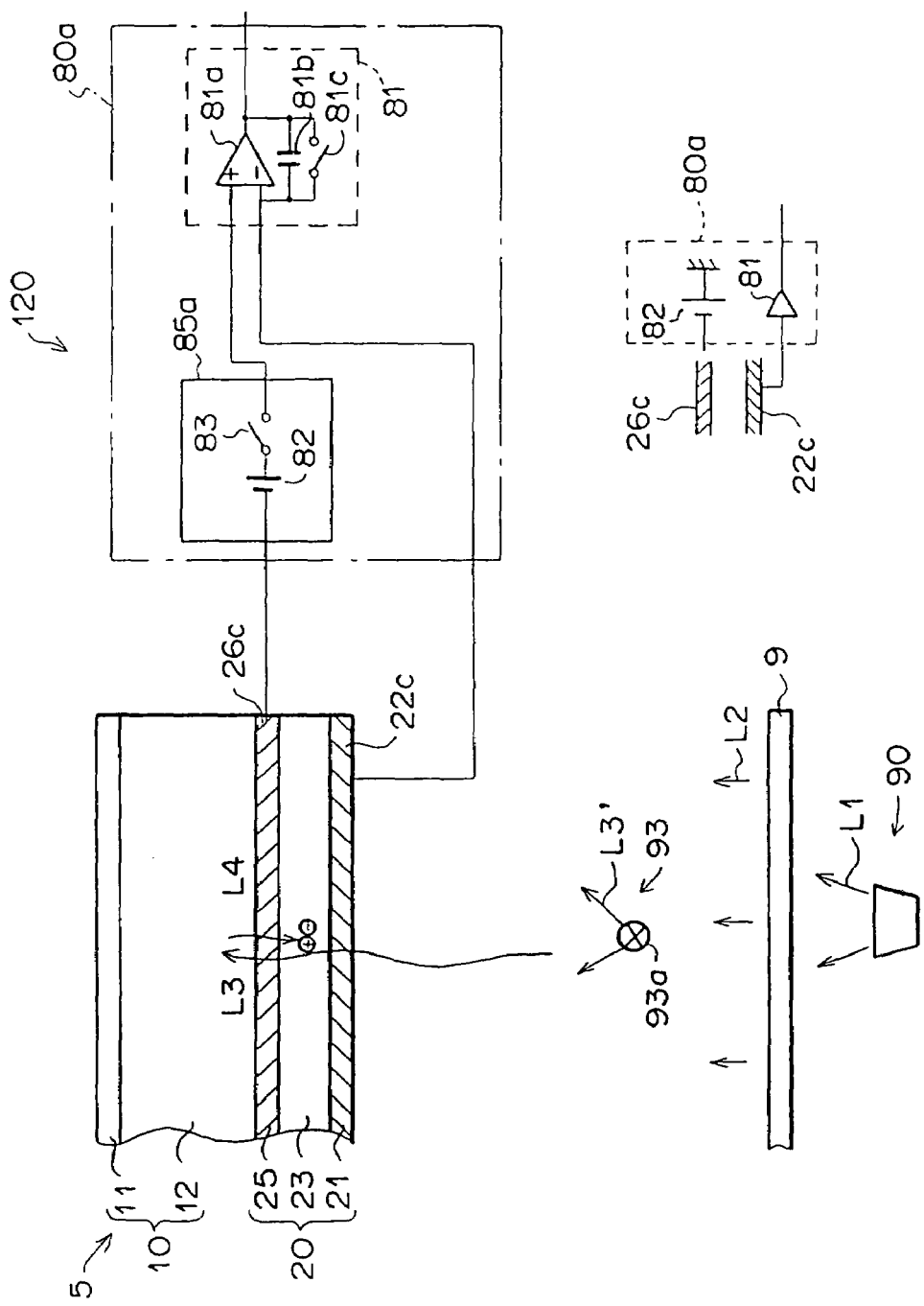
F I G. 10

F I G. 13A
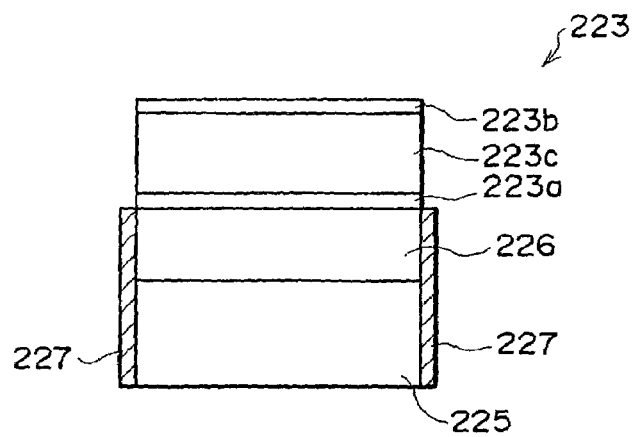
F I G. 13B
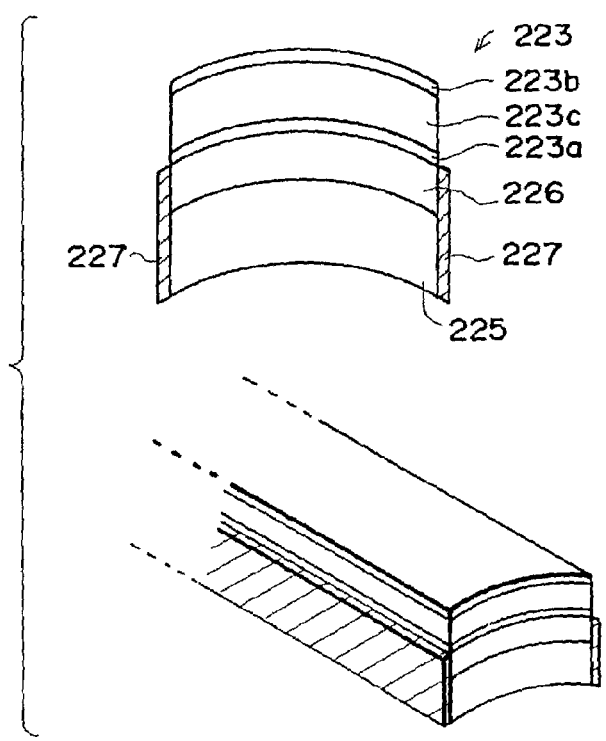

F I G. 14A
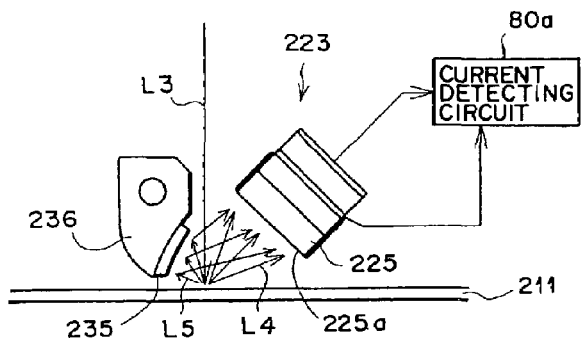
F I G. 14B
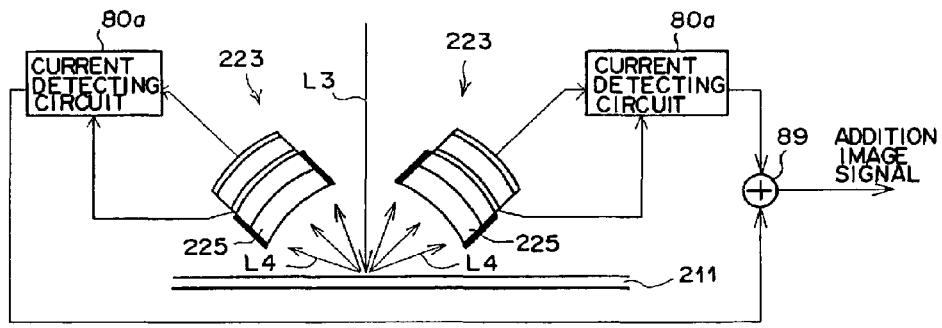
F I G. 14C
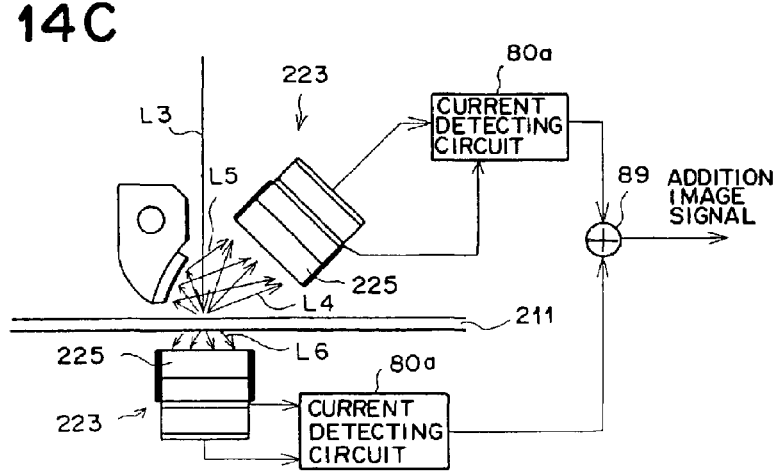

F I G . 15
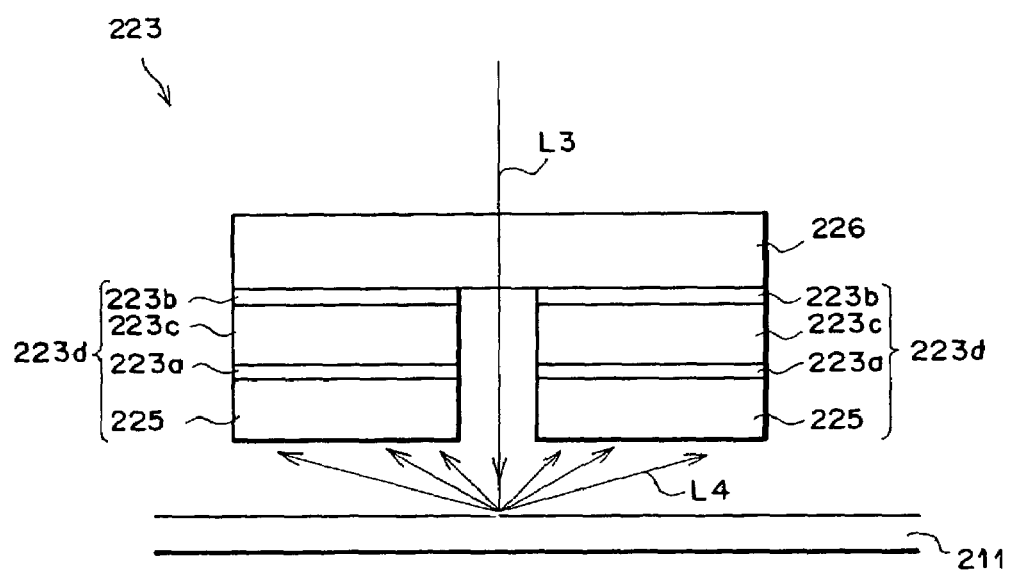

F I G. 19A
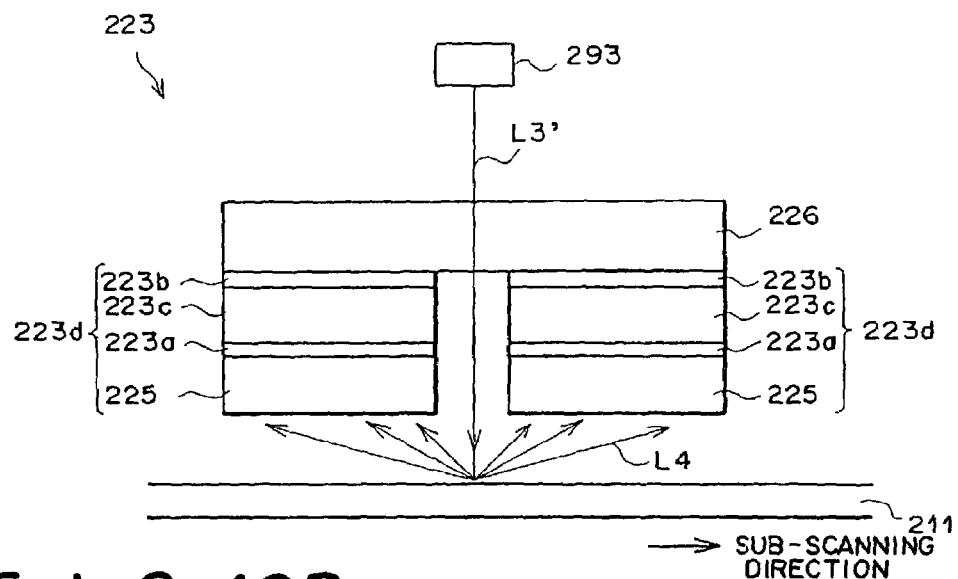
F I G. 19B
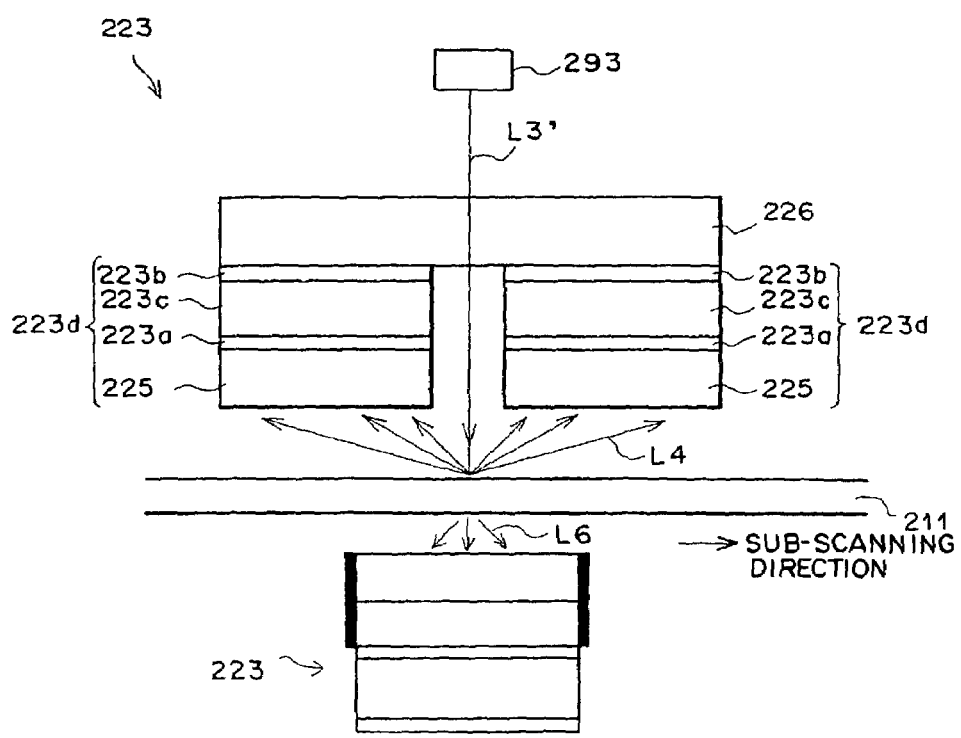

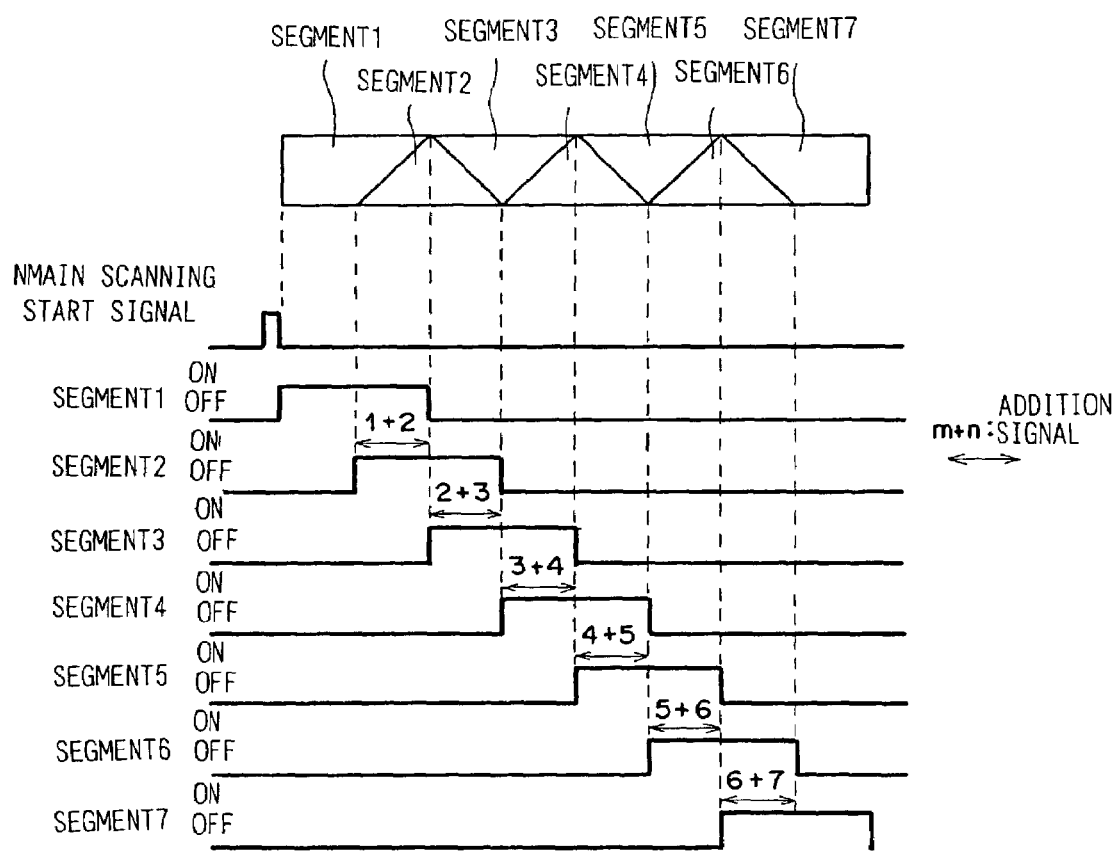
F I G . 25

F I G. 26A
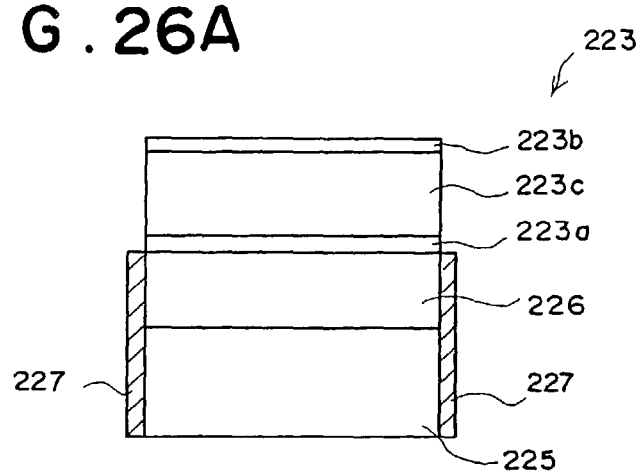
F I G. 26B
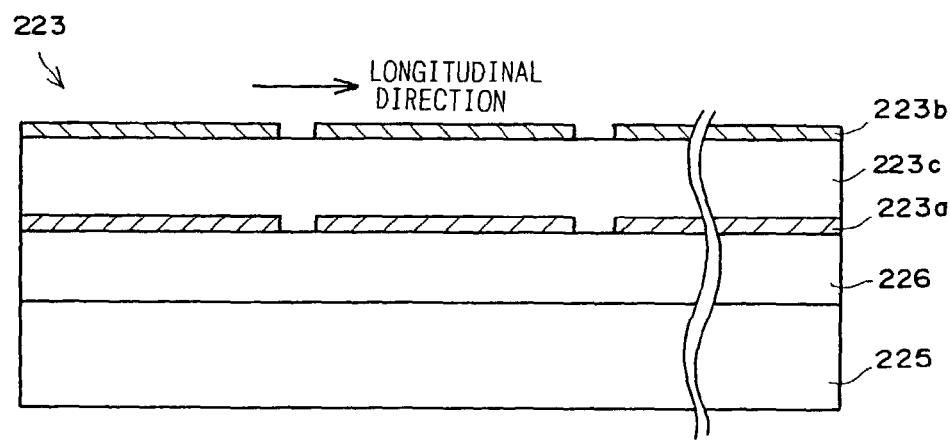
F I G. 26C
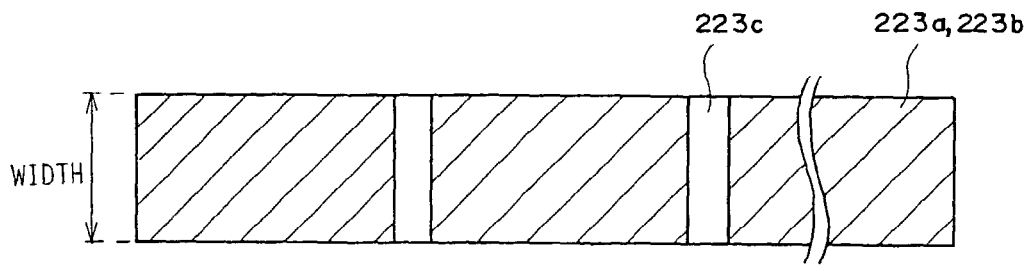

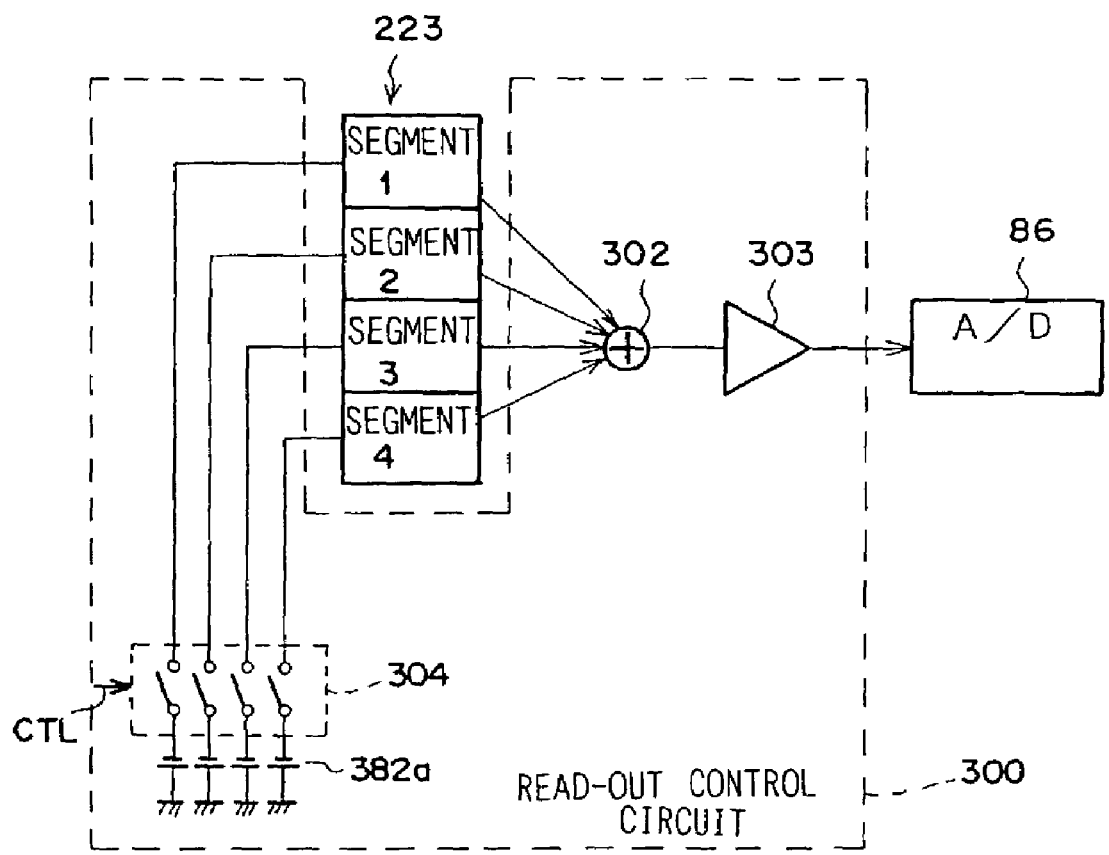
F I G . 27

IMAGE READ-OUT METHOD AND SYSTEM, SOLID IMAGE SENSOR, AND IMAGE DETECTING SHEET

This is a divisional of application Ser. No. 09/534,204 filed Mar. 24, 2000 the disclosure of which is incorporated herein by reference.

BACKGROUND OF THE INVENTION

1. Field of the Invention

This invention relates to a method of and a system for reading out an image, a solid image sensor, and an image detecting sheet.

2. Description of the Related Art

When certain kinds of phosphors are exposed to a radiation such as X-rays, α-rays, β-rays, γ-rays, cathode rays or ultraviolet rays, they store a part of the radiation. Then when the phosphor which has been exposed to the radiation is exposed to stimulating rays such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image read-out method or a radiation image read-out system in which a sheet provided with a layer of the stimulable phosphor (will be referred to as "a stimulable phosphor sheet", hereinbelow) is first exposed to a radiation passing through an object such as the human body to have a radiation image of the object stored on the stimulable phosphor sheet, a stimulating light beam such as a laser beam is caused to scan the stimulable phosphor sheet so that the stimulable phosphor sheet emits stimulated emission as signal light bearing thereon information on the radiation image, and the stimulated emission is photoelectrically detected, thereby obtaining an image signal bearing thereon a radiation image of the object. Further there have been known various image read-out systems which are different in the manner of scanning the stimulable phosphor sheet with the stimulating light beam, the form of the means for photoelectrically detecting the stimulated emission, or the like.

For example, there has been known an image read-out method and an image read-out system which include a stimulating light source which emits spot light like a laser beam as the stimulating light, a photomultiplier as a zero-dimensional photoelectric convertor which converts stimulated emission emitted from the stimulable phosphor sheet upon exposure to the spot light to an electric signal and a stimulating light scanning optical system which causes the spot light to scan the stimulable phosphor sheet in a main scanning direction while moving the spot light and the photomultiplier in a sub-scanning direction relatively to the stimulable phosphor sheet, and in which stimulated emission emitted from parts of the stimulable phosphor sheet upon exposure to the spot light is read in sequence by the photomultiplier. See, for instance, Japanese Unexamined Patent Publication Nos. 55(1980)-12492 and 56(1981)-11395.

The photomultiplier comprises a photocathode face and an electron multiplier portion, and is excellent in that since a weak signal generated by weak stimulated emission is amplified by an external photo electric effect and accordingly, the electric signal obtained by the photomultiplier is less affected by electric noise. It is preferred that the photocathode face of the photomultiplier is high in sensitivity to the stimulated emission in a wavelength range of about 300 to 500 nm (in a blue region) and low in sensitivity to the stimulating light in a wavelength range of about 600 to 700 nm (in a red region).

Further the photomultiplier may be have a circular or polygonal photocathode face or an elongated photocathode face extending in a length substantially equal to the width of the stimulable phosphor sheet, and is used as a zero-dimensional sensor in either case. In the former case, the photomultiplier is employed together with a light guide which is provided with an elongated light inlet end face extending in a length substantially equal to the width of the stimulable phosphor sheet and a light exit end face connected to the circular or polygonal photocathode face of the photomultiplier.

However, when such a photomultiplier is used, the following problems arise.

(1) The photomultiplier comprises a vacuum glass tube, and accordingly is fragile.

(2) The photomultiplier comprises a complicated multi-stage diode for electron multiplication, and accordingly is difficult to reduce the thickness. Further, a long photomultiplier such as one 17 inches in length is expensive.

(3) The photocathode employing an external photo electric effect is low in quantum efficiency to the stimulated emission in a wavelength range of about 300 to 500 nm (in a blue region) and normally about 10 to 20%, whereas the quantum efficiency of the photocathode to the stimulating light in a wavelength range of about 600 to 700 nm (in a red region) is relatively high and normally about 0.1 to 2%. Accordingly, a special stimulating light cut filter is required to a sufficient S/N ratio, which adds to the cost.

(4) The photomultiplier comprises a complicated multi-stage dynode, and accordingly it is difficult to make a line sensor which is large in width, e.g., 17 inches, and is as small as about 100 μm in picture element size.

From the viewpoint of shortening the stimulated emission reading time, reduction of the size of the system and reduction of the manufacturing cost of the system, there have been proposed, for instance, in Japanese Unexamined Patent Publication No. 60(1985)-111568, an image read-out method and system in which a line stimulating light source such as a fluorescent lamp, a cold cathode fluorescent lamp, or a LED array which projects a line beam onto the stimulable phosphor sheet, a line sensor having a solid photoelectric convertor element array extending in the direction of length of the portion of the stimulable phosphor sheet exposed to the line beam and a scanning means which moves the line source and the line sensor relatively to the stimulable phosphor sheet in a sub-scanning direction substantially perpendicular to the portion of the stimulable phosphor sheet exposed to the line beam are employed, and stimulated emission emitted from parts of the stimulable phosphor sheet exposed to the line beam is read in sequence while moving the line source and the line sensor relatively to the stimulable phosphor sheet in the sub-scanning direction.

In the above identified Japanese patent publication, there is disclosed, as the solid photoelectric convertor element for forming the line sensor, a photoconductor including those whose band gaps E are either larger or smaller than energy of photons $hc/\lambda$ at the wavelength $\lambda$ of the stimulating light ($E > hc/\lambda$, or $E < hc/\lambda$). Those whose band gaps E are larger than energy of photons $hc/\lambda$ at the wavelength $\lambda$ of the stimulating light include, for instance, ZnS, ZnSe, CdS, $TiO_2$ and ZnO, and those whose band gaps E are smaller than energy of photons $hc/\lambda$ at the wavelength k of the stimulating light include, for instance, a-SiH, CdS(Cu), ZnS(Al), CdSe and PbO, a-representing "amorphous". Further, it has been proposed to use a line sensor formed of Si photodiodes.

However, use of a line sensor formed of the materials described above gives rise to the following problems. That is, though it is advantageous that the solid photoelectric convertor element itself has electron multiplying function since the stimulated emission is very weak, any one of the line sensors formed of the materials described above except the Si photodiode exhibits no avalanche amplification effect as the electron multiplying function. On the other hand, the line sensor of the Si photodiode is very low (substantially zero) in quantum efficiency (sensitivity) to light in an ultraviolet to blue region and is high in quantum efficiency (sensitivity) to light in a red region, which results in a poor blue/red sensitivity ratio. Further since being large in dark current, the line sensor of the Si photodiode is not sufficient to detect weak stimulated emission in a blue region, and accordingly, an obtained image is very low in S/N ratio and in quality. Further, when a long line sensor such as of 17 inches is made of Si photodiode, the line sensor becomes very expensive. Further since the stimulated emission is very weak, it is necessary for the photoconductive material layer to be very high in dark resistance. However, the photoconductive material described above are all low in dark resistance and accordingly read-out must be effected with a relatively high electric field applied to the photoconductive material layer, which increases the dark current and makes it difficult to obtain a high S/N ratio.

Further there has been proposed, for instance, in Japanese Unexamined Patent Publication No. 60(1985)-236354, an image read-out method and system in which a stimulating light source which emits a spot light such as a laser beam, and a scanning optical system which moves the spot light and a line sensor relatively to the stimulable phosphor sheet in a sub-scanning direction are employed, and stimulated emission emitted from parts of the stimulable phosphor sheet exposed to the light spot is read in sequence while moving the stimulating light source and the line sensor relatively to the stimulable phosphor sheet in the sub-scanning direction. However the solid photoelectric convertor element forming the line sensor in this method and system is the same as that used in Japanese Unexamined Patent Publication No. 60(1985)-111568 and accordingly gives rise to the same problems.

In "RADIOGRAPHIC PROCESS UTILIZING A PHOTOCONDUCTIVE SOLID-STATE IMAGE" (772/Research disclosure, October 1992/34264), Japanese Patent Publication No. 7(1995)-76800 and Japanese Unexamined Patent Publication No. 58(1983)-121874, there is disclosed an image read-out system in which a stimulable phosphor sheet and a radiation image conversion panel which is substantially the same in area as the stimulable phosphor sheet, comprises a photoconductor material layer having sensitivity to the stimulated emission and sandwiched between a pair of electrode layers, and functions as a zero-dimensional photoelectric convertor are used and an image is read out while scanning the radiation image conversion panel with a spot light.

It is said that the photoconductor material layer is preferably of a photoconductive material which is high in sensitivity to the stimulated emission in a wavelength range of about 300 to 500 nm and low in sensitivity to the stimulating light in a wavelength range of about 600 to 800 nm. It is said that a preferable photoconductive material includes selenium compounds and amorphous (a-Se) is especially preferred.

However, use of selenium compound as the photoconductive material gives rise to the following problem. That is, though it is advantageous that the solid photoelectric convertor element itself has electron multiplying function since the stimulated emission is very weak, the S/N ratio cannot be high so long as the selenium compound has not electron multiplying function (the above identified references make no mention of whether the selenium compound has electron multiplying function). The selenium compound such as a-Se is not generally used for electron multiplication unlike the photomultiplier.

In "RADIOGRAPHIC PROCESS UTILIZING A PHOTOCONDUCTIVE SOLID-STATE IMAGE" (772/Research disclosure, October 1992/34264) (will be referred to as "reference 1", hereinbelow), there is disclosed an image read-out system in which a stimulable phosphor sheet and a radiation image conversion panel which is substantially the same in area as the stimulable phosphor sheet, comprises a photoconductor material layer having sensitivity to the stimulated emission and sandwiched between a pair of electrode layers, and functions as a zero-dimensional photoelectric convertor are used and an image is read out while scanning the radiation image conversion panel with a spot light.

It is said that the photoconductor material layer is preferably of a photoconductive material which is high in sensitivity to the stimulated emission at 500 nm and low in sensitivity to the stimulating light at 633 nm. It is said that amorphous (a-Se) is especially preferable as the photoconductive material layer.

Since a-Se is highly sensitive to light not longer than 500 nm (e.g., a blue region from 300 to 500 nm) and is higher than a photomultiplier (as a zero-dimensional photoelectric convertor) in quantum efficiency to stimulated emission near 400 nm, a-Se is suitable for detecting stimulated emission emitted from the stimulable phosphor layer. Further since a-Se is hardly sensitive to light not shorter than 600 nm (e.g., a red region from 600 to 800 nm), and is large in the sensitivity to stimulated emission/sensitivity to stimulating light ratio, the a-Se photoconductive material layer can detect the stimulated emission emitted from the stimulable phosphor layer without use of stimulating light cut filter. Further, an a-Se layer can be formed by low-temperature deposition process, and is suitable for forming a solid image sensor which is thin, large in area and strong to impact.

However, when a radiation image conversion panel which is substantially the same in area as the stimulable phosphor sheet is formed of a-Se, the area of the photoconductive material layer becomes very large, which results in generation of an excessive dark current and a large capacitance (output capacity of detector), and the S/N ratio deteriorates.

Further, since it takes a long time for stimulated emission to be emitted from the stimulable phosphor layer upon exposure to the stimulating light, when the stimulable phosphor sheet is two-dimensionally scanned with stimulating light in the form of a spot beam, it takes a long time to read out image from the stimulable phosphor sheet.

Further, also in Japanese Patent Publication No. 7(1995)-76800 (will be referred to as "reference 2", hereinbelow), it is disclosed that stimulated emission emitted from a stimulable phosphor layer is detected by a photoconductive material layer which is substantially the same in area as the stimulable phosphor sheet. It is said that the photoconductor material layer is preferably of a photoconductive material which is high in sensitivity to the stimulated emission in a wavelength range of about 300 to 500 nm and low in sensitivity to the stimulating light in a wavelength range of about 600 to 800 nm. It is said that selenium compounds are especially preferable as the material of the photoconductive material layer. It is further said that influence of a dark current can be suppressed by dividing a part of the electrodes into a plurality of electrode elements and detecting electric currents separately from the electrode elements.

However even if the electrode is so divided, the area of each electrode element is still large, and accordingly generation of an excessive dark current cannot be avoided and the capacitance is still large, which results in deterioration of the S/N ratio. Further, even if an image signal is read out by scanning the electrode elements with a spot beam, the read-out speed cannot be substantially increased.

Further also in Japanese Unexamined Patent Publication No. 58(1983)-121874 (will be referred to as "reference 3", hereinbelow), it is disclosed that stimulated emission emitted from a stimulable phosphor layer is detected by a photoconductive material layer which is substantially the same in area as the stimulable phosphor sheet and the photoconductive material layer is formed selenium compounds. It is further disclosed that influence of a dark current can be suppressed by dividing a part of the electrodes into a plurality of electrode elements and detecting electric currents separately from the electrode elements. Further, the reference 3 further says that when the capacitance of the photoconductive material layer is large and additional noise is generated, the additional noise can be suppressed by dividing the electrode into a plurality of parallel stripe electrode elements.

However, even if the electrode is so divided, the electrode elements are not in one-to-one correspondence with the picture elements and signal read-out is not effected line by line. Accordingly, the read-out speed cannot be substantially increased. Further even if the electrode is so divided, so long as the pre-amplifiers such as current detecting amplifiers as a means for reading out the charges generated in the photoconductive material layer and obtaining an image signal are in the form of charge amplifiers, the output capacity itself forms a noise source. Further when the pre-amplifiers are of a current-voltage conversion system (including a logarithmic amplifier), it is difficult to ensure stability. In other words, it is difficult to obtain a high speed circuit. Further, not only the dark current but also residual electric charges can produce false signals or flare.

Further, there has been known a system in which "preliminary read-out" is effected prior to "final read-out" in order to ascertain the characteristics of the radiation image stored on the stimulable phosphor sheet such as the dynamic range of the radiation image. The preliminary read-out is carried out by use of stimulating light having stimulation energy of a level lower than the stimulation level of stimulating light used in the final read-out. On the basis of the preliminary read-out image signal obtained by the preliminary read-out, read-out conditions and/or image processing conditions for final read-out are determined.

Further we have proposed a method of determining the read-out conditions and/or image processing conditions for final read-out without carrying out such preliminary read-out. See Japanese Unexamined Patent Publication Nos. 55(1980)-48672, 55(1980)-50180, 56(1981)-11348, and the like. In this method, momentary light emitted from the stimulable phosphor sheet upon exposure to the recording radiation is detected by an exclusive detector such as a photo-timer, and information on the characteristic of the radiation image stored on the stimulable phosphor sheet, the amount of radiation stored on the stimulable phosphor sheet and the like is obtained on the basis of the detected momentary light, and the read-out conditions and the like are determined on the basis of the information.

The level of the stimulation energy means the total amount of stimulation energy to which the stimulable phosphor sheet is exposed (the amount of stimulation energy per unit time×time). In order to lower the level of the stimulation energy, exposed dose of the stimulating light is reduced, or the scanning speed is increased so that the number of picture elements becomes smaller as compared with the final read-out.

The read-out conditions are various conditions which affect the relation between the amount of stimulated emission and the output of the read-out system. The read-out conditions include, for instance, the read-out gain which governs the relation between input and output, the scale factor and the power of the stimulating light for read-out.

The image processing conditions are various conditions for carrying out processing which affects gradation, sensitivity and the like of an image reproduced on the basis of the image signal. In systems where the aforesaid preliminary read-out is not carried out, the image processing conditions include also the aforesaid read-out gain and the scale factor.

The method of determining optimal image processing conditions is applied to not only the system using the stimulable phosphor sheet but also the system in which an image signal is obtained from a recording medium such as X-ray film. The system for determining the read-out/conditions and/or the image processing conditions sometimes called an EDR processing system.

However, when the preliminary read-out is carried out by use of a low level stimulating light, the amount of information to be obtained by the final read-out is reduced by the amount of stimulated emission emitted from the stimulable phosphor sheet upon exposure to the preliminary read-out stimulating light, and accordingly, the image signal obtained somewhat deteriorates in the S/N ratio as compared with that obtained without carrying out preliminary read-out. Further, scanning the stimulating light beam for the preliminary read-out adds to the image read-out time.

On the other hand, when the image read-out conditions and/or the image processing conditions are determined by detecting momentary light emitted from the stimulable phosphor sheet upon exposure to the recording radiation by an exclusive detector such as a photo-timer, use of the exclusive detector adds to the cost. Further there is a problem that since the detector such as the photo-timer is generally narrow in detecting area and limited in measuring range, the conditions cannot be set at a high accuracy.

SUMMARY OF THE INVENTION

In view of the foregoing observations and description, the primary object of the present invention is to provide an image read-out method and system which can detect at a high efficiency stimulated emission in a blue region emitted from a stimulable phosphor sheet and can read out an image at a high S/N ratio.

Another object of the present invention is to provide an image read-out method and system In accordance with a first aspect of the present invention, there is provided an image read-out method of obtaining an image signal bearing thereon image information by use of a stimulable phosphor sheet having a layer of stimulable phosphor which emits stimulated emission in proportion to the stored energy of radiation upon exposure to stimulating light and a solid image sensor having a photoconductive material layer which exhibits electric conductivity upon exposure to the stimulated emission from the stimulable phosphor sheet and by scanning with stimulating light a stimulable phosphor sheet which has been exposed to radiation and has stored thereon an image, causing the photoconductive material layer to be exposed to stimulated emission emitted from the stimulable phosphor sheet upon exposure to the stimulating light, and detecting electric charges generated in the photoconductive material layer upon exposure to the stimulated emission by applying an electric field to the photoconductive material layer, wherein the improvement comprises that said stimulable phosphor sheet has a layer of stimulable phosphor which is stimulated by stimulating light in a wavelength range of not shorter than 600 nm (preferably in a red region from 600 to 800 nm) and emits stimulated emission in a wavelength range of not longer than 500 nm (preferably in a blue region from 300 to 500 nm), said solid image sensor has a photoconductive material layer whose major component is a-Se, and said electric field is such as to generate an avalanche amplification effect in the photoconductive material layer.

The stimulable phosphor sheet and the solid image sensor may be separate members or may be integrated to a unit. When a relatively thin stimulable phosphor sheet and a relatively thin solid image sensor are laminated into an image detecting sheet with the stimulable phosphor layer and the photoconductive material layer opposed to each other, a thin and light image detecting sheet can be obtained. Such an image detecting sheet can remarkably improve the stimulated emission collecting efficiency and provides a high quality image. Further when such a solid image sensor is employed, a photomultiplier need not be used, which makes it feasible to reduce the overall size of the system.

The solid image sensor may be in the form of a two-dimensional sensor (area sensor), a one-dimensional sensor (linear sensor) or a zero-dimensional sensor (smaller in area than the area sensor or the linear sensor).

The stimulating light which scans the stimulable phosphor sheet may be in any form, e.g., in the form of a spot beam, or a line beam.

The thickness of the photoconductive material layer of the solid image sensor is preferably not smaller than 1 μm so that the photoconductive material layer absorbs a sufficient amount of stimulated emission, an avalanche amplification effect can be obtained and the level of signal to be taken out can be high enough. Further, it is preferred that the thickness of the photoconductive material layer be as large as possible in order to reduce the distribution capacity and suppress fixed noise, but when the thickness is too large, the voltage of the power source for imparting the electric field becomes too high. Accordingly, in order to increase the ratio of the avalanche amplification effect to the fixed noise while taking into account the voltage of the power source, the thickness of the photoconductive material layer of the solid image sensor is preferably not smaller than 1 μm and not larger than 100 μm, and more preferably not smaller than 10 μm and not larger than 50 μm.

When a photoconductive material layer whose major component is a-Se is used under an electric field which generates an avalanche amplification effect in the photoconductive material layer, the photoconductive material layer becomes sensitive to fluctuation of electric field distribution (e.g., fluctuation in the voltage of the power source) and the image signal fluctuates. Accordingly, it is preferred that fluctuation of the image signal due to fluctuation in electric field distribution be suppressed. The fluctuation of the image signal can be suppressed, for instance, by suppressing fluctuation of the voltage of the power source, or by storing fluctuation in the output data with fluctuation in the voltage of the power source and correcting the image signal according to fluctuation of the voltage of the power source during read-out of the image signal.

In accordance with a second aspect of the present invention, there is provided an image read-out system comprising a stimulating light source which emits stimulating light in a wavelength range of not shorter than 600 nm (preferably in a red region from 600 to 800 nm), a stimulating light scanning means which causes the stimulating light emitted from the stimulating light source to scan a stimulable phosphor sheet having a layer of stimulable phosphor which emits stimulated emission in a wavelength range of not longer than 500 nm (preferably in a blue region from 300 to 500 nm) in proportion to the stored energy of radiation upon exposure to the stimulating light, a solid image sensor having a photoconductive material layer the major component of which is a-Se and which exhibits electric conductivity upon exposure to the stimulated emission from the stimulable phosphor sheet, an electric voltage imparting means which imparts an electric voltage to the photoconductive material layer of the solid image sensor to apply such an electric field as to generate an avalanche amplification effect in the photoconductive material layer, and an image signal obtaining means which detects electric charges generated in the photoconductive material layer of the solid image sensor when the stimulable phosphor sheet is exposed to the stimulating light and stimulated emission emitted from the stimulable phosphor sheet impinges upon the photoconductive material with an electric voltage imparted to the photoconductive material layer by the electric voltage application means to apply such an electric field as to generate an avalanche amplification effect in the photoconductive material layer, and detects an image signal representing an image stored on the stimulable phosphor sheet.

The thickness of the photoconductive material layer of the solid image sensor is preferably not smaller than 1 μm and not larger than 100 μm, and more preferably not smaller than 10 μm and not larger than 50 μm.

Further, it is preferred that the image read-out system of the second aspect be further provided with a fluctuation suppressing means which suppresses fluctuation of the image signal due to fluctuation in the electric field applied to the photoconductive material layer.

In the image read-out method of the first aspect of the present invention and the image read-out system of the second aspect of the present invention, a stimulable phosphor sheet having a layer of stimulable phosphor which is stimulated by stimulating light in a wavelength range of not shorter than 600 nm and emits stimulated emission in a wavelength range of not longer than 500 nm in proportion to the stored energy of radiation upon exposure to the stimulating light, and a solid image sensor having a photoconductive material layer the major component of which is a-Se and which exhibits electric conductivity upon exposure to the stimulated emission from the stimulable phosphor sheet are employed in combination with each other, and the image stored on the stimulable phosphor sheet is read out while applying, to the photoconductive material layer, such an electric field as to generate an avalanche amplification effect in the photoconductive material layer. a-Se is high in sensitivity to a wavelength in a blue region not longer than 500 nm and the quantum efficiency of a-Se to stimulated emission close to 400 nm is as high as 60 to 70%. Accordingly, in accordance with the method and system of the first and second aspects, stimulated emission in a blue region emitted from the stimulable phosphor sheet can be detected at a high efficiency. Further, by virtue of the avalanche amplification effect, the amount of charges to be taken out can be greatly increased, whereby the S/N ratio of the image signal can be improved and the quality of the image can be improved.

Further when fluctuation of the image signal due to fluctuation in electric field distribution is suppressed, a stable image signal is obtained and an image of higher quality can be obtained.

Further since a-Se hardly has sensitivity to light in a wavelength range not shorter than 600 nm and almost wholly transmits such light, a-Se is large in the ratio of the sensitivity to the stimulated emission (near 400 nm) to that to the stimulating light (600 to 700 nm). For example, in a state where no avalanche amplification effect is obtained, the ratio of the sensitivity to blue light (470 nm) to that to red light (680 nm) is about 3.5 when the thickness of the a-Se layer is 10 μm. As the thickness of the a-Se layer is smaller, the blue/red sensitivity ratio increases and when an avalanche amplification effect is available, the blue/red sensitivity ratio further increases. Accordingly, use of a stimulating light cut filter is basically unnecessary, and by projecting stimulating light not shorter than 600 nm in wavelength though a photoconductive material layer of a-Se, stimulated emission emitted from the surface of the stimulable phosphor layer can be effectively detected by the photoconductive material layer, whereby an image at high quality can be obtained. Further, since a-Se is very high in dark resistance as compared with a Si avalanche photodiode and the like, a high S/N ratio can be obtained.

Further when a Si avalanche photodiode is used as a solid image sensor, it is difficult to form a solid image sensor of a large area, e.g., a line sensor or an area sensor, since Si is in the form of a crystal. To the contrast, an a-Se layer can be formed by low-temperature deposition process, and is suitable for forming a solid image sensor which is thin, large in area and strong to impact. For example, a long linear sensor or an area sensor can be easily formed of a-Se.

Still another object of the present invention is to provide an image read-out method and an image read-out system in which a radiation image excellent in S/N ratio can be read out at a high speed by use of a solid image sensor or an image detecting sheet.

Still another object of the present invention is to provide a solid image sensor and an image detecting sheet which can used to detect weak stimulated emission emitted from a stimulable phosphor sheet, and which is small in output capacity so that a high S/N ratio can be obtained and can greatly increase the image read-out speed.

Still another object of the present invention is to provide a solid image sensor and an image detecting sheet which is strong against impact, can be thin, is higher than a photomultiplier in quantum efficiency to stimulated emission and/or sensitivity to blue/sensitivity to red ratio, large in dark resistance, can obtain a high S/N ratio, and can be made in a large area easily and at low cost.

In accordance with a third aspect of the present invention, there is provided an image read-out method of obtaining an image signal bearing thereon image information by use of a stimulable phosphor sheet having a layer of stimulable phosphor which emits stimulated emission in proportion to the stored energy of radiation upon exposure to stimulating light and a solid image sensor having a photoconductive material layer which exhibits electric conductivity upon exposure to the stimulated emission from the stimulable phosphor sheet and a pair of electrode layers which are disposed on opposite sides of the photoconductive material layer and are provided with electrodes for detecting electric charges generated in the photoconductive material layer, and by scanning with stimulating light a stimulable phosphor sheet which has been exposed to radiation and has stored thereon an image, causing the photoconductive material layer to be exposed to stimulated emission emitted from the stimulable phosphor sheet upon exposure to the stimulating light, and detecting electric charges generated in the photoconductive material layer upon exposure to the stimulated emission by applying an electric field to the photoconductive material layer, wherein the improvement comprises that said stimulable phosphor sheet has a layer of stimulable phosphor which is stimulated by stimulating light in a wavelength range of not shorter than 600 nm (preferably in a red region from 600 to 800 nm) and emits stimulated emission in a wavelength range of not longer than 500 nm (preferably in a blue region from 300 to 500 nm), said solid image sensor has a photoconductive material layer whose major component is a-Se, and the electrode of at least one of the electrode layers is divided by picture element pitches into a stripe electrode comprising a plurality of line electrode elements arranged in a row.

In this specification, the expression "the electrode is divided by picture element pitches" means that the electrode is divided into a plurality of elements which are arranged in pitches equal to the picture element pitches and each of which is not larger than the picture element pitches so that each electrode element is in one-to-one correspondence to a picture element in the direction of arrangement of the electrode elements. An insulator member (may be said photoconductive material layer) is disposed in each gap between adjacent electrode elements.

In the image read-out method in accordance with the third aspect of the present invention, it is preferred that the stimulating light in the form of a line beam which intersects the longitudinal direction of the line electrode elements of said one electrode layer be employed, the line beam be caused to scan the solid image sensor in the longitudinal direction of the line electrode elements of said one electrode layer while applying an electric field between each of the line electrode elements of said one electrode layer and the electrode of the other electrode layer, and electric charges generated in the photoconductive material layer as the line beam scans the solid image sensor be detected line electrode element by line electrode element.

Further it is preferred that the electrode of the other electrode layer be divided into a stripe electrode comprising a plurality of line electrode elements arranged in a row, each extending to intersect the line electrode elements of said one electrode layer, and an electric field be applied between one of the line electrode elements of said the other electrode layer corresponding to the read-out line and the line electrode elements of said one electrode layer.

It is further preferred that also the electrode of said the other electrode layer be divided by picture element pitches so that each line electrode element is in one-to-one correspondence to a picture element in the direction of arrangement of the line electrode elements.

The thickness of the photoconductive material layer of the solid image sensor is preferably not smaller than 0.1 μm so that the photoconductive material layer absorbs a sufficient amount of stimulated emission and the level of signal to be taken out can be high enough. Further, it is preferred that the thickness of the photoconductive material layer be as large as possible in order to reduce the distribution capacity and suppress fixed noise, but when the thickness is too large, the voltage of the power source for imparting the electric field becomes too high. Accordingly, in order to reduce the fixed noise while taking into account the voltage of the power source, the thickness of the photoconductive material layer of the solid image sensor is preferably not smaller than 0.1 µm and not larger than 100 µm.

Further, it the image read-out method in accordance with the third aspect of the present invention, it is preferred that said electric field be such as to generate an avalanche amplification effect in the photoconductive material layer. In order to make effective the avalanche amplification, the thickness of the photoconductive material layer is preferably not smaller than lam and more preferably not smaller than 10 µm. In order to generate the avalanche amplification effect in the photoconductive material layer, it is necessary to apply a high electric field to the photoconductive material layer. However, when the thickness is too large, the voltage of the power source for imparting the electric field becomes too high. Accordingly, in order to increase the avalanche amplification effect while taking into account the voltage of the power source, the thickness of the photoconductive material layer of the solid image sensor is preferably not smaller than 1 µm (more preferably not smaller than 10 µm) and not larger than 50 µm.

When a photoconductive material layer whose major component is a-Se is used under an electric field which generates an avalanche amplification effect in the photoconductive material layer, the photoconductive material layer becomes sensitive to fluctuation of electric field distribution (e.g., fluctuation in the voltage of the power source) and the image signal fluctuates. Accordingly, it is preferred that fluctuation of the image signal due to fluctuation in electric field distribution be suppressed. The fluctuation of the image signal can be suppressed, for instance, by suppressing fluctuation of the voltage of the power source, or by storing fluctuation in the output data with fluctuation in the voltage of the power source and correcting the image signal according to fluctuation of the voltage of the power source during read-out of the image signal.

Further it is preferred that the solid image sensor be provided with a photoconductive material layer which also exhibits electric conductivity upon exposure to recording light bearing thereon image information or momentary light emitted from the stimulable phosphor layer upon exposure to the recording light, and charges generated in the photoconductive material layer when the recording light or the momentary light impinges upon the photoconductive material layer be detected, thereby obtaining a preliminary read-out image signal. This means that a preliminary read-out image signal is obtained by use of a solid image sensor which is used in the final read-out. From this viewpoint, it is preferred that the method be applied to a system in which an image recording system and an image read-out system are integrated into a unit or to a radiation image detecting sheet comprising a stimulable phosphor sheet having a stimulable phosphor layer and a solid image sensor having a photoconductive material layer which are integrated into a unit.

In order to obtain a more accurate preliminary read-out image signal, it is preferred that a solid image sensor in which the electrode of the other electrode layer is divided into a stripe electrode comprising a plurality of line electrode elements arranged in a row, each extending to intersect the line electrode elements of said one electrode layer be used, and electric charges generated in the photoconductive material layer when the recording light or the momentary light impinges upon the photoconductive material layer be detected by line electrode elements of said the other electrode layer.

In this case, since a preliminary read-out image signal is read out through the line electrode elements of each of the electrode layers, a more detailed preliminary read-out image signal can be obtained from the two preliminary read-out image signals.

How to use the two preliminary read-out image signal depends upon the projecting condition of the recording light. For example when the entire area of the stimulable phosphor sheet is flashed to the recording light at one time, one-dimensionally compressed information integrated in the longitudinal direction of the line electrode elements of one electrode layer is obtained from the line electrode elements of the one electrode layer, and one-dimensionally compressed information integrated in the transverse direction of the line electrode elements of the one electrode layer is obtained from the line electrode elements of the electrode layer. Then, a more detailed preliminary read-out image signal can be obtained from the two pieces of one-dimensionally compressed information.

In accordance with a fourth aspect of the present invention, there is provided an image read-out system comprising a stimulating light scanning means which causes stimulating light to scan a stimulable phosphor sheet having a stimulable phosphor layer which emits stimulated emission in proportion to the stored energy of radiation upon exposure to the stimulating light, a solid image sensor having a photoconductive material layer which exhibits electric conductivity upon exposure to the stimulated emission from the stimulable phosphor sheet and a pair of electrode layers which are disposed on opposite sides of the photoconductive material layer and are provided with electrodes for detecting electric charges generated in the photoconductive material layer, an electric voltage imparting means which imparts an electric voltage to the photoconductive material layer of the solid image sensor to apply an electric field to the photoconductive material layer, and an image signal obtaining means which detects electric charges generated in the photoconductive material layer of the solid image sensor when the stimulable phosphor sheet is exposed to the stimulating light and stimulated emission emitted from the stimulable phosphor sheet impinges upon the photoconductive material with an electric voltage imparted to the photoconductive material layer by the electric voltage application means to apply an electric field to the photoconductive material layer, and detects an image signal representing an image stored on the stimulable phosphor sheet, wherein the improvement comprises that said stimulable phosphor sheet has a stimulable phosphor layer which is stimulated by stimulating light in a wavelength range of not shorter than 600 nm (preferably in a red region from 600 to 800 nm) and emits stimulated emission in a wavelength range of not longer than 500 nm (preferably in a blue region from 300 to 500 nm), said solid image sensor has a photoconductive material layer whose major component is a-Se, and the electrode of at least one of the electrode layers is divided by picture element pitches into a stripe electrode comprising a plurality of line electrode elements arranged in a row.

In the image read-out system in accordance with the fourth aspect of the present invention, it is preferred that the stimulating light scanning means causes the stimulating light in the form of a line beam which intersects the longitudinal direction of the line electrode elements of said one electrode layer to scan the solid image sensor in the longitudinal direction of the line electrode elements of said one electrode layer, the electric voltage imparting means imparts an electric voltage between the electrode layers so that an electric field is generated in the photoconductive material layer between each of the line electrode elements of said one electrode layer and the electrode of the other electrode layer, and the image signal obtaining means detects electric charges generated in the photoconductive material layer as the line beam scans the solid image sensor line electrode element by line electrode element.

Further it is preferred that the electrode of the other electrode layer be divided into a stripe electrode comprising a plurality of line electrode elements arranged in a row, each extending to intersect the line electrode elements of said one electrode layer, and the electric voltage imparting means imparts an electric voltage between the electrode layers so that an electric field is applied to the photoconductive material layer between one of the line electrode elements of said the other electrode layer corresponding to the read-out line and the line electrode elements of said one electrode layer.

The thickness of the photoconductive material layer of the solid image sensor is preferably not smaller than 0.1 µm and not larger than 100 µm.

Further, in the image read-out system in accordance with the fourth aspect of the present invention, it is preferred that said electric voltage imparting means imparts an electric voltage which applies an electric field such as to generate an avalanche amplification effect in the photoconductive material layer. In this case, the thickness of the photoconductive material layer of the solid image sensor is preferably not smaller than 10 µm and not larger than 50 µm.

It is further preferred that the image read-out system of the fourth aspect of the present invention be provided with a fluctuation suppressing means which suppresses fluctuation of the image signal due to fluctuation in the electric field applied to the photoconductive material layer.

Further it is preferred that the solid image sensor be provided with a photoconductive material layer which also exhibits electric conductivity upon exposure to recording light bearing thereon image information or momentary light emitted from the stimulable phosphor layer upon exposure to the recording light, and there is provided a preliminary read-out image signal obtaining means which obtains a preliminary read-out image signal bearing thereon image information by detecting charges generated in the photoconductive material layer when the recording light or the momentary light impinges upon the photoconductive material layer.

In accordance with a fifth aspect of the present invention, there is provided a two-dimensional solid image sensor for use in the image read-out method and the image read-out system in accordance with the third and fourth aspects of the present invention comprising a photoconductive material layer which exhibits electric conductivity upon exposure to stimulated emission from a stimulable phosphor sheet and a pair of electrode layers which are disposed on opposite sides of the photoconductive material layer and are provided with electrodes for detecting electric charges generated in the photoconductive material layer, wherein the improvement comprises that said solid image sensor has a photoconductive material layer whose major component is a-Se, and the electrode of at least one of the electrode layers is divided by picture element pitches into a stripe electrode comprising a plurality of line electrode elements arranged in a row.

It is preferred that the electrode of the other electrode layer be divided into a stripe electrode comprising a plurality of line electrode elements arranged in a row, each extending to intersect the line electrode elements of said one electrode layer.

The thickness of the photoconductive material layer of the solid image sensor is preferably not smaller than 0.1 µm and not larger than 100 µm. In order to increase the avalanche amplification effect, the thickness of the photoconductive material layer of the solid image sensor is preferably not smaller than 10. µm and not larger than 50 µm.

The stimulable phosphor sheet and the solid image sensor may be separate members or may be integrated into a unit. When a relatively thin stimulable phosphor sheet and a relatively thin solid image sensor are laminated into an image detecting sheet with the stimulable phosphor layer and the photoconductive material layer opposed to each other, a thin and light image detecting sheet can be obtained. Such an image detecting sheet can remarkably improve the stimulated emission collecting efficiency and provides a high quality image. Further when such an image detecting sheet is employed, a photomultiplier need not be used, which makes it feasible to reduce the overall size of the system.

In accordance with a sixth aspect of the present invention, there is provided an image detecting sheet comprising an image recording portion having a stimulable phosphor layer which emits stimulated emission in proportion to stored energy of radiation upon exposure to stimulating light and an image read-out portion which is opposed to the image recording portion and comprises a photoconductive material layer which exhibits electric conductivity upon exposure to the stimulated emission from the stimulable phosphor sheet and a pair of electrode layers which are disposed on opposite sides of the photoconductive material layer and are provided with electrodes for detecting electric charges generated in the photoconductive material layer, wherein the improvement comprises that said image recording portion has a layer of stimulable phosphor which is stimulated by stimulating light in a wavelength range of not shorter than 600 nm (preferably in a red region from 600 to 800 nm) and emits stimulated emission in a wavelength range of not longer than 500 nm (preferably in a blue region from 300 to 500 nm), said image read-out portion has a photoconductive material layer whose major component is a-Se, and the electrode of at least one of the electrode layers is divided by picture element pitches into a stripe electrode comprising a plurality of line-electrode elements arranged in a row.

It is preferred that the electrode of the other electrode layer be divided into a stripe electrode comprising a plurality of line electrode elements arranged in a row, each extending to intersect the line electrode elements of said one electrode layer.

The thickness of the photoconductive material layer of the solid image sensor is preferably not smaller than 0.1 µm and not larger than 100 µm. In order to increase the avalanche amplification effect, the thickness of the photoconductive material layer of the solid image sensor is preferably not smaller than 10. µm and not larger than 50 µm.

In the image read-out method of the third aspect of the present invention and the image read-out system of the fourth aspect of the present invention, a stimulable phosphor sheet having a layer of stimulable phosphor which is stimulated by stimulating light in a wavelength range of not shorter than 600 nm and emits stimulated emission in a wavelength range of not longer than 500 nm in proportion to the stored energy of radiation upon exposure to the stimulating light, and a solid image sensor having a photoconductive material layer the major component of which is a-Se and which exhibits electric conductivity upon exposure to the stimulated emission from the stimulable phosphor sheet are employed in combination with each other with the electrode of at least one of the electrode layers on opposite sides of the photoconductive material layer of the solid image sensor divided by picture element pitches into a stripe electrode comprising a plurality of line electrode elements arranged in a row.

An a-Se layer is highly sensitive to a wavelength in a blue region not longer than 500 nm (absorbs a sufficient amount of blue light) and the quantum efficiency of a-Se to stimulated emission close to 400 nm is as high as 60 to 70% provided that it is not smaller than 0.1 µm in thickness. Accordingly, in accordance with the method and system of the third and fourth aspects, stimulated emission in a blue region emitted from the stimulable phosphor sheet can be detected at a high efficiency. Further since the electrode for detecting the charges is divided by picture element pitches into a plurality of electrode elements so that each electrode element is in one-to-one correspondence to a picture element, the area of each electrode element is very small even if the photoconductive material layer is substantially the same as the stimulable phosphor sheet in area and, accordingly, dark current noise and/or capacitance noise can be reduced, whereby a high quality image which is high in S/N ratio can be obtained.

When electric charges are detected by the line electrode elements of the electrode divided by picture element pitches while scanning the solid image sensor with a line beam intersecting the longitudinal direction of the line electrode elements, the electric charges can be simultaneously detected in the direction of arrangement of the line electrode elements, which results in a higher read-out speed. Further, since a stimulating light source in the form of a line source can be formed by a relatively thin light source such as a fluorescent light, a LED or an organic EL, the overall system can be thin.

Further, when the electrode of the other electrode layer is divided into a stripe electrode comprising a plurality of line electrode elements arranged in a row, each extending to intersect the line electrode elements of said one electrode layer, the distribution capacity can be reduced and fixed noise can be suppressed by switching the electrode elements of said the other electrode layer with the read-out line.

Further since a-Se hardly has sensitivity to light in a wavelength range not shorter than 600 nm and almost wholly transmits such light, a-Se is large in the ratio of the sensitivity to the stimulated emission (near 400 nm) to that to the stimulating light (600 to 700 nm). For example, in a state where no avalanche amplification effect is obtained, the ratio of the sensitivity to blue light (470 nm) to that to red light (680 nm) is about 3.5 when the thickness of the a-Se layer is 10 µm. As the thickness of the a-Se layer is smaller, the blue/red sensitivity ratio increases and when an avalanche amplification effect is available, the blue/red sensitivity ratio further increases. Accordingly, use of a stimulating light cut filter is basically unnecessary, and by projecting stimulating light not shorter than 600 nm in wavelength through a photoconductive material layer of a-Se, stimulated emission emitted from the surface of the stimulable phosphor layer can be effectively detected by the photoconductive material layer, whereby an image at high quality can be obtained. Further, since a-Se is very high in dark resistance as compared with a Si avalanche photodiode and the like, a high S/N ratio can be obtained.

Further when a Si avalanche photodiode is used as a solid image sensor, it is difficult to form a solid image sensor of a large area, e.g., an area sensor, since Si is in the form of a crystal. To the contrast, an a-Se layer can be formed by low-temperature deposition process, and is suitable for forming a solid image sensor which is thin, large in area and strong to impact. For example an area sensor 17"×17" can be easily formed of a-Se.

When an electric field which can generate an avalanche amplification effect is applied to the photoconductive material layer, the amount of charges to be taken out can be greatly increased, whereby the S/N ratio of the image signal can be improved and the quality of the image can be improved.

Further by suppressing fluctuation in the image signal due to fluctuation in the electric field distribution, the image signal can be stabilized and the image quality is further improved.

Further, when that the solid image sensor is provided with a photoconductive material layer which also exhibits electric conductivity upon exposure to recording light bearing thereon image information or momentary light emitted from the stimulable phosphor layer upon exposure to the recording light, and charges generated in the photoconductive material layer when the recording light or the momentary light impinges upon the photoconductive material layer is detected, thereby obtaining a preliminary read-out image signal, a preliminary read-out image signal can be obtained while a radiation image is being recorded on the stimulable phosphor sheet by use of the detecting system for final read-out. With this arrangement, preliminary read-out does not add to the cost.

Further, since being effected while a radiation image is being recorded on the stimulable phosphor sheet, the preliminary read-out does not reduce the amount of information to be obtained by final read-out and does not adversely affect the final read-out unlike preliminary read-out which is effected before the final read-out. Further, since it is not necessary to scan the stimulable phosphor sheet with stimulating light for preliminary read-out, time loss in reading out the image can be saved. Further since preliminary read-out information on substantially over the entire area of the stimulable phosphor sheet can be obtained, image read-out conditions and/or the image processing conditions can be accurately set.

In the solid image sensor in accordance with the fifth aspect of the present invention, the major component of the photoconductive material layer is a-Se and the electrode of at least one of the electrode layers is divided by picture element pitches into a stripe electrode comprising a plurality of line electrode elements arranged in a row. Accordingly, the area of each electrode element is very small and dark current and/or output capacitance can be reduced.

Further in accordance with the sixth aspect of the present invention, a light and thin image detecting sheet can be obtained while keeping the aforesaid various merits. Further the stimulated emission collecting efficiency can be greatly increased and the quality of the image to be obtained can be greatly improved. Further, the radiation image recording and read-out system can be small in size as compared with a system where a photomultiplier is employed.

Still another object of the present invention is to provide an image read-out method and an image read-out system for reading out a radiation image from a stimulable phosphor sheet in which the preliminary read-out which is to be carried out prior to the final read-out can be carried out accurately without affecting the final read-out and without adding to the cost.

In accordance with a seventh aspect of the present invention, there is provided an image read-out method of obtaining an image signal bearing thereon image information by use of a stimulable phosphor sheet having a layer of stimulable phosphor which emits stimulated emission in proportion to the stored energy of radiation upon exposure to stimulating light and a solid image sensor having a photoconductive material layer which exhibits electric conductivity upon exposure to the stimulated emission from the stimulable phosphor sheet and by scanning with stimulating light a stimulable phosphor sheet which has been exposed to radiation and has stored thereon an image, causing the photoconductive material layer to be exposed to stimulated emission emitted from the stimulable phosphor sheet upon exposure to the stimulating light, and detecting electric charges generated in the photoconductive material layer upon exposure to the stimulated emission by applying an electric field to the photoconductive material layer, wherein the improvement comprises the steps of using a solid image sensor whose photoconductive material layer also exhibits electric conductivity upon exposure to recording light bearing thereon image information (e.g., the radiation passing through the object) or momentary light emitted from the stimulable phosphor layer upon exposure to the recording light, projecting the recording light onto the stimulable phosphor sheet while applying an electric field to the photoconductive material layer, and detecting charges generated in the photoconductive material layer when the recording light or the momentary light impinges upon the photoconductive material layer, thereby obtaining a preliminary read-out image signal bearing thereon image information.

This means that a preliminary read-out image signal is obtained by use of a solid image sensor which is used in the final read-out. From this viewpoint, it is preferred that the method of the seventh aspect be applied to a system in which an image recording system and an image read-out system are integrated into a unit or to a two-dimensional radiation image detecting sheet comprising a stimulable phosphor sheet having a stimulable phosphor layer and a solid image sensor having a photoconductive material layer which are integrated into a unit.

The solid image sensor may be a two-dimensional sensor (area sensor) which is substantially the same as the stimulable phosphor sheet in area, or a one-dimensional sensor (line sensor) or a zero-dimensional sensor which is long or smaller in area than the stimulable phosphor sheet. When the solid image sensor is in the form of a one-dimensional sensor or a zero-dimensional sensor, it is preferred that the preliminary read-out image signal be obtained by moving the solid image sensor relatively to the stimulable phosphor sheet during exposure to the recording light so that information on substantially the entire area of the stimulable phosphor sheet can be obtained. In this case, the solid image sensor may be moved at a higher speed than in the final read-out so that a rougher preliminary read-out image signal is obtained.

When the solid image sensor is in the form of a two-dimensional sensor, in order to obtain more accurate preliminary read-out image signal, it is preferred that a solid image sensor in which the electrode of one of the electrode layers is divided into a stripe electrode comprising a plurality of line electrode elements arranged in a row be used, and electric charges generated in the photoconductive material layer when the recording light or the momentary light impinges upon the photoconductive material layer be detected by line electrode elements of said one electrode layer.

It is further preferred that a solid image sensor in which the electrode of the other electrode layer is also divided into a stripe electrode comprising a plurality of line electrode elements arranged in a row, each extending to intersect the line electrode elements of said one electrode layer be used, and electric charges generated in the photoconductive material layer when the recording light or the momentary light impinges upon the photoconductive material layer be detected also by line electrode elements of said the other electrode layer.

In this case, since a preliminary read-out image signal is read out through each of the electrode layers by the line electrode elements thereof, a more detailed preliminary read-out image signal can be obtained from the two preliminary read-out image signals.

How to use the two preliminary read-out image signal depends upon the projecting condition of the recording light. For example when the entire area of stimulable phosphor sheet is flashed to the recording light at one time, one-dimensionally compressed information integrated in the longitudinal direction of the line electrode elements of one electrode layer is obtained from the line electrode elements of the one electrode layer, and one-dimensionally compressed information integrated in the transverse direction of the line electrode elements of the one electrode layer is obtained from the line electrode elements of the electrode layer. Then, a more detailed preliminary read-out image signal can be obtained from the two pieces of one-dimensionally compressed information.

In accordance with an eighth aspect of the present invention, there is provided an image read-out system comprising a stimulating light source which emits stimulating light, a stimulating light scanning means which causes the stimulating light emitted from the stimulating light source to scan a stimulable phosphor sheet having a layer of stimulable phosphor which emits stimulated emission in proportion to the stored energy of radiation upon exposure to the stimulating light, a solid image sensor having a photoconductive material layer which exhibits electric conductivity upon exposure to the stimulated emission from the stimulable phosphor sheet, an electric voltage imparting means which imparts an electric voltage to the photoconductive material layer of the solid image sensor to apply an electric field to the photoconductive material layer, and an image signal obtaining means which detects electric charges generated in the photoconductive material layer of the solid image sensor when the stimulable phosphor sheet is exposed to the stimulating light and stimulated emission emitted from the stimulable phosphor sheet impinges upon the photoconductive material with an electric field applied to the photoconductive material layer, and detects an image signal representing an image stored on the stimulable phosphor sheet, wherein the improvement comprises that the photoconductive material layer of the solid image sensor also exhibits electric conductivity upon exposure to recording light bearing thereon image information or momentary light emitted from the stimulable phosphor layer upon exposure to the recording light, and there is provided a preliminary read-out image signal obtaining means which obtains a preliminary read-out image signal bearing thereon image information by detecting charges generated in the photoconductive material layer when the recording light or the momentary light impinges upon the photoconductive material layer.

In the image read-out system in accordance with the eighth aspect of the present invention, it is preferred that the solid image sensor is provided with a pair of electrode layers on opposite sides of the photoconductive material layer, each having an electrode, the electrode of one of the electrode layers is divided into a stripe electrode comprising a plurality of line electrode elements arranged in a row, and the image signal obtaining means detects electric charges generated in the photoconductive material layer when the recording light or the momentary light impinges upon the photoconductive material layer by line electrode elements of said one electrode layer.

It is further preferred that the electrode of the other electrode layer be also divided into a stripe electrode comprising a plurality of line electrode elements arranged in a row, each extending to intersect the line electrode elements of said one electrode layer, and the preliminary read-out image signal obtaining means detects electric charges generated in the photoconductive material layer when the recording light or the momentary light impinges upon the photoconductive material layer be detected also by line electrode elements of said the other electrode layer.

In the image read-out method in accordance with the seventh aspect of the present invention and the image read-out system in accordance with the eighth aspect of the present invention, a preliminary read-out image signal can be obtained while a radiation image is being recorded on the stimulable phosphor sheet by use of the detecting system for final read-out. With this arrangement, the preliminary read-out image signal can be obtained without an additional sensor for the preliminary read-out and accordingly, the preliminary read-out does not add to the cost.

Further, since being effected while a radiation image is being recorded on the stimulable phosphor sheet, the preliminary read-out does not reduce the amount of information to be obtained by final read-out and does not adversely affect the final read-out unlike preliminary read-out which is effected before the final read-out.

Further, since it is not necessary to scan the stimulable phosphor sheet with stimulating light for preliminary read-out, time loss in reading out the image can be saved.

Further when a zero-dimensional or one-dimensional sensor is used, preliminary read-out information can be obtained substantially over the entire area of the stimulable phosphor sheet by moving the sensor relatively to the stimulable phosphor sheet at a speed higher than that for the final read-out by use of the scanning system for the final read-out, the read-out conditions and/or the image processing conditions can accurately set even if the sensor itself cannot cover the entire area of the stimulable phosphor sheet.

When a two-dimensional solid image sensor which is substantially the same as the stimulable phosphor sheet in area is used, the preliminary read-out can be accurately carried out by using a solid image sensor having a strip electrode comprising a plurality of line electrodes and detecting the charges by the line electrodes.

Still another object of the present invention is to provide an image read-out method and an image read-out system which can stably obtain an image excellent in S/N ratio when an image is read out by use of a stimulable phosphor sheet and a solid image sensor (semiconductor sensor).

Still another object of the present invention is to provide a solid image sensor which is used for carrying out the image read-out method and is used in the image read-out system.

Still another object of the present invention is to provide an image read-out method and an image read-out system which is not affected by false signals or flare and to provide a solid image sensor which is used for carrying out the image read-out method and is used in the image read-out system.

In accordance with a ninth aspect of the present invention, there is provided an image read-out method of obtaining an image signal bearing thereon image information by use of a stimulable phosphor sheet having a layer of stimulable phosphor which emits stimulated emission in proportion to the stored energy of radiation upon exposure to stimulating light and a solid image sensor having a photoconductive material layer which exhibits electric conductivity upon exposure to the stimulated emission from the stimulable phosphor sheet, and by scanning with stimulating light a stimulable phosphor sheet which has been exposed to radiation and has stored thereon an image, causing the photoconductive material layer to be exposed to stimulated emission emitted from the stimulable phosphor sheet upon exposure to the stimulating light, and detecting electric charges generated in the photoconductive material layer upon exposure to the stimulated emission, wherein the improvement comprises that the solid image sensor has a photoconductive material layer having an area smaller than the area of the stimulable phosphor sheet and the stimulated emission receiving face of the solid image sensor is divided into a plurality of photoelectric conversion segments, and a plurality of image signal obtaining means are discretely connected to the respective photoelectric conversion segments to detect electric charges generated in the photoelectric conversion segments.

The expression "the photoconductive material layer has an area smaller than the area of the stimulable phosphor sheet" means, for instance, that one side of the photoconductive material layer is equal to or shorter than one side of the stimulable phosphor sheet and the other side of the photoconductive material layer is shorter than the other side of the stimulable phosphor sheet. For example, when the solid image sensor is an elongated rectangular sensor, the long side of the solid image sensor (for instance, along the main scanning line) may be equal to the width of the stimulable phosphor sheet, but in such a case, the shorter side of the solid image sensor should be shorter than the length of the stimulable phosphor sheet. Further, when the solid image sensor is substantially square in shape, each side of the solid image sensor may be smaller than the shorter side of the stimulable phosphor sheet.

Each of the photoelectric conversion segments of the solid image sensor may be different from each in size and need not be in one-to-one correspondence to a picture element. Further, the stimulated emission receiving face of the solid image sensor may be divided in either of the main scanning direction and the sub-scanning direction or may be divided in both the main scanning direction and the sub-scanning direction. Further, the expression "the stimulated emission receiving face of the solid image sensor is divided into a plurality of photoelectric conversion segments" means that the photoelectric conversion segments can function independently of each other, and the stimulated emission receiving face of the solid image sensor may be divided into a plurality of photoelectric conversion segments, for instance, by dividing at least one of the electrodes on opposite sides of the photoconductive material layer or by forming partition walls between the segments.

At the boundaries of the photoelectric conversion segments, stimulated emission from one picture element can simultaneously impinge upon two photoelectric conversion segments, and accordingly, it is preferred that the image signal for the one picture element be obtained by adding two image signals obtained from two image signal obtaining means connected to the two photoelectric conversion segments in order to smoothen joints of the image signals.

Further since the stimulated emission is emitted from the part of the stimulable phosphor sheet exposed to the stimulating light, the photoelectric conversion segments upon which stimulated emission from one picture element impinges changes with the scanning position of the stimulating light. Accordingly, it is preferred that the image signals from the image signal obtaining means which are to be added be switched in response to scanning of the stimulating light.

In accordance with a tenth aspect of the present invention, there is provided an image read-out method of obtaining an image signal bearing thereon image information by use of a stimulable phosphor sheet having a layer of stimulable phosphor which emits stimulated emission in proportion to the stored energy of radiation upon exposure to stimulating light and a solid image sensor having a photoconductive material layer which exhibits electric conductivity upon exposure to the stimulated emission from the stimulable phosphor sheet, and by scanning with stimulating light a stimulable phosphor sheet which has been exposed to radiation and has stored thereon an image, causing the photoconductive material layer to be exposed to stimulated emission emitted from the stimulable phosphor sheet upon exposure to the stimulating light, and detecting electric charges generated in the photoconductive material layer upon exposure to the stimulated emission by applying an electric field to the photoconductive-material layer, wherein the improvement comprises that a solid image sensor whose photoconductive material layer has an area smaller than the area of the stimulable phosphor sheet and whose stimulated emission receiving face is divided into a plurality of photoelectric conversion segments is used, and the photoelectric conversion segments are made active or inactive independently of each other.

The photoelectric conversion segments can be made active or inactive, for instance, by controlling application of the electric field to the photoconductive material layer.

Since the stimulated emission is emitted from the part of the stimulable phosphor sheet exposed to the stimulating light, the photoelectric conversion segments to be effective to obtain an image signal changes with the scanning position of the stimulating light. Accordingly, it is preferred that making active or inactive the photoelectric conversion segment be controlled in response to scanning of the stimulating light.

As in the method in accordance with the ninth aspect of the present invention, at the boundaries of the photoelectric conversion segments, stimulated emission from one picture element can simultaneously impinge upon two photoelectric conversion segments, and accordingly, it is preferred that the image signal for the one picture element be obtained by adding two image signals obtained from two image signal obtaining means connected to the two photoelectric conversion segments in order to smoothen joints of the image signals.

Further since the stimulated emission is emitted from the part of the stimulable phosphor sheet exposed to the stimulating light, the photoelectric conversion segments upon which stimulated emission from one picture element impinges changes with the scanning position of the stimulating light. Accordingly, it is preferred that the output signals from the photoelectric conversion segments which are to be added be switched in response to scanning of the stimulating light.

That is, in the method in accordance with the ninth aspect of the present invention, the image signals are obtained by the image signal obtaining means on the basis of the output signals from the corresponding photoelectric conversion segments and then the image signals are added. To the contrast, in the method in accordance with the tenth aspect of the present invention, the output signals from the corresponding photoelectric conversion segments are added.

In the methods in accordance with the ninth and tenth aspects of the present invention, it is preferred that a stimulable phosphor sheet having a layer of stimulable phosphor which is stimulated by stimulating light in a wavelength range of not shorter than 600 nm and emits stimulated emission in a wavelength range of not longer than 500 nm be used, and a solid image sensor having a photoconductive material layer whose major component is a-Se be used.

In accordance with an eleventh aspect of the present invention, there is provided a system for carrying out the image processing method in accordance with the ninth aspect of the present invention. That is, in accordance with the eleventh aspect of the present invention, there is provided an image read-out system comprising a stimulating light source which emits stimulating light, a stimulating light scanning means which causes the stimulating light emitted from the stimulating light source to scan a stimulable phosphor sheet having a layer of stimulable phosphor which emits stimulated emission in proportion to the stored energy of radiation upon exposure to the stimulating light, a solid image sensor having a photoconductive material layer which exhibits electric conductivity upon exposure to the stimulated emission from the stimulable phosphor sheet, and an image signal obtaining means which detects electric charges generated in the photoconductive material layer of the solid image sensor when the stimulable phosphor sheet is exposed to the stimulating light and stimulated emission emitted from the stimulable phosphor sheet impinges upon the photoconductive material, and obtains an image signal representing an image stored on the stimulable phosphor sheet, wherein the improvement comprises that the solid image sensor has a photoconductive material layer having an area smaller than the area of the stimulable phosphor sheet and the stimulated emission receiving face of the solid image sensor is divided into a plurality of photoelectric conversion segments, and a plurality of image signal obtaining means are discretely connected to the respective photoelectric conversion segments.

It is preferred that the image read-out system further comprises an adder means which obtains an image signal for one picture element by adding a plurality of image signals obtained from a plurality of image signal obtaining means connected to a plurality of photoelectric conversion segments which receive stimulated emission from the picture element.

In this case, it is preferred that the image read-out system further comprises a switching means which switches the image signals from the image signal obtaining means which are to be added in response to scanning of the stimulating light.

In accordance with a twelfth aspect of the present invention, there is provided a system for carrying out the image processing method in accordance with the tenth aspect of the present invention. That is, in accordance with the twelfth aspect of the present invention, there is provided an image read-out system comprising a stimulating light source which emits stimulating light, a stimulating light scanning means which causes the stimulating light emitted from the stimulating light source to scan a stimulable phosphor sheet having a layer of stimulable phosphor which emits stimulated emission in proportion to the stored energy of radiation upon exposure to the stimulating light, a solid image sensor having a photoconductive material layer which exhibits electric conductivity upon exposure to the stimulated emission from the stimulable phosphor sheet, an electric voltage imparting means which imparts an electric voltage to the photoconductive material layer of the solid image sensor to apply an electric field to the photoconductive material layer and an image signal obtaining means which detects electric charges generated in the photoconductive material layer of the solid image sensor when the stimulable phosphor sheet is exposed to the stimulating light and stimulated emission emitted from the stimulable phosphor sheet impinges upon the photoconductive material with an electric field applied to the photoconductive material layer, and obtains an image signal representing an image stored on the stimulable phosphor sheet, wherein the improvement comprises that the solid image sensor has a photoconductive material layer having an area smaller than the area of the stimulable phosphor sheet and the stimulated emission receiving face of the solid image sensor is divided into a plurality of photoelectric conversion segments, and there is provided a control means which makes active or inactive the photoelectric conversion segments independently of each other.

The control means may make active or inactive the photoelectric conversion segments by controlling application of the electric field to the photoconductive material layer.

It is preferred that the control means makes active or inactive the photoelectric conversion segments in response to scanning of the stimulating light.

It is preferred that the image read-out system further comprises an adder means which obtains an image signal for one picture element by adding a plurality of output signals from a plurality of photoelectric conversion segments which receive stimulated emission from the picture element.

In this case, it is preferred that the image read-out system further comprises a switching means which switches the output signals from the photoelectric conversion segments which are to be added in response to scanning of the stimulating light.

In the systems in accordance with the eleventh and twelfth aspects of the present invention, it is preferred that the stimulable phosphor sheet has a layer of stimulable phosphor which is stimulated by stimulating light in a wavelength range of not shorter than 600 nm and emits stimulated emission in a wavelength range of not longer than 500 nm, and the solid image sensor has a photoconductive material layer whose major component is a-Se.

In accordance with a thirteenth aspect of the present invention, there is provided a solid image sensor comprising a photoconductive material layer which exhibits electric conductivity upon exposure to stimulated emission emitted from a stimulable phosphor sheet upon exposure to stimulating light, wherein the improvement comprises that the photoconductive material layer has an area smaller than the area of the stimulable phosphor sheet and the stimulated emission receiving face of the solid image sensor is divided into a plurality of photoelectric conversion segments.

It is preferred that the major component of the photoconductive material layer is a-Se.

In the image read-out method in accordance with the ninth aspect of the present invention and the image read-out system in accordance with the eleventh aspect of the present invention, since the solid image sensor has a photoconductive material layer having an area smaller than the area of the stimulable phosphor sheet, and the stimulated emission receiving face of the solid image sensor is divided into a plurality of photoelectric conversion segments, and a plurality of image signal obtaining means are discretely connected to the respective photoelectric conversion segments to detect electric charges generated in the photoelectric conversion segments, each sensor is small in size and accordingly, generation of the dark current can be suppressed and the capacitance can be reduced, whereby the S/N ratio can be improved and a high quality image can be obtained.

When an image signal for one picture element is obtained by adding a plurality of image signals obtained from a plurality of image signal obtaining means connected to a plurality of photoelectric conversion segments which receive stimulated emission from the picture element, an adverse influence of dividing the photoconductive material layer can be avoided.

Further when the image signals from the image signal obtaining means which are to be added are switched in response to scanning of the stimulating light, joints of the image can be smooth.

In the image read-out method in accordance with the tenth aspect of the present invention and the image read-out system in accordance with the twelfth aspect of the present invention, since the solid image sensor has a photoconductive material layer having an area smaller than the area of the stimulable phosphor sheet, and the stimulated emission receiving face of the solid image sensor is divided into a plurality of photoelectric conversion segments, and there is provided a control means which makes active or inactive the photoelectric conversion segments independently of each other, only photoelectric conversion segments which are effective in reading out the image signal can be made active while the other photoelectric conversion segments kept inactive, whereby influence of the dark current in the sensor and/or false signals due to residual charges can be suppressed, influence of flare can be avoided and the S/N ratio can be greatly improved. This effect cannot be obtained by simply dividing the photoelectric convertor means, for instance, by dividing the electrode.

When the control is effected in response to the scanning position of the stimulating light, adverse influence of the control can be avoided.

When an image signal for one picture element is obtained by adding a plurality of output signals from a plurality of photoelectric conversion segments which receive stimulated emission from the picture element, an adverse influence of the control and dividing the photoconductive material layer can be avoided.

Further when the output signals from the photoelectric conversion segments which are to be added are switched in response to scanning of the stimulating light, joints of the image can be smooth without affected by switching of the controls.

When a stimulable phosphor sheet having a layer of stimulable phosphor which is stimulated by stimulating light in a wavelength range of not shorter than 600 nm and emits stimulated emission in a wavelength range of not longer than 500 nm in proportion to the stored energy of radiation upon exposure to the stimulating light, and a solid image sensor having a photoconductive material layer the major component of which is a-Se are employed in combination with each other, since a-Se is high in sensitivity to a wavelength in a blue region not longer than 500 nm and the quantum efficiency of a-Se to stimulated emission close to 400 nm is as high as 60 to 70%, stimulated emission in a blue region emitted from the stimulable phosphor sheet can be detected at a high efficiency, whereby the S/N ratio of the image signal can be further improved and the quality of the image can be further improved.

Further since a-Se hardly has sensitivity to light in a wavelength range not shorter than 600 nm and almost wholly transmits such light, a-Se is large in the ratio of the sensitivity to the stimulated emission (near 400 nm) to that to the stimulating light (600 to 700 nm). For example, in a state where no avalanche amplification effect is obtained, the ratio of the sensitivity to blue light (470 nm) to that to red light (680 nm) is about 3.5 when the thickness of the a-Se layer is 10 μm. As the thickness of the a-Se layer is smaller, the blue/red sensitivity ratio increases and when an avalanche amplification effect is available, the blue/red sensitivity ratio further increases. Accordingly, use of a stimulating light cut filter is basically unnecessary, and by projecting stimulating light not shorter than 600 nm in wavelength through a photoconductive material layer of a-Se, stimulated emission emitted from the surface of the stimulable phosphor layer can be effectively detected by the photoconductive material layer, whereby an image at high quality can be obtained. Further, since a-Se is very high in dark resistance as compared with a Si avalanche photodiode and the like, a high S/N ratio can be obtained.

BRIEF DESCRIPTION OF THE DRAWINGS

FIG. 2 is a schematic view showing a radiation image recording and read-out system using the radiation image detecting sheet of the first embodiment with the radiation image detecting sheet shown in a perspective view, FIG. 5 is a schematic view showing a modification of the radiation image recording and read-out system shown in FIGS. 3 and 4 which is suitable for the preliminary read-out, FIG. 8A is a schematic perspective showing a radiation image detecting sheet in accordance with a fourth embodiment of the present invention, FIG. 8B is a X-Y cross-sectional view of a part of the radiation image detecting sheet indicated by arrow P in FIG. 8A, FIG. 8C is a X-Z cross-sectional view of a part of the radiation image detecting sheet indicated by arrow Q in FIG. 8A, FIG. 10 is a schematic view showing a radiation image recording and read-out system using the radiation image detecting sheet of the fifth embodiment, FIG. 13A is a cross-sectional view showing the solid image sensor employed in the radiation image read-out system in accordance with the seventh embodiment of the present invention, FIG. 13B is a view showing a modification of the solid image sensor, FIGS. 14A to 14C are views for illustrating various methods of using the solid image sensor, FIG. 15 is a schematic side view showing a modification of the solid image sensor, FIGS. 19A to 19B are views showing examples of using the solid image sensor in the form of a line sensor having a pair of arrays of solid image sensor elements, FIG. 25 is a view for illustrating the operation of the circuit shown in FIG. 24A when the electrode is divided in the manner shown in FIG. 22B, FIG. 26A is a cross-sectional view taken along the sub-scanning line of the solid image sensor employed in the radiation image read-out system of the eleventh embodiment, FIG. 26B is a cross-sectional view taken along the main-scanning line of the solid image sensor, FIG. 26C is a horizontal cross-sectional view of the solid image sensor showing the divided electrode thereof, and FIG. 27 is a block diagram showing a part of the circuit for obtaining an image signal in the radiation image read-out system of the eleventh embodiment.

DESCRIPTION OF THE PREFERRED EMBODIMENTS

Figure 1A:
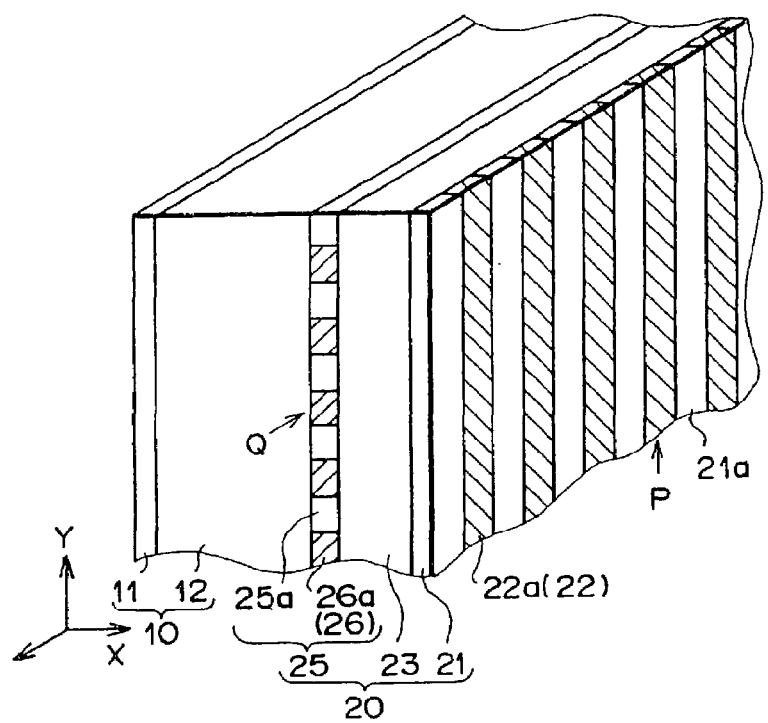
FIG. 1A is a schematic perspective showing a radiation image detecting sheet in accordance with a first embodiment of the present invention.
Figure 1B:
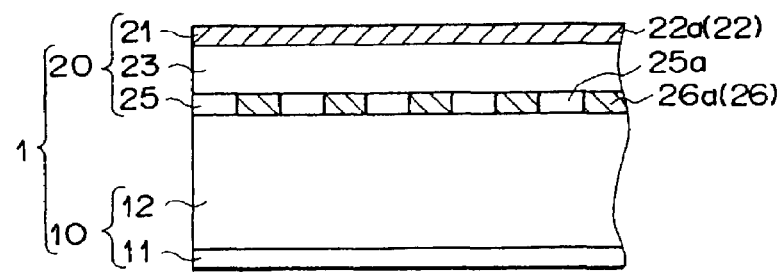
FIG. 1B is a X-Y cross-sectional view of a part of the radiation image detecting sheet indicated by arrow P in FIG. 1A, FIG. 1C a X-Z cross-sectional view of a part of the radiation image detecting sheet indicated by arrow Q in FIG. 1A.
Figure 1C:
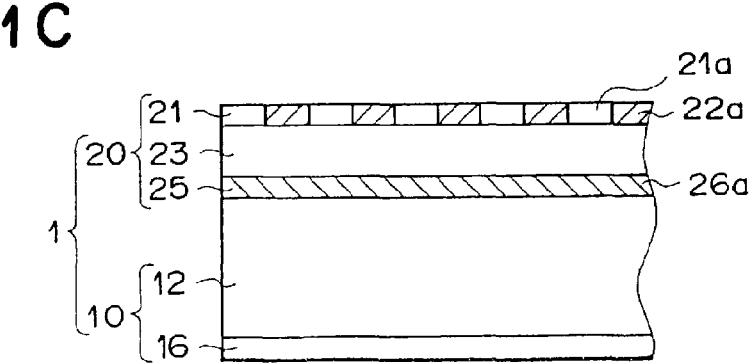

As shown in FIGS. 1A to 1C, a radiation image detecting sheet 1 in accordance with a first embodiment of the present invention comprises an image recording portion (a stimulable phosphor sheet) 10 and an image read-out portion (a solid image sensor) 20. The image recording portion 10 is formed by forming on a base 11 a stimulable phosphor layer 12 which emits stimulated emission in proportion to radiation energy stored thereon upon exposure to stimulating light. The image read-out portion 20 comprises a first electrode layer 21, a photoconductive material layer 23 which exhibits electric conductivity upon exposure to stimulated emission from the stimulable phosphor layer 12, and a second electrode layer 25 superposed one on another in this order. The first electrode layer 21 is formed of a first stripe electrode 22 comprising a plurality of linear electrode elements 22a spaced from each other with gaps 21a interposed between the elements 22a, and the second electrode layer 25 is formed of a second stripe electrode 26 comprising a plurality of linear electrode elements 26a spaced from each other with gaps 25a interposed between the elements 26a.

The image recording portion 10 and the image read-out portion 20 are superposed with the stimulable phosphor layer 12 and the second electrode layer 25 facing each other.

The image recording portion 10 may be of any form so long as the stimulable phosphor layer 12 is stimulated by red stimulating light in a wavelength range of not shorter than 600 nm and emits stimulated emission in a wavelength range of not longer than 500 nm (preferably from 400 to 450 nm) and may comprise a known stimulable phosphor sheet. Further, though not shown, a protective layer, a sensitizing layer and the like may be provided.

The material for forming the photoconductive material layer 23 should be a material which exhibits conductivity upon exposure not only to stimulated emission L4 but also to the recording light L2 or momentary light emitted from the stimulable phosphor layer 12 upon exposure to the recording light L2 when preliminary read-out is to be effected simultaneously with recording an image, though may be any material so long as it exhibits electric conductivity upon exposure to stimulated emission emitted from the stimulable phosphor layer 12 when preliminary read-out need not be effected simultaneously with recording an image. In the case of this embodiment where the stimulable phosphor layer 12 emits blue stimulated emission in a wavelength range of not longer than 500 nm (e.g., near 400 nm), it is preferred that the material is a material whose major component is a-Se. The thickness of the photoconductive material layer 23 is preferably not smaller than 1 μm so that the photoconductive material layer 23 absorbs a sufficient amount of stimulated emission, an avalanche amplification effect can be obtained and the level of signal to be taken out can be high enough. Further, it is preferred that the thickness of the photoconductive material layer 23 be as large as possible in order to reduce the distribution capacity and suppress fixed noise, but when the thickness is too large, the voltage of the power source for imparting the electric field becomes too high. Accordingly, in order to increase the ratio of the avalanche amplification effect to the fixed noise while taking into account the voltage of the power source, the thickness of the photoconductive material layer 23 is preferably not smaller than 1 μm and not larger than 100 μm, and more preferably not smaller than 10 μm and not larger than 50 μm.

Further when the photoconductive material layer 23 is of a-Se, the photoconductive material layer 23 is transparent to the red stimulating light and accordingly, the stimulating light L3 can be projected onto the stimulable phosphor layer 12 through the photoconductive material layer 23.

The electrode elements 22a of the first stripe electrode 22 extend in substantially perpendicular to the electrode elements 26a of the second strip electrode 26. The same number of electrode elements 22a as the number of picture elements in the direction of the array of the electrode elements 22a are provided and the same number of electrode elements 26a as the number of picture elements in the direction of the array of the electrode elements 26a are provided. That is, the pitch of the electrode elements determines the pitch of the picture elements. When the electrode 22 of the first electrode layer 21 is thus divided by picture element pitch so that each electrode element 22a is in one-to-one correspondence with one picture element, the area of each electrode element 22a is greatly reduced, whereby the dark current and the output capacity are suppressed. Accordingly, dark current noise and/or capacity noise are reduced and the S/N ratio of the image can be improved.

When the stimulating light is to be projected onto the stimulable phosphor layer 12 from the side of the image read-out portion 20, it is preferred that the first and second electrode layers 21 and 25 be transparent to the stimulating light. For this purpose, the electrode elements 22a and 26a are suitably formed of known transparent conductive film such as ITO (Indium Tin Oxide) film. When electrode elements 22a and 26a which are not transparent to the stimulating light are employed, at least the gaps 21a and 25a should be transparent to the stimulating light so that the stimulating light can impinge upon the stimulable phosphor layer 12 through the gaps 21a and 25a.

Further the second electrode layer 25 should be transparent to also the stimulated emission emitted from the stimulable phosphor layer 12. For this purpose, the electrode elements 26a are suitably formed of known transparent conductive film such as ITO (Indium Tin Oxide) film.

Figure 3:
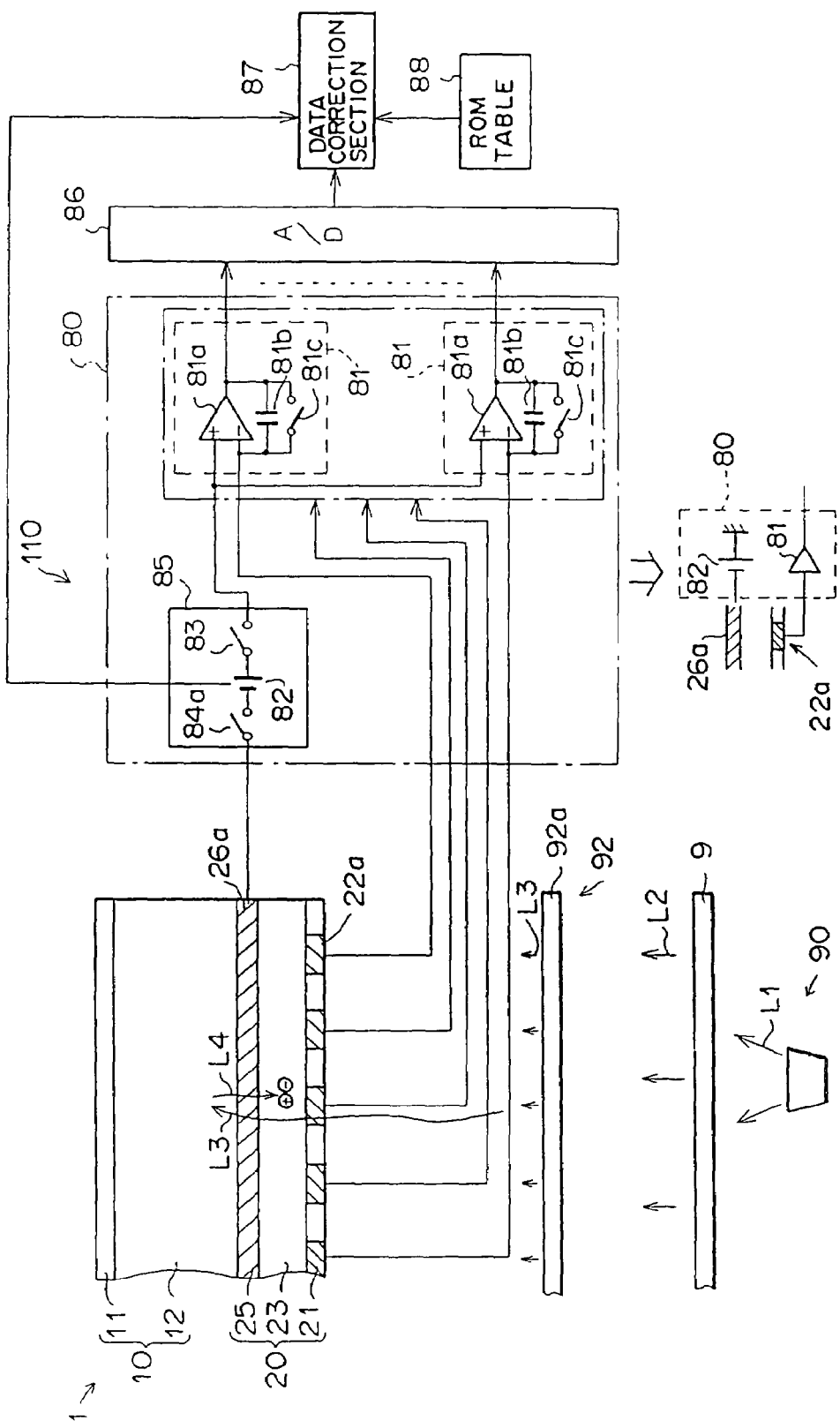
FIG. 3 is a schematic view showing the radiation image recording and read-out system with the radiation image detecting sheet shown in a X-Z cross-sectional view of the part indicated by arrow Q in FIG. 1.

FIGS. 2 and 3 show a radiation image recording and read-out system 110 using the radiation image detecting sheet 1 of this embodiment. In FIG. 2, the radiation image detecting sheet 1 is shown in a perspective view, and in FIG. 3 the radiation image detecting sheet 1 is shown in a X-Z cross-sectional view of the part indicated by arrow Q in FIG. 1.

The radiation image recording and read-out system 110 comprises the radiation image detecting sheet 1, a current detecting circuit 80, an A/D converter 86, a data correction section 87 and a ROM table 88. The data correction section 87 and the ROM table 88 are provided to suppress fluctuation of an image signal due to fluctuation of an electric field applied to the photoconductive material layer 23. The radiation image recording and read-out system 110 is further provided with a radiation projecting means 90 which emits radiation L1 such as X-rays so that radiation L2 passing through an object 9 impinges upon the radiation image detecting sheet 1 (the radiation L2 will be referred to as "recording light L2", hereinbelow), and a stimulating light projecting means (stimulating light scanning means) 92 which projects stimulating light L3 onto the radiation image detecting sheet 1.

The radiation projecting means 90 and the stimulating light projecting means 92 are both disposed on the side of the first electrode layer 21 of the image read-out portion 20 of the radiation image detecting sheet 1, and the stimulating light projecting means 92, especially its stimulating light source 92a, is arranged to be retracted from the optical path of the recording light L2, when radiation is projected from the radiation projecting means 90, not to interfere with the recording light L2.

The stimulating light projecting means 92 causes the stimulating light L3, which is red light in a wavelength range not shorter than 600 nm and is in the form of a substantially uniform linear beam extending substantially in perpendicular to the electrode elements 22a of the first stripe electrode 22, to scan the radiation image detecting sheet 1 in the longitudinal direction of the elements 22a (sub-scanning direction) from one edge to the other. As the stimulating light source 92a for emitting the stimulating light L3, an elongated, fluorescent lamp, LED, organic EL or the like can be used, and the stimulating light projecting means 92 causes the stimulating light L3 to scan the radiation image detecting sheet 1 by moving the stimulating light source 92a relatively to the radiation image detecting sheet 1. Further, the stimulating light source 92a may comprise a plurality of linear sources such as of liquid crystals or organic EL's which are arranged in a row to form an area light source, and the stimulating light projecting means 92 may be a means for energizing the linear sources in sequence. Such an area light source formed of a number of linear sources may be formed integrally with the radiation image detecting sheet 1.

Further, the stimulating light projecting means 92 may be arranged to cause a spot beam to scan the radiation image detecting sheet 1 in a direction substantially perpendicular to the elements 22a (main scanning direction) while moving the light source in the sub-scanning direction relatively to the radiation image detecting sheet 1. The stimulating light L3 may be either a continuous beam or a pulse beam. However, a high-power pulse beam is advantageous over a continuous beam in that a larger electric current can be detected and the S/N ratio of the image signal can be improved. Accordingly, in this particular embodiment, the stimulating light projecting means 92 projects a high-power pulse beam of about 100 μsec for each read-out line.

The current detecting circuit 80 is provided with a plurality of current detecting amplifiers 81 each comprising an operational amplifier 81a, an integrating capacitor 81b and a switch 81c, and to the inversion input terminal (−) of the operational amplifier 81a is connected one of the elements 22a of the first stripe electrode 22.

Further, the current detecting circuit 80 is provided with an electric voltage imparting means 85 which comprises a power source 82, a switch 83 and a switching portion 84 and imparts a predetermined electric voltage between the electrode layers 21 and 25 of the image read-out portion 20, thereby applying an electric field to the photoconductive material layer 23. The switching portion 84 has a plurality of switch elements 84a each comprising a fixed contact connected to one of the elements 26a of the second strip electrode 26 and a movable contact connected to the negative pole of the power source 82, whose positive pole is connected to non-inversion input terminals (+) of the respective operational amplifiers 81a by way of the switch 83.

The electric voltage imparting means 85 selectively closes the switch elements 84a in response to movement of the stimulating light L3 under the control of a control means (not shown) so that the electrode element 26a corresponding to the line just exposed to the stimulating light L3 is electrically connected to the negative pole of the power source 82. With this arrangement, an electric voltage is imparted between the electrode element 26a corresponding to the line and all the electrode elements 22a from the power source 82 by way of the switch 83 and an imaginary short circuit of the operational amplifier 81a, whereby an electric field is applied to the part of the photoconductive material layer 23 between the electrode elements 26a and 22a corresponding to the line. The system may be arranged so that an electric voltage is imparted between several electrode elements 26a including the electrode element 26a corresponding to the line and all the electrode elements 22a.

The voltage of the power source 82 is set so that the potential gradient in the photoconductive material layer 23 becomes not lower than $10^6$V/cm and an avalanche amplification effect is generated in the photoconductive material layer 23.

Each current detecting amplifier 81 detects an electric current generated when electric charges generated upon exposure of the photoconductive material layer 23 to stimulated emission L4 emitted from the stimulable phosphor layer 12 are read out from the image read-out portion 20 and reads out an image signal representing radiation energy stored on the stimulable phosphor layer 12.

The A/D converter 86, the data correction section 87 and the ROM table 88 (FIG. 3) connected downstream of the current detecting circuit 80 are for correcting fluctuation in output data due to fluctuation in the voltage of the power source 82. When the photoconductive material layer 23 whose major component is a-Se is used under an electric field which generates an avalanche amplification effect in the photoconductive material layer 23, the photoconductive material layer 23 becomes sensitive to fluctuation of the electric voltage. Accordingly, it is preferred that fluctuation of the voltage of the power source 82 be suppressed. It is further preferred that fluctuation in the output data with fluctuation in the voltage of the power source 82 be stored and the output data be corrected according to fluctuation of the voltage of the power source 82 during read-out of the image signal by, for instance, software processing. For this purpose, fluctuation in the output data with fluctuation in the voltage of the power source 82 is stored in the ROM table 88 and the data correction section 87 watches fluctuation in the voltage of the power source 82 (more strictly the voltage across the electrodes 22 and 26) during image read-out and corrects the output data according to the fluctuation of the voltage of the power source.

Figure 4:
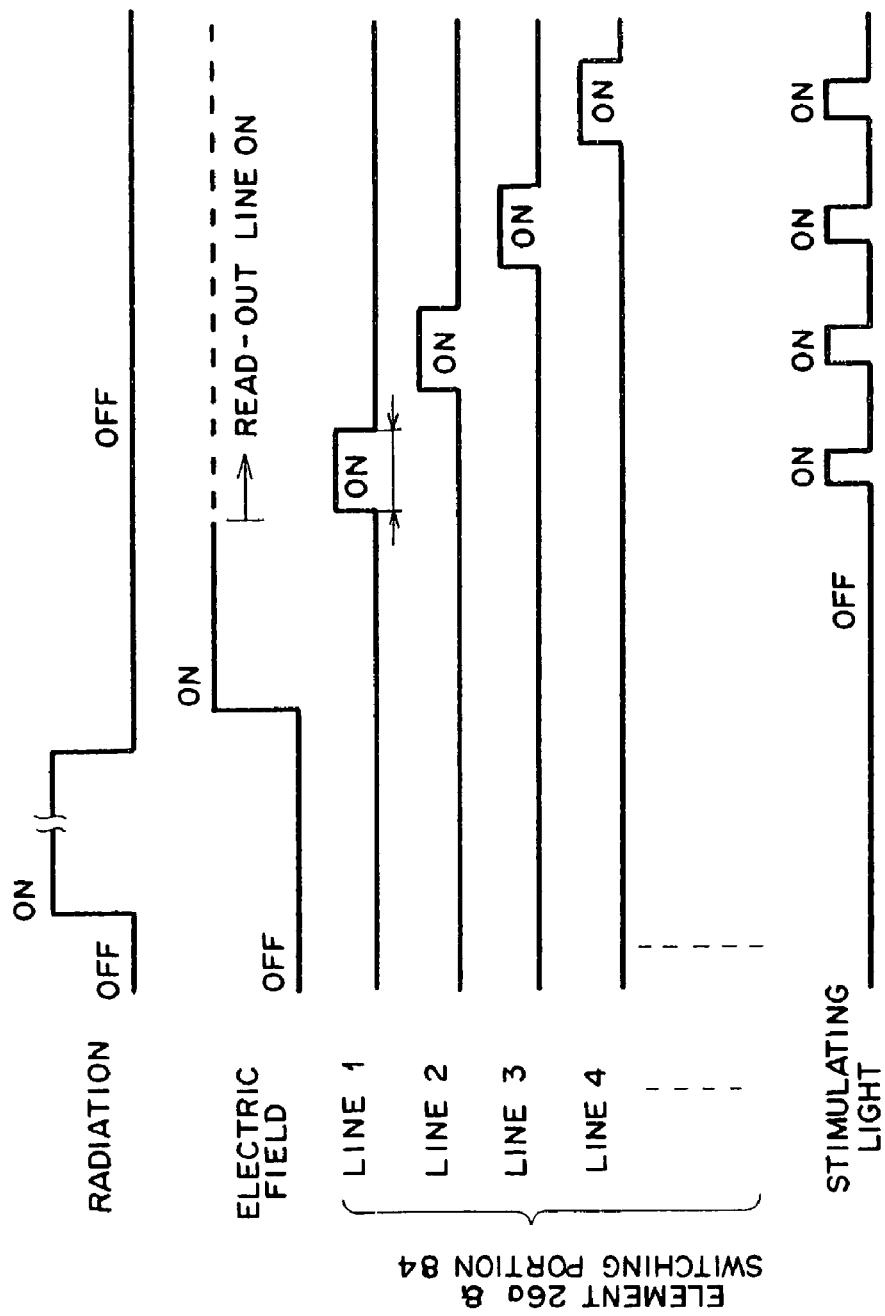
FIG. 4 is a timing chart for illustrating a method of recording a radiation image and reading out the same by use of the radiation image detecting sheet of the first embodiment.

The method of recording a radiation image of the object 9 on the image recording portion 10 and reading out the radiation image by the image read-out portion 20 in the radiation image recording and read-out system 110 will be described with reference to the timing chart shown in FIG. 4, hereinbelow.

When a radiation image is to be recorded on the image recording portion of the radiation image detecting sheet 1, the switch 83 is turned off so that an electric field is not applied to the photoconductive material layer 23 of the image read-out portion 20. Instead of turning off the switch 83, all the switch elements 84*a* of the switching portion 84 may be opened.

Then radiation L1 is flashed onto the entire area of the object 9 at one time so that recording light L2 bearing thereon a radiation image of the object 9, which is the radiation L1 passing through the object 9, is projected onto the first electrode layer 21 of the radiation image detecting sheet 1 for about one second. The recording light L2 passes through the image read-out section 20 of the radiation image detecting sheet 1 and impinges upon the stimulable phosphor layer 12. The stimulable phosphor layer 12 stores radiation energy in proportion to the intensity of the recording light L2, whereby a radiation image of the object 9 is stored on the image recording portion 10 of the radiation image detecting sheet 1.

Then the radiation L1 is stopped, and the switch 83 and all the switch elements 84*a* of the switching portion 84 are once closed so that an electric voltage is imparted between the first and second stripe electrodes 22 and 26 by way of the switch 83 and an imaginary short circuit of the operational amplifier 81*a*, and an electric field is applied to the photoconductive material layer 23.

Then the stimulating light L3 is moved in the longitudinal direction of the electrode elements 22*a* from one end thereof to the other end from electrode element 26*a* to electrode element 26*a* (sub-scanning) and is stopped at each electrode element 26*a* for 100 μsec. During the sub-scanning, the switch elements 84*a* are closed in sequence in response to the sub-scanning of the stimulating light L3 so that an electric voltage is imparted between the electrode element 26*a* of the second stripe electrode 22 corresponding to the read-out line (or several electrode elements 26*a* including the electrode element 26*a* corresponding to the read-out line) and all the electrode elements 22*a* of the first stripe electrode 22 with the switch elements 84*a* connected to the other electrode elements 26*a* kept open. With this arrangement, the distribution capacity established between the electrodes 22*a* and 26*a* are reduced and fixed noise is minimized. Further, since one current detecting amplifier 81 is connected to each electrode element 22*a*, and simultaneous read-out can be effected in the main scanning direction in which the electrode elements 22*a* are arranged, whereby the image read-out time can be shortened.

Since being red light whose wavelength is not shorter than 600 nm, the stimulating light L3 is hardly absorbed by the photoconductive material layer 23 whose major component is a-Se and almost the whole stimulating light L3 impinges upon the stimulable phosphor layer 12. The part of the stimulable phosphor layer 12 exposed to the stimulating light L3 emits blue stimulated emission L4 and the stimulated emission L4 impinges upon the photoconductive material layer 23. In the photoconductive material layer 23, positive and negative charges are produced upon exposure to the stimulated emission L4.

Further since a high electric field not lower than $10^6$V/cm has been applied between the electrode elements 22*a* and 26*a* corresponding to the read-out line and an avalanche amplification effect is generated, whereby generation of positive and negative charges in the photoconductive material layer 23 sharply increases. The quantum efficiency of the stimulable phosphor layer 12 is low and the stimulated emission L4 from the stimulable phosphor layer 12 is weak. Accordingly, the amount of charges (the number of signal photons) generated by exposure to the stimulated emission is small. However, by virtue of the avalanche amplification effect, generation of the charges is multiplied and a sufficiently strong signal can be obtained, whereby the S/N ratio can be increased.

Since an electric field has been applied to the photoconductive material layer 23, the negative charges transfer toward the electrode element 22*a* and the positive charges transfer toward the electrode element 26*a*.

The operation amplifiers 81*a* provided between the electrode elements 22*a* and 26*a* simultaneously detect currents generated by said transfer of the charges element 22*a* to element 22*a* in response to the sub-scanning of the stimulating light L3 and switching of the switch elements 84*a* of the switching portion 84, whereby an image signal is obtained. That is, an image signal representing the radiation image is obtained. Since the thickness of the photoconductive material layer 23 the major component of which is a-Se is set not smaller than 1 μm and not larger than 100 μm, the quantum efficiency to the blue stimulated emission, e.g., at 400 nm, can be higher, e.g., 60 to 70%, than that in a photomultiplier or an avalanche photodiode using Si. Further since the read-out is effected with an electric field such as to generate an avalanche amplification effect applied to the photoconductive material layer 23 and correction for compensating for fluctuation of the voltage of the power source is effected, the S/N ratio of the image can be greatly improved.

Further since fluctuation of the output data due to fluctuation of the voltage of the power source 82 is corrected by the data correction section and the ROM table 88, the output data can be stably obtained without being affected by fluctuation of the power source voltage, whereby the S/N ratio of the image signal can be further improved.

Further since the major component of the photoconductive material layer 23 is a-Se, the ratio of the sensitivity to the stimulated emission (near 400 nm) to that to the stimulating light (600 to 700 nm) can be sufficiently large. For example, in a state where no avalanche amplification effect is obtained, the ratio of the sensitivity to blue light (470 nm)

to that to red light (680 nm) is about 3.5 when the thickness of the a-Se layer is 10 μm. This value is very large as compared with that (ratio of 2) when a photomultiplier is employed as the photoelectric convertor means. As the thickness of the a-Se layer is smaller, the sensitivity to red light lowers and the blue/red sensitivity ratio increases and when an avalanche amplification effect is available, the blue/red sensitivity ratio further increases. Further, since Si is high in sensitivity to red light and low in sensitivity to blue light, Si is not suitable when the stimulated emission is blue.

Further since the photoconductive material layer 23 whose major component is a-Se and the stimulable phosphor layer 12 are integrated into a radiation image detecting sheet 1, the radiation image detecting sheet 1 can be in the form of a solid to be strong against impact. Further since the photoconductive material layer 23 whose major component is a-Se can be formed by low-temperature deposition process, a thin and large area radiation image detecting sheet 1 can be easily produced.

Further, since a stimulable phosphor layer 12 which does not store a dark latent image upon exposure to radiation is employed in the radiation image detecting sheet 1 and since the photoconductive material layer 23 of the image read-out portion 20 does not form a charge collecting portion where charges generated in the photoconductive material layer 23 collect, there does not arise a problem that a dark latent image is recorded due to a dark current even if an electric field is applied to the photoconductive material layer 23 during recording. In other words, the photoconductive material layer 23 can be very high in dark resistance (e.g., $10^{15}$ Ω·cm) as compared with a Si avalanche photodiode. Even if a dark current should be generated, the dark current is immediately discharged toward the current detecting amplifier 81 and the current detecting amplifier 81 discharges the current, whereby influence of a dark latent image can be avoided.

Further the photoconductive material layer 23 exhibits conductivity upon exposure not only to stimulated emission L4 but also to the recording light L2 or momentary light emitted from the stimulable phosphor layer 12 upon exposure to the recording light L2. Accordingly, by projecting the recording light L2 onto the radiation image detecting sheet 1 and introducing the recording light L2 and/or the momentary light into the photoconductive material layer 23 while applying an electric field to the photoconductive material layer 23 and by detecting charges generated in the photoconductive material layer 23, it is possible to obtain a preliminary read-out image signal bearing thereon a radiation image while recording the radiation image on the stimulable phosphor layer 12. The radiation image recording and read-out system 110 can be used as it is as a system for obtaining such a preliminary read-out image signal, for instance, by using the current detecting circuit 80 as a means for reading out the preliminary read-out image signal. The preliminary read-out image signal is used, for instance, for setting image processing conditions in a final read-out. Further, the preliminary read-out image signal can be used in place of a photo-timer to set the radiation projecting timing or to watch the amount of radiation.

When the radiation image recording and read-out system 110 is used as it is for preliminary read-out, one-dimensionally compressed information integrated in the longitudinal direction of the electrode element 22a is obtained from each current detecting amplifier 81 as preliminary read-out information, which cannot be constantly sufficient. In such a case, as shown in FIG. 5, by correcting the current detecting circuit 80 so that each electrode element 22a is directly connected to the inversion input terminal (−) and the noninversion input terminal (+) is grounded with the capacitor 81b and the like left as they are, and by inserting between ground and each electrode element 26a a signal detecting amplifier 281 comprising an operational amplifier 281a corresponding to the operational amplifier 81a, a discrete power source 282a corresponding to the power source 82, a switch element 284a corresponding to the switch element 84a and a resister 285 connected between the inversion input terminal (−) and the output terminal of the operational amplifier 281a, one-dimensionally compressed information integrated in the transverse direction of the electrode element 22a is obtained from each additional signal detecting amplifier 281 in addition to one-dimensionally compressed information integrated in the longitudinal direction of the electrode element 22a obtained from each current detecting amplifier 81. On the basis of two pieces of one-dimensionally compressed information, more detailed preliminary read-out information can be obtained.

When the preliminary read-out image signal is unnecessary at the time the final read-out is to be performed, the preliminary read-out image signal may be discharged. Further, the preliminary read-out image signal may be added to a final read-out image signal obtained by the final read-out.

Though, in the radiation image detecting sheet 1 of the first embodiment, the image recording portion 10 and the image read-out portion 20 are superposed with the stimulable phosphor layer 12 and the second electrode layer 25 facing each other and the recording light L2 and stimulating light L3 are projected from the side of the first electrode layer 21 of the image read-out portion 20, the recording light L2 and stimulating light L3 may be projected from the side of the base 11 of the image recording portion 10.

When the stimulating light L3 is projected from the side of the first electrode layer 21 of the image read-out portion 20, stimulated emission L4 emitted from the front side of the stimulable phosphor layer 12 can be detected and accordingly, an image of higher quality can be obtained as compared with when the stimulating light L3 is projected from the side of the base 11 of the image recording portion 10.

On the other hand, when the recording light L2 and stimulating light L3 are projected from the side of the base 11 of the image recording portion 10, they can impinge upon the stimulable phosphor layer 12 without passing through the stripe electrodes 22 and 26 of the image read-out portion 20 and accordingly there does not arise a problem of artifact due to the electrode matrix.

Further when the recording light L2 and stimulating light L3 are projected from the side of the base 11 of the image recording portion 10, a stimulating light cut filter can be inserted between the stimulable phosphor layer 12 and the second electrode layer 25 or between the second electrode layer 25 and the photoconductive material layer 23. Though it has been described that the red stimulating light L3 is hardly absorbed by the photoconductive material layer 23, actually the photoconductive material layer 23 has slight sensitivity to the stimulating light L3 bearing thereon no image information, and accordingly an offset current corresponding to weak charges generated by a slight amount of stimulating light L3 absorbed by the photoconductive material layer 23 is generated in the photoconductive material layer 23. When a stimulating light cut filter is inserted as described above, generation of such an offset current can be suppressed.

The image recording portion 10 and the image read-out portion 20 may be superposed with the stimulable phosphor layer 12 and the first electrode layer 21 facing each other.

Figure 6:
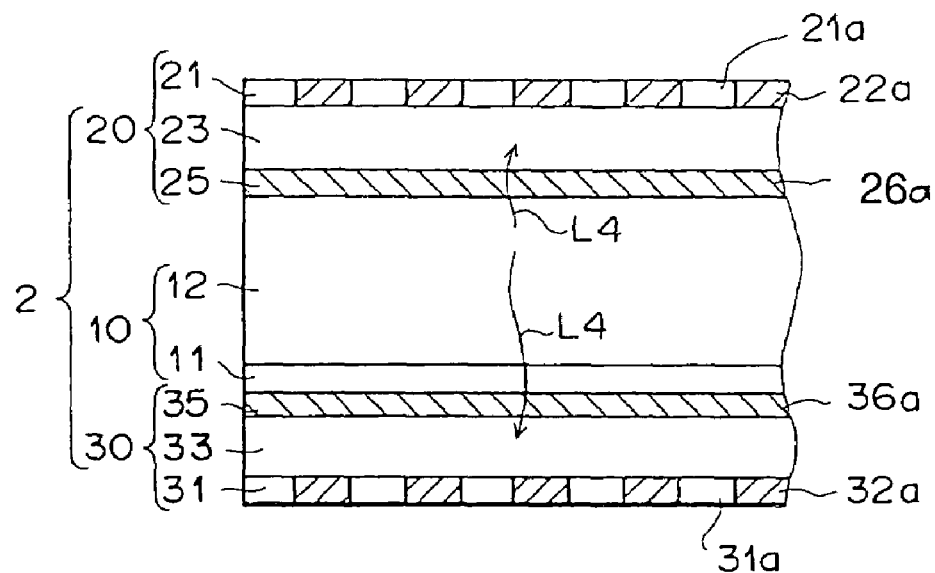
FIG. 6 is a schematic X-Z cross-sectional view showing a radiation image detecting sheet in accordance with a second embodiment of the present invention.

FIG. 6 shows a radiation image detecting sheet 2 in accordance with a second embodiment of the present invention. In the second and following embodiments, the elements analogous to those shown in FIGS. 1A to 1C are given the same reference numerals and will not be described.

The radiation image detecting sheet 2 of this embodiment differs from the radiation image detecting sheet 1 of the first embodiment in that another (second) image read-out portion 30 is provided on the base 11 of the radiation image detecting sheet 1 of the first embodiment. That is, the second image read-out portion 30 comprises a first electrode layer 31 (equivalent to the first electrode layer 21 of the first image read-out portion 20), a photoconductive material layer 33 (equivalent to the photoconductive material layer 23 of the first image read-out portion 20), and a second electrode layer 35, including electrode portion 36a, (equivalent to the second electrode layer 25 of the first image read-out portion 20) superposed one on another in this order, and is superposed on the base 11 with the second electrode layer 35 facing the base 11. The base 11 is transparent to the stimulated emission L4. The second image read-out portion 30 may be superposed on the base 11 with the first electrode layer 31 having electrode portions 31a, 32a facing the base 11.

As in the first embodiment, the material for forming the photoconductive material layer 23 should be a material which exhibits conductivity upon exposure not only to stimulated emission L4 but also to the recording light L2 or momentary light emitted from the stimulable phosphor layer 12 upon exposure to the recording light L2 when preliminary read-out is to be effected simultaneously with recording an image.

The radiation image detecting sheet 2 of this embodiment is employed in a radiation image recording and read-out system which is equivalent to the aforesaid system 110 plus a current detecting circuit, equivalent to the current detecting circuit 80, for the second image read-out portion 30. That is, in the radiation image recording and read-out system for the radiation image detecting sheet 2 of this embodiment, the stimulated emission L4 is detected by both the image read-out portions 10 and 30, whereby a pair of image signals on the basis of stimulated emission L4 from one stimulable phosphor layer 12 are separately obtained. When the two image signals thus obtained are digitized and the two digital image signals thus obtained are added together to obtain an addition image signal, the S/N ratio can be improved. Also in this case, the photoconductive material layer 23 is applied with an electric field such as to generate an avalanche amplification effect in the photoconductive material lay 23. By virtue of the avalanche amplification effect, the amount of charges to be generated is increased, whereby a sufficiently large image signal can be obtained and the S/N ratio can be improved. The S/N ratio can be further improved by effecting the correction for compensating for fluctuation of the voltage of the power source as described above in conjunction with the first embodiment.

Further, by obtaining a pair of preliminary read-out image signals by the pair of current detecting circuits 80 and adding together the preliminary read-out image signals, a preliminary read-out image signal excellent in S/N ratio can be obtained.

Further also in the radiation image detecting sheet 2 of this embodiment, a stimulating light cut filter may be provided. For example, when the stimulating light L3 is to be projected from the second image read-out portion side, the first image read-out portion 20 can be provided with an offset current suppressing effect by inserting a stimulating light cut filter between the stimulable phosphor layer 12 and the second electrode layer 25 or between the second electrode layer 25 and the photoconductive material layer 23. When the stimulating light L3 is to be projected from the first image read-out portion side, the second image read-out portion 30 can be provided with an offset current suppressing effect by inserting a stimulating light cut filter between the stimulable phosphor layer 12 and the base 11 or between the base 11 and the second electrode layer 35 of the second image read-out portion 30, or by coloring the base 11 in a color which absorbs the stimulating light L3.

Figure 7:
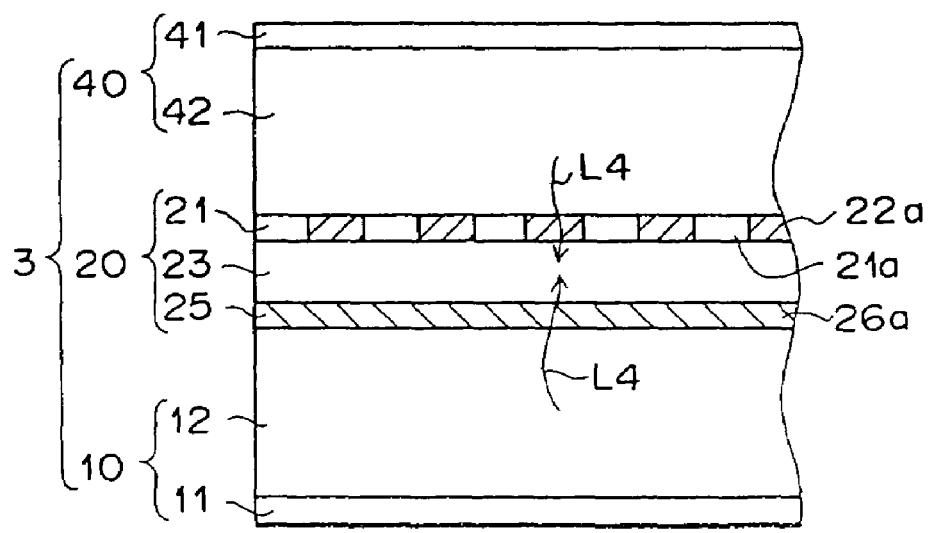
FIG. 7 is a schematic X-Z cross-sectional view showing a radiation image detecting sheet in accordance with a third embodiment of the present invention.

FIG. 7 shows a radiation image detecting sheet 3 in accordance with a third embodiment of the present invention.

The radiation image detecting sheet 3 of this embodiment differs from the radiation image detecting sheet 1 of the first embodiment in that another (second) image recording portion 40 is provided on the first electrode layer 21 of the radiation image detecting sheet 1 of the first embodiment. That is, the second image recording portion 40 comprises a base 41 (equivalent to the base 11 of the first image recording portion 10), and a stimulable phosphor layer 42 (equivalent to the stimulable phosphor layer 12 of the first image recording portion 10), and is superposed on the first electrode layer 21 with the stimulable phosphor layer 42 facing the first electrode layer 11. The first electrode layer 21 is transparent to the stimulated emission L4 emitted from the stimulable phosphor layer 42. The second image recording portion 40 may be superposed on the first electrode layer 21 with the base 41 facing the first electrode layer 21.

The radiation image detecting sheet 3 of this embodiment can be employed in the aforesaid system 110 as it is. Further, a stimulating light cut filter may be inserted between the stimulable phosphor layer 12 and the second electrode layer 25 or between the second electrode layer 25 and the photoconductive material layer 23 and another stimulating light cut filter may be inserted between the stimulable phosphor layer 42 and the first electrode layer 21 or between the first electrode layer 21 and the photoconductive material layer 23 so that stimulating light for the stimulable phosphor layer 12 and that for the stimulable phosphor layer 42 are separately projected to the corresponding stimulable phosphor layers from outside the image recording portions 10 and 40.

Since an image signal is obtained on the basis of the stimulated emission from both the stimulable phosphor layers 12 and 42, the image signal can be high in the S/N ratio. Further a preliminary read-out image signal which is high in the S/N ratio can be obtained.

FIGS. 8A to 8C show a radiation image detecting sheet 4 in accordance with a fourth embodiment of the present invention.

The radiation image detecting sheet 4 of this embodiment differs from the radiation image detecting sheet 1 of the first embodiment in that the stripe electrode 26 of the second electrode layer 25 in the radiation image detecting sheet 1 of the first embodiment is changed to a flat electrode 26c. Also the radiation image detecting sheet 4 can be modified by adding one or more image recording portion or image read-out portion in the manner described above in conjunction with the second and third embodiments.

The radiation image recording and read-out system using the radiation image detecting sheet 4 of this embodiment may be substantially the same as the radiation image recording and read-out system 110 shown in FIGS. 2 and 3 except that the switching portion 84 of the current detecting circuit 80 is removed and the flat electrode 26c is directly connected to the negative pole of the power source 82.

When the radiation image detecting sheet 4 of this embodiment is employed, the image signal can be obtained without affected by switching noise which can be generated in the radiation image detecting sheet 1 of the first embodiment when the switch elements 84a are switched. Further since the electrode 22 of the first electrode layer 21, which is the main electrode layer for detecting the charges, divided by picture element pitch so that each electrode element 22a is in one-to-one correspondence with one picture element, the area of each electrode element 22a is greatly reduced, whereby the dark current and the output capacity are suppressed. Accordingly, dark current noise and/or capacity noise are reduced and the S/N ratio of the image can be improved.

Figure 9A:
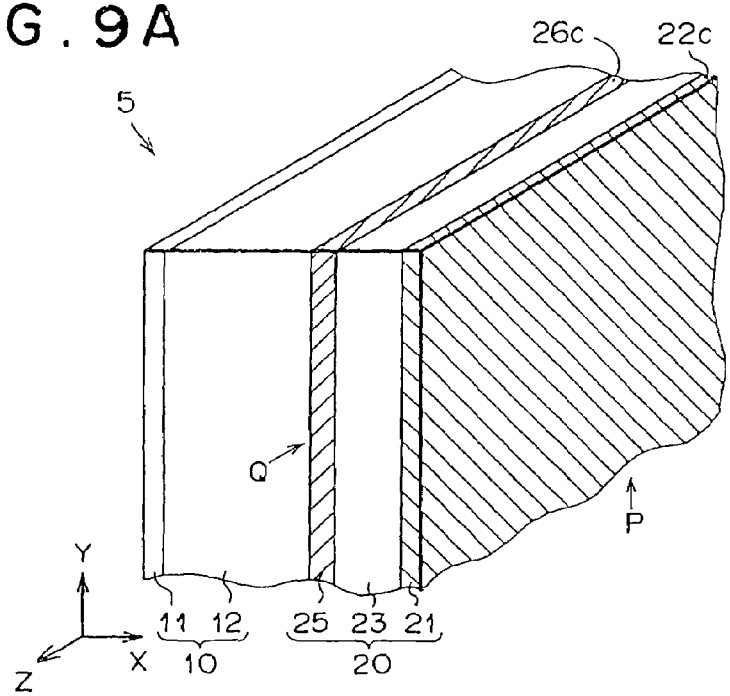
FIG. 9A is a schematic perspective showing a radiation image detecting sheet in accordance with a fifth embodiment of the present invention.
Figure 9B:
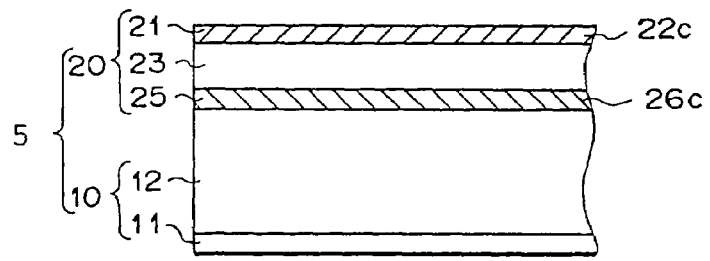
FIG. 9B is a X-Y cross-sectional view of a part of the radiation image detecting sheet indicated by arrow P in FIG. 9A.
Figure 9C:
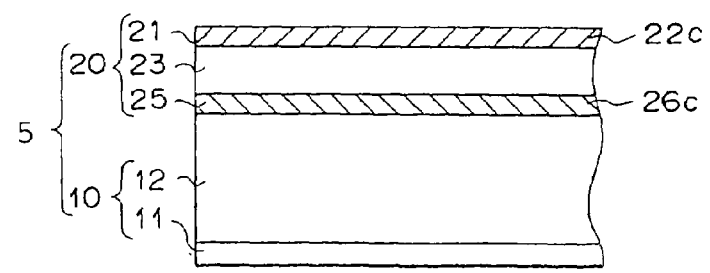
FIG. 9C is a X-Z cross-sectional view of a part of the radiation image detecting sheet indicated by arrow Q in FIG. 9A.

FIGS. 9A to 9C show a radiation image detecting sheet 5 in accordance with a fifth embodiment of the present invention.

The radiation image detecting sheet 5 of this embodiment differs from the radiation image detecting sheet 1 of the first embodiment in that the stripe electrode 22 of the first electrode layer 21 and the stripe electrode 26 of the second electrode layer 25 in the radiation image detecting sheet 1 of the first embodiment are changed to flat electrodes 22c and 26c. Also the radiation image detecting sheet 5 can be modified by adding one or more image recording portion or image read-out portion in the manner described above in conjunction with the second and third embodiments.

FIG. 10 shows a radiation image recording and read-out system 120 using the radiation image detecting sheet 5 of this embodiment.

The radiation image recording and read-out system 120 mainly differs from that 110 shown in FIGS. 2 and 3 in that the former 120 is provided with a current detecting circuit 80a including only one current detecting amplifier 81 whereas the current detecting circuit 80 of the latter includes a plurality of current detecting amplifiers 81 one for each electrode element 22a. Further as in the fourth embodiment, the switching portion 84 of the current detecting circuit 80 is removed and the flat electrode 26c is directly connected to the negative pole of the power source 82.

Further in the radiation image recording and read-out system 120, a stimulating light projecting means 93 having a stimulating light source 93a which emits a red spot beam (not shorter than 600 nm) L3' is employed in place of the stimulating light projecting means 92 having a stimulating light source 92a which emits a linear beam. The stimulating light projecting means 93 causes the spot beam L3' to two-dimensionally scan the flat electrode 22a over the entire area thereof. The stimulating light projecting means 93 may comprise, for instance, a known laser beam scanning optical system. Further, the stimulating light source 93a may comprise a plurality of small point sources such as of liquid crystals or organic EL's which are two-dimensionally arranged to form an area light source, and the stimulating light projecting means 93 may be a means for energizing the point sources in sequence. Such an area light source formed of a number of point sources may be formed integrally with the radiation image detecting sheet 5. The stimulating light L3' may be either a continuous beam or a pulse beam.

The method of reading out a radiation image stored on the image recording portion 10 of the radiation image detecting sheet 5 will be described hereinbelow on only the difference from that when the radiation image detecting sheet 1 is employed. A radiation image is recorded on the radiation image detecting sheet 5 in the same manner as the radiation image detecting sheet 1.

When reading out a radiation image from the radiation image detecting sheet 5, the switch 83 is first turned so that an electric voltage is imparted between the flat electrodes 22c and 26c by way of an imaginary short circuiting of the operational amplifier 81, thereby applying an electric field to the photoconductive material layer 23.

Then, with the electric field kept applied to the photoconductive material layer 23, the stimulating light L3' in the form of a spot beam is caused to scan the flat electrode 22c over the entire area thereof.

Upon exposure to the stimulating light L3', parts of the stimulable phosphor layer 12 emit stimulated emission L4 in proportion to the stored radiation energy and the stimulated emission L4 impinges upon the photoconductive material layer 23 to produce positive and negative charges in the photoconductive material layer 23.

Then by detecting an electric current flows through the imaginary short circuiting of the operational amplifier 81a by the current detecting amplifier 81, an image signal representing the radiation image is obtained.

When the electric field applied to the photoconductive material layer 23 is not lower than $10^6$V/cm, an avalanche amplification effect is obtained and a sufficiently large image signal can be obtained.

Though radiation image detecting sheets in accordance with several embodiments of the present invention and the radiation image recording and read-out system in which the radiation image detecting sheets can be suitably used are described above, the radiation image detecting sheets and the radiation image recording and read-out system can be variously modified, for instance, as follows.

stimulable phosphor layer
stimulated emission: not longer than 500 nm

| | |
|---|---|
| number of layers | 1, 2, . . . |
| formed on | 1st electrode layer, 2nd electrode layer |
| photoconductive material layer (a-Se) | |
| number of layers | 1, 2, . . . |
| formed on | surface of the stimulable phosphor layer, base |
| first electrode layer | |
| stripe electrode, flat electrode | |
| second electrode layer | |
| stripe electrode, flat electrode | |
| direction of incidence of radiation | |
| from the image recording side, from the image read-out side | |
| stimulating light (not shorter than 600 nm) | |
| | line beam, spot beam |
| direction of incidence | from the image recording side, from the image read-out side |
| | continuous beam, pulse beam |
| stimulating light cut filter | |
| provided, not provided | |

The variations of the respective elements shown above may be combined in any manner. Further, the radiation and the stimulating light of the radiation image recording and read-out system may be variously modified according to the radiation image detecting sheet to be used. For example, when a radiation image detecting sheet in which a pair of image recording portions are provided with an energy absorbing member interposed therebetween and a pair of image read-out portions are provided to separately receive the stimulated emission from the image recording portions is used, energy subtraction processing can be carried out.

The elements may be variously modified other than the variations listed above. For example, the base of the image recording portion may be removed and the stimulable phosphor layer may be formed on the image read-out portion. In any modification, a high electric field (e.g., not lower than $10^6$V/cm) is applied to the photoconductive material layer so that an avalanche amplification effect is generated and the S/N ratio is improved. Further, in any modification, the material for forming the photoconductive material layer 23 should be a material which exhibits conductivity upon exposure not only to stimulated emission L4 but also to the recording light L2 or momentary light emitted from the stimulable phosphor layer 12 upon exposure to the recording light L2 when preliminary read-out is to be effected simultaneously with recording an image.

Further, though, in the description above, the image recording portion and the image read-out portion or the stimulable phosphor layer and the solid image sensor are integrated into a unit, they may be separate from each other. For example, a stimulable phosphor sheet and a solid image sensor having the substantially same area may be opposed to each other at a space from each other. As the stimulating light source, a line source or a point source may be employed according to the form of the electrode. Of course, image read-out is effected with an electric field such as to generate an avalanche amplification effect applied to the photoconductive material layer.

The image recording portion or the solid image sensor can be employed as the photoelectric convertor means in known systems for reading out a radiation image from a stimulable phosphor sheet where a photomultiplier is generally employed as the photoelectric convertor means.

Figure 11A:
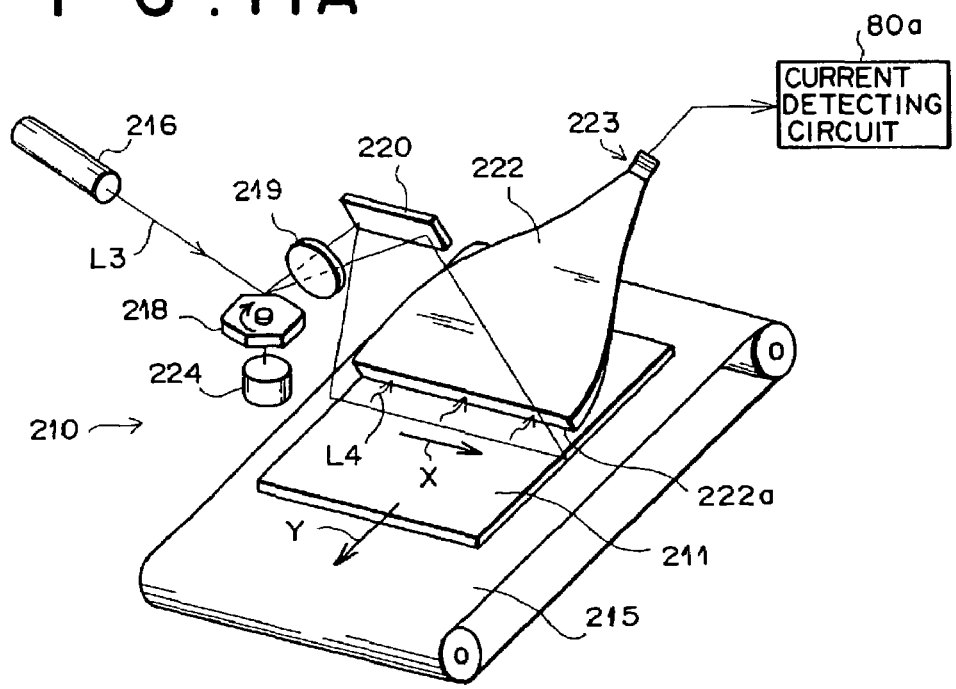
FIG. 11A is a schematic perspective view showing a radiation image read-out system in accordance with a sixth embodiment of the present invention.
Figure 11B:
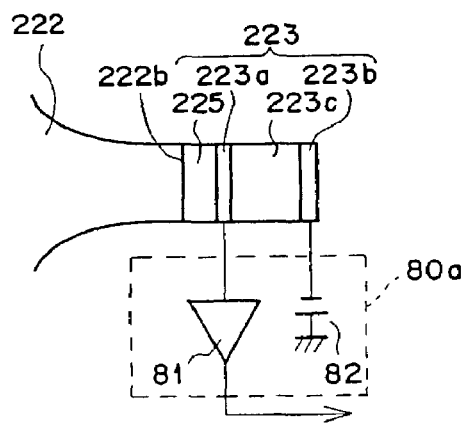
FIG. 11B is a fragmentary cross-sectional view showing the solid image sensor employed in the radiation image read-out system in accordance with the sixth embodiment of the present invention.

FIGS. 11A and 11B show a radiation image read-out system 210 employing a solid image sensor in accordance with the present invention as a photoelectric convertor means. The radiation image read-out system 210 is substantially the same as that disclosed in our Japanese Unexamined Patent Publication Nos. 55(1980)-12492 and 56(1981)-11395 except that a solid image sensor 223 of the present invention is employed in place of a photomultiplier as the photoelectric convertor means. The stimulable phosphor layer of the stimulable phosphor sheet and the stimulating light may be the same as those in the first embodiment.

As shown in FIG. 11B, the solid image sensor 223 comprises a pair of flat electrodes 223a and 223b and a photoconductive material layer 223c sandwiched between the electrodes 223a and 223b and functions as a zero-dimensional sensor. A light guide 222 is disposed to collect stimulated emission L4 emitted from a stimulable phosphor sheet 211 and the stimulated emission L4 enters the light guide 222 through its light inlet end face 222a and is guided to its light outlet end faces 222b in total reflection. The solid image sensor 223 is mounted on the light outlet end face 222b of the light guide 222, and a stimulating light cut filter 225 is disposed between the light outlet end face 222b and the electrode 223a on the side of the light outlet end face 222b. Since the photoconductive material layer 223c is low in sensitivity to the red stimulating light not shorter than 600 nm as described above, the stimulating light cut filter 225 may be thinner as compared with when a photomultiplier is employed. The flat electrode 223a on the side of the light outlet end face 222b is made of a transparent conductive film such as an ITO film so that the stimulated emission L4 can impinge upon the photoconductive material layer 223c. The other flat electrode 223b need not be transparent and may be of, for instance, aluminum. The major component of the photoconductive material layer 223c is a-Se and the stimulated emission L4 is blue light not longer than 500 nm. The size (detecting area) of the photoconductive material layer (a-Se photoconductive film) 223c should be sufficiently smaller than the size of the stimulable phosphor sheet 211. For example, when the size of the stimulable phosphor sheet 211 is 430 mm×430 mm, the size of the photoconductive material layer 223c should be not larger than 50 mm×50 mm. When the area of the photoconductive material layer 223c is small, generation of an excessive dark current can be avoided and load capacity is reduced, whereby the S/N ratio can be improved as compared with when the radiation image detecting sheet 1, where the stimulable phosphor layer 12 and the photoconductive material layer 23 are of substantially the same area, is employed. The thickness of the photoconductive material layer 223c is preferably not smaller than 1 μm and not larger than 100 μm, and more preferably not smaller than 10 μm and not larger than 50 μm so that the photoconductive material layer 223c absorbs a sufficient amount of stimulated emission L4, an avalanche amplification effect can be obtained and the fixed noise is suppressed. The voltage of the power source 82 is set so that the potential gradient in the photoconductive material layer 223c becomes not lower than $10^6$V/cm and an avalanche amplification effect is generated in the photoconductive material layer 223c.

The stimulable phosphor sheet 211 is placed on a sheet conveyor means 215 such as an endless belt and is conveyed in the direction of arrow Y (sub-scanning). A laser beam L3 (stimulating light) emitted from a laser 216 is deflected by a rotary polygonal mirror 218 driven at a high speed by an electric motor 224 and travels through a condenser lens 219 such as an fθ lens. Then the laser beam L3 is reflected by a mirror 220 to scan the stimulable phosphor sheet 211 in the direction of arrow X (main scanning) which is substantially perpendicular to the sub-scanning direction. Parts of the stimulable phosphor sheet 211 exposed to the laser beam L3 emits stimulated emission L4 in proportion to stored radiation energy. The stimulated emission L4 enters the light guide 222 through the light inlet end face 222a and travels through the light guide 222 repeating total reflection to impinge upon the solid image sensor 223. Then charges according to the amount of the stimulated emission L4 are generated in the photoconductive material layer 223c of the solid image sensor 223 in the same manner as described above, and the charges are detected by the current detecting circuit 80a as an image signal.

Since the solid image sensor 223 can be smaller in both weight and size as compared with the photomultiplier, the overall radiation image read system 210 can be smaller in weight and size.

Figure 12A:
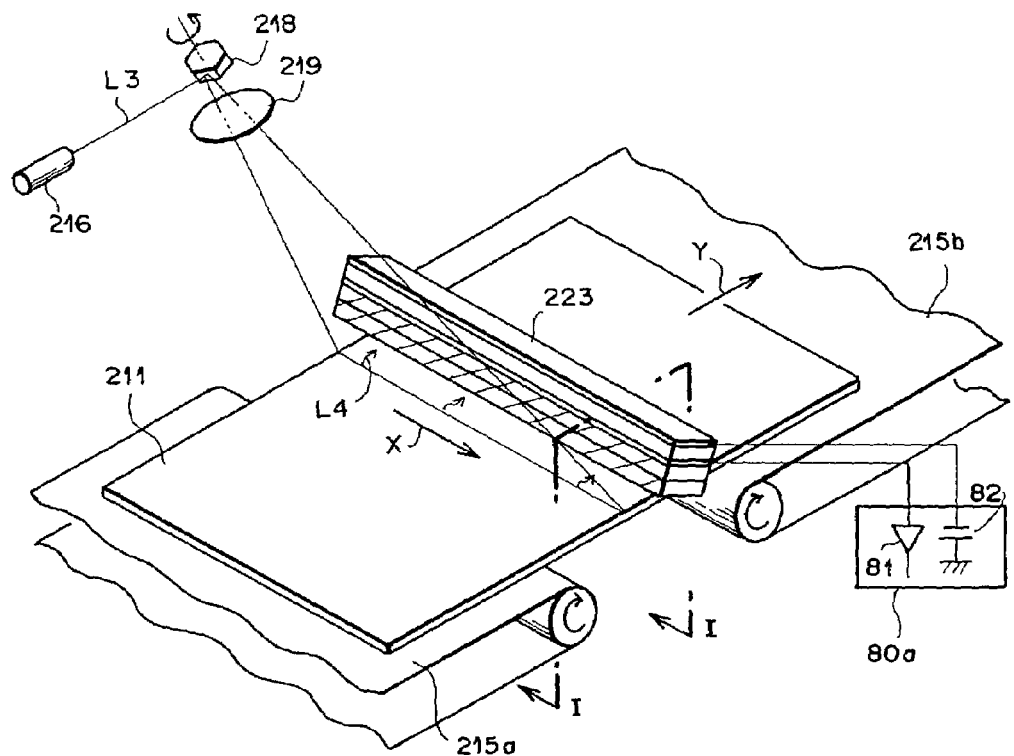
FIG. 12A is a schematic perspective view showing a radiation image read-out system in accordance with a seventh embodiment of the present invention.
Figure 12B:
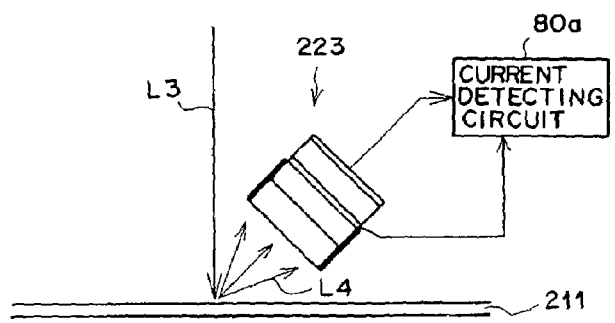
FIG. 12B is a fragmentary cross-sectional view taken along line I—I in FIG. 12A.

In the embodiment shown in FIGS. 12A and 12B, a long solid image sensor 223 is employed. In FIGS. 12A and 12B, a stimulable phosphor sheet 211 is placed on a pair of endless belts 215a and 215b which are driven by an electric motor (not shown). A laser 216 which emits a laser beam L3 as the stimulating light, a rotary polygonal mirror 218 which is rotated by an electric motor (not shown) to deflect the laser beam L3 and a scanning lens (fθ lens) 219 which converges the laser beam L3 deflected by the polygonal mirror 218 onto the surface of the stimulable phosphor sheet 211 and causes the leaser beam L3 to scan the stimulable phosphor sheet 211 at a constant speed in the main scanning direction shown by arrow X are disposed above the stimulable phosphor sheet 211. The laser beam L3 scans the stimulable phosphor sheet 211 in the main scanning direction while the stimulable phosphor sheet 211 is conveyed in the sub-scanning direction shown by arrow Y by the endless belts 215a and 215b, thereby two-dimensionally scanning the entire surface of the stimulable phosphor sheet 211.

A long solid image sensor 223 is disposed above the stimulable phosphor sheet 211 along the portion scanned by the laser beam L3 and receives stimulated emission L4. Then an image signal representing the radiation image stored on the stimulable phosphor sheet 211 is detected by the current detecting circuit 80a.

As shown in FIGS. 13A and 13B, the solid image sensor 223 comprises a glass substrate 226, a pair of long electrodes 223a and 223b and a long photoconductive material layer 223c sandwiched between the electrodes 223a and 223b. The electrode pairs may comprise flat electrodes. The photoconductive material layer 223c exhibits conductivity upon exposure to the stimulated emission L4 which impinges upon the photoconductive material layer 223c through the glass substrate 226. The solid image sensor 223 functions as a zero-dimensional sensor though large in length. The length of the photoconductive material layer 223c is substantially the same as the dimension of the stimulable phosphor sheet 211 in the main scanning direction. The width of the photoconductive material layer (a-Se photoconductive film) 223c should be sufficiently smaller than the size of the stimulable phosphor sheet 211. For example, when the size of the stimulable phosphor sheet 211 is 430 mm×430 mm, the width of the photoconductive material layer 223c should be not larger than 50 mm. When the area of the photoconductive material layer 223c is small, generation of an excessive dark current can be avoided and load capacity is reduced, whereby the S/N ratio can be improved as compared with when the radiation image detecting sheet 1, where the stimulable phosphor layer 12 and the photoconductive material layer 23 are of substantially the same area, is employed. A stimulating light cut filter 225 is disposed on the light inlet side of the glass substrate 226 (the side of the glass substrate 226 remote from the flat electrode 223a) and the side surface of the glass substrate 226 and the stimulating light cut filter 225 is covered with a light-shielding member 227. Since the photoconductive material layer 223c is low in sensitivity to the red stimulating light not shorter than 600 nm as described above, the stimulating light cut filter 225 may be thinner as compared with when a photomultiplier is employed. The electrode 223a through which the stimulated emission L4 enters the photoconductive material layer 223c is made of a transparent conductive film such as an ITO film so that the stimulated emission L4 can impinge upon the photoconductive material layer 223c. As in the embodiment shown in FIGS. 11A and 11B, the photoconductive material layer 223c includes a-Se as the major component and the thickness of the photoconductive material layer 223c is preferably not smaller than 1 μm and not larger than 100 μm, and more preferably not smaller than 10 μm and not larger than 50 μm. The potential gradient in the photoconductive material layer 223c is set not lower than $10^6$V/cm so that an avalanche amplification effect is generated in the photoconductive material layer 223c. The solid image sensor 223 may be formed to have a cylindrical light inlet end face as shown in FIG. 13B.

The long solid image sensor 223 can be smaller both in weight and size as compared with a long photomultiplier which has been conventionally employed, and accordingly the overall radiation image read system can be smaller in weight and size when the long solid image sensor 223 is employed in place of the long photomultiplier. Further, the long solid image sensor 223 such as 17 inches long can be easily produced at a lower cost than a long photomultiplier or a long Si avalanche photodiode.

The solid image sensor 223 shown in FIG. 13A or 13B can be variously employed as the photoelectric convertor means in a radiation image read-out system using a stimulable phosphor sheet as shown in FIGS. 14A to 14C.

In the example shown in FIG. 14A, an elongated cylindrical mirror 235 is provided to reflect stimulated emission L5, which travels away from the solid image sensor 223, toward the solid image sensor 223. The cylindrical 235 is held by a mirror mount 236 to extend in the direction of arrow X, i.e., in the main scanning direction and is opposed to the light inlet end face 225a of the stimulating light cut filter 225 of the solid image sensor 223 so that the stimulated emission L5 can be effectively introduced into the solid image sensor 223.

In the example shown in FIG. 14B, a pair of solid image sensors 223 are disposed on opposite sides of the portion of the stimulable phosphor sheet 211 along which the stimulating light L3 scans the stimulable phosphor sheet 211. A pair of image signals are detected by a pair of current detecting circuits 80a respectively connected to the solid image sensors 223, and the image signals are added by an adder 89 into an addition image signal, whereby the detecting efficiency is increased and the S/N ratio is improved.

In the example shown in FIG. 14C, an elongated cylindrical mirror 235 is provided to reflect stimulated emission L5, which travels away from the solid image sensor 223, toward the solid image sensor 223 as in the example shown in FIG. 14A and at the same time, another solid image sensor 223 is provided to detect stimulated emission L6 emitted downward from the lower surface of the stimulable phosphor sheet 211. A pair of image signals are detected by a pair of current detecting circuits 80a respectively connected to the solid image sensors 223, and the image signals are added by an adder 89 into an addition image signal, whereby the S/N ratio is improved.

FIG. 15 shows a modification of the solid image sensor. The solid image sensor 223 shown in FIG. 15 comprises a pair of solid image sensor elements 223d, provided on a single elongated glass substrate 226 spaced from each other in the transverse direction of the glass substrate 226. Each solid image sensor element 223d comprises a pair of elongated flat electrodes 223a and 223b and an elongated photoconductive material layer 223c sandwiched between the electrodes 223a and 223b, and is positioned on the glass substrate 226 with the flat electrode 223b in contact with the glass substrate 226. Each solid image sensor element 223d is basically the same as the solid image sensor 223 shown in FIG. 13A and a stimulating light cut filter 225 is provided on the flat electrode 223a through which the stimulated emission L4 impinges upon the photoconductive material layer 223c. When a radiation image is to be read out by use of the solid image sensor 223 shown in FIG. 15, the stimulating light L3 is caused to scan the stimulable phosphor sheet 211 through the glass substrate 226 between the solid image sensor elements 223d and then the stimulated emission L4 emitted from the surface of the stimulable phosphor sheet 211 is detected by both the solid image sensor elements 223d. A pair of image signals are detected by a pair of current detecting circuits 80a respectively connected to the solid image sensor elements 223d as in the example shown in FIG. 14B, and the image signals are added by an adder 89 into an addition image signal, whereby the S/N ratio is improved. This modification is advantageous over the example shown in FIG. 14B in that the solid image sensor elements 223d can be disposed nearer to the stimulable phosphor sheet 211 than the pair of solid image sensors 235 shown in FIG. 14B and accordingly the detecting efficiency and/or the S/N ratio can be further improved.

The solid image sensor of the present invention may be a line sensor. A solid image sensor in the form of a line sensor will be described with reference to FIGS. 16A and 16B, hereinbelow.

Figure 16A:
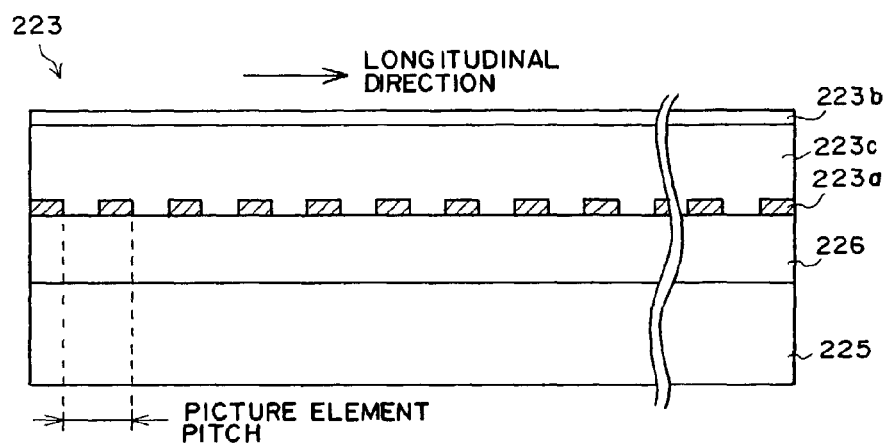
FIG. 16A is a cross-sectional view taken along the main scanning line of a solid image sensor in accordance with an eighth embodiment of the present invention which is in the form of a line sensor.
Figure 16B:
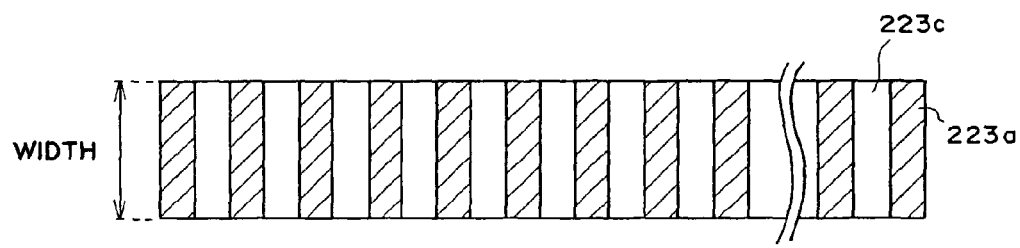
FIG. 16B is a horizontal cross-sectional view showing an electrode of the solid image sensor shown in FIG. 16A.

The solid image sensor 223 shown in FIGS. 16A and 16B is substantially the same as the solid image sensor shown in FIG. 12A except that the flat electrode 223a is divided into a plurality elements arranged in the longitudinal direction of the electrode 223a. The other flat electrode 223b is left continuous. Specifically the elements of the flat electrode 223a are arranged in pitches equal to the picture element pitches and each of the elements is not larger than the picture element pitches in the longitudinal direction of the electrode 223a. In this specification, this will be expressed as "the electrode is divided by picture element pitches".

Figure 17A:
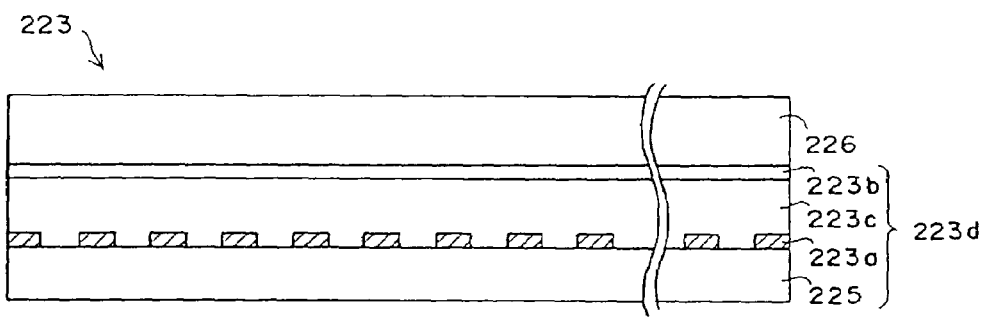
FIG. 17A is a cross-sectional view taken along the main scanning line of a solid image sensor in accordance with ninth embodiment of the present invention which is in the form of a line sensor.
Figure 17B:
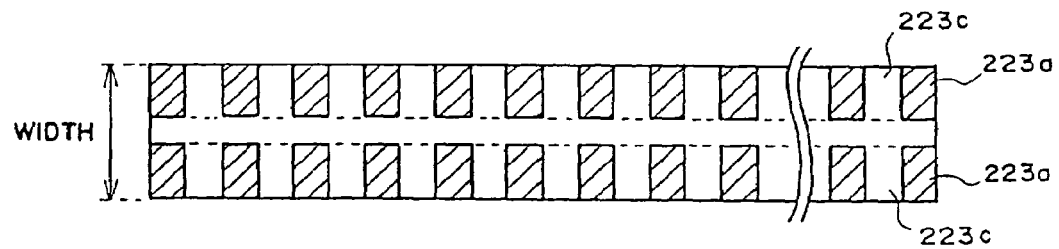
FIG. 17B is a horizontal cross-sectional view showing an electrode of the solid image sensor shown in FIG. 17A, FIGS. 18A to 18D are views showing various examples of using the solid image sensor in the form of a line sensor.

The solid image sensor 223 shown in FIGS. 17A and 17B is substantially the same as the solid image sensor shown in FIG. 15 except that each of the flat electrodes 223a is divided into picture elements. The other flat electrode 223b is left continuous.

In the solid image sensors shown in FIGS. 16A and 16B and 17A and 17B, each of the electrode elements should be sufficiently small in width as compared with the size of the stimulable phosphor sheet 211 (e.g., 430 mm×430 mm) and should be, for instance, not larger than 50 mm. Thus, each of the solid image sensors can be used as a one-dimensional sensor (line sensor) in which a plurality of small solid image sensor elements are arranged in a row. Each of the small solid image sensor elements are connected to a current detecting amplifier similar to that shown in FIG. 3.

When image read-out is effected by use of the line sensor shown in FIGS. 16A and 16B or 17A and 17B, the line sensor is positioned in the same manner as the solid image sensor 223 shown in FIG. 12A, and a line source such as a fluorescent lamp, a cold cathode fluorescent lamp, an organic EL array or a LED array which projects a line beam onto the stimulable phosphor sheet 211 while the stimulable phosphor sheet 211 is moved in the sub-scanning direction may be used as the stimulating light source or a point light source which two-dimensionally scan the stimulable phosphor sheet 211 while the stimulable phosphor sheet 211 is moved in the sub-scanning direction may be used as the stimulating light source. The electrode element 223a of each solid image sensor element is connected to a current detecting amplifier and image signals can be simultaneously read out in the main scanning direction in which the solid image sensor elements are arranged, whereby the read-out time is shortened.

Figure 18A:
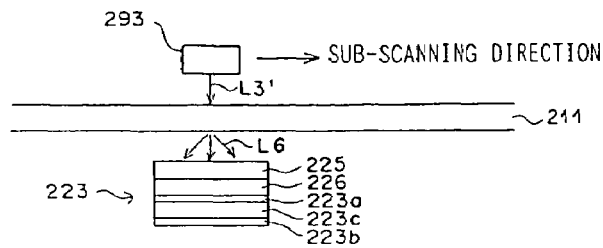

When a line light source 293 such as an organic EL array or a LED array is disposed on one side of the stimulable phosphor sheet 211 and the solid image sensor in the form of a line sensor is disposed on the other side of the stimulable phosphor sheet 211 as shown in FIG. 18A, the overall system can be very small in height. The solid image sensor in the form of a line sensor such as 17 inches long can be easily produced at a lower cost than a line sensor formed of Si avalanche photodiodes or the like.

Figure 18B:
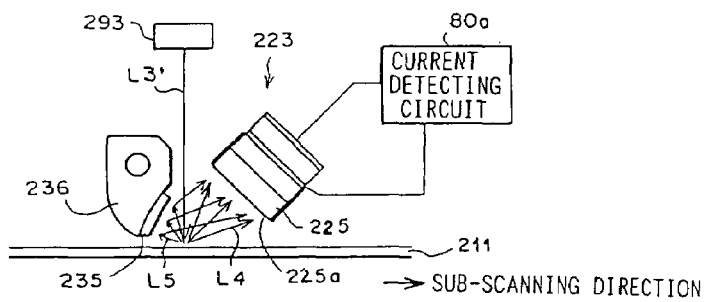
Figure 18C:
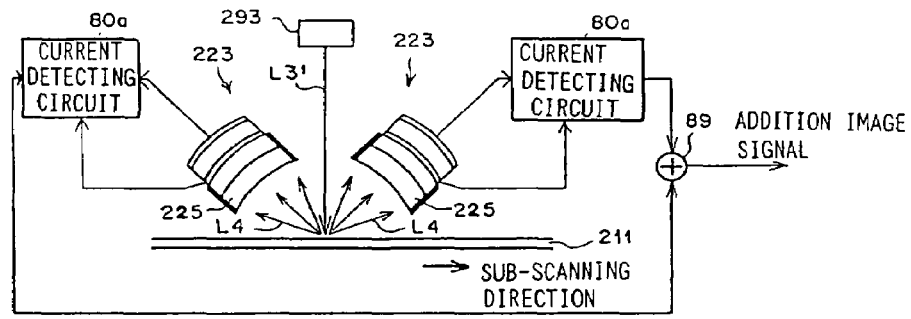
Figure 18D:
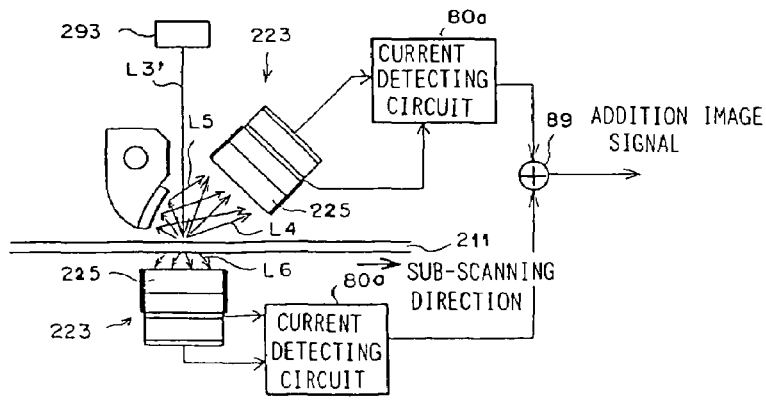

Other examples of using the solid image sensor in the form of a line sensor are shown in FIGS. 18B to 18D. The examples shown in FIGS. 18B to 18D are basically the same as those shown in FIGS. 14A to 14C except that the solid image sensor is a line sensor.

The solid image sensor in the form of a line sensor having a pair of arrays of solid image sensor elements shown in FIGS. 17A and 17B may be employed in the manner shown in FIG. 19A. Further, a solid image sensor in the form of a line sensor shown in FIGS. 16A and 16B may be added to the arrangement shown in FIG. 19A as shown in FIG. 19B. With the arrangement shown in FIG. 19B, three image signals can be obtained and by adding the three image signals to a single addition image signal, the S/N ratio can be further improved. The long solid image sensor in the form of a zero-dimensional sensor shown in FIG. 15 may be employed in the arrangement shown in FIG. 19B in place of the solid image sensor in the form of a line sensor having a pair of arrays of solid image sensor elements shown in FIGS. 17A and 17B with the additional line sensor changed to the zero-dimensional sensor shown in FIG. 13A.

A radiation image read-out system in accordance with a tenth embodiment of the present invention will be described, hereinbelow.

Figure 20A:
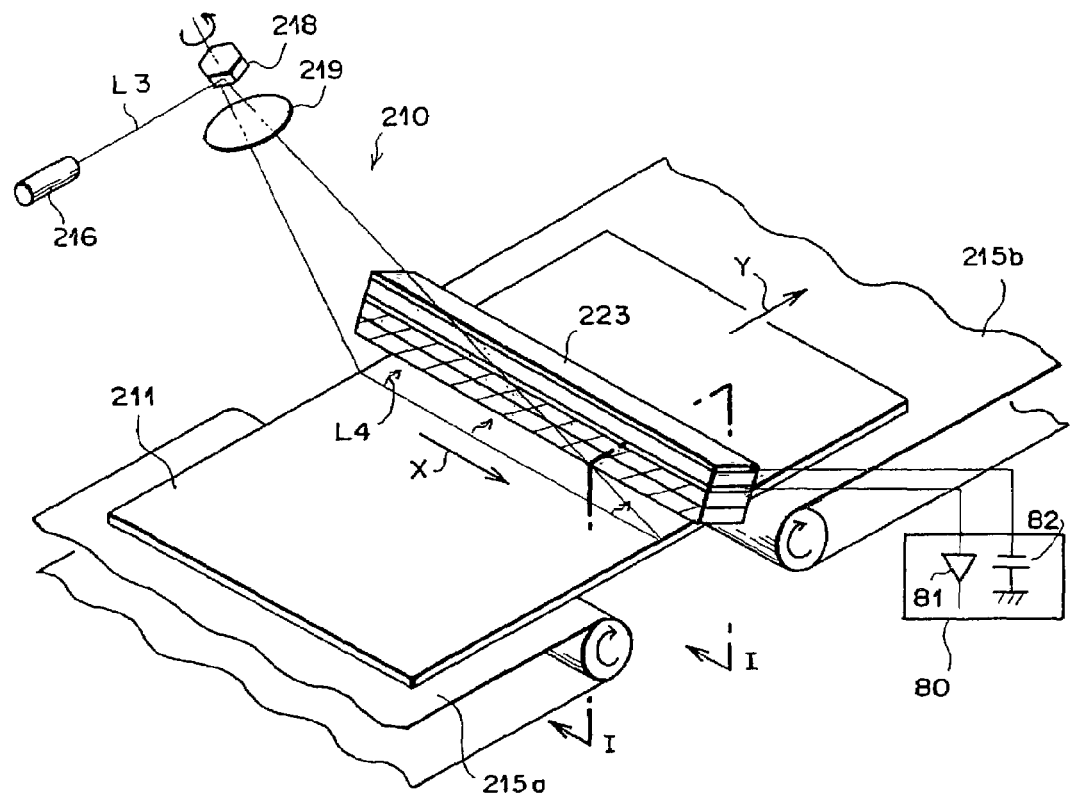
FIG. 20A is a schematic perspective view showing a radiation image read-out system in accordance with a tenth embodiment of the present invention.
Figure 20B:
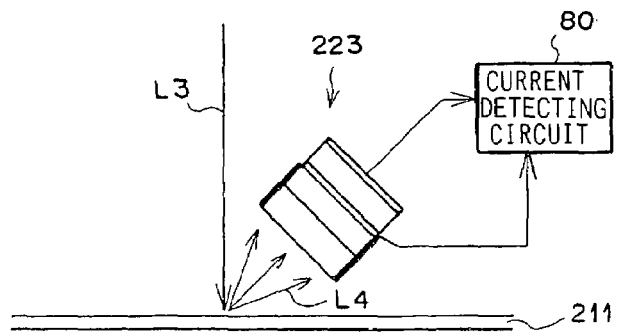
FIG. 20B is a fragmentary cross-sectional view taken along line I—I in FIG. 20A.

In FIGS. 20A and 20B, a stimulable phosphor sheet 211 is placed on a pair of endless belts 215a and 215b which are driven by an electric motor (not shown). A laser 216 which emits a laser beam L3 as the stimulating light, a rotary polygonal mirror 218 which is rotated by an electric motor (not shown) to deflect the laser beam L3 and a scanning lens (fθ lens) 219 which converges the laser beam L3 deflected by the polygonal mirror 218 onto the surface of the stimulable phosphor sheet 211 and causes the leaser beam L3 to scan the stimulable phosphor sheet 211 at a constant speed in the main scanning direction shown by arrow X are disposed above the stimulable phosphor sheet 211. The laser beam L3 scans the stimulable phosphor sheet 211 in the main scanning direction while the stimulable phosphor sheet 211 is conveyed in the sub-scanning direction shown by arrow Y by the endless belts 215a and 215b, thereby two-dimensionally scanning the entire surface of the stimulable phosphor sheet 211.

A long solid image sensor 223 is disposed above the stimulable phosphor sheet 211 along the portion scanned by the laser beam L3 and receives stimulated emission L4. Upon exposure to the stimulated emission L4, electric charges are generated in the photoconductive material layer 223c of the solid image sensor 223 in proportion to the amount of the stimulated emission L4. The electric charges are detected by a current detecting circuit 80.

A stimulating light scanning means is formed by the laser 216, the rotary polygonal mirror 218, the scanning lens 219, the drive means (not shown) and the like. As the stimulating light source, for instance, an LED array comprising a plurality of LEDs each stimulating a picture element on the stimulable phosphor sheet 211 may be used in place of the laser 216.

Figure 21A:
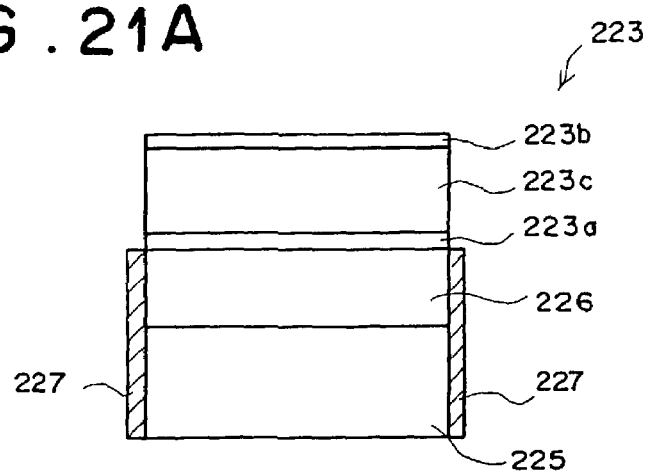
FIG. 21A is a cross-sectional view taken along the sub-scanning line of the solid image sensor employed in the radiation image read-out system of the tenth embodiment.
Figure 21B:
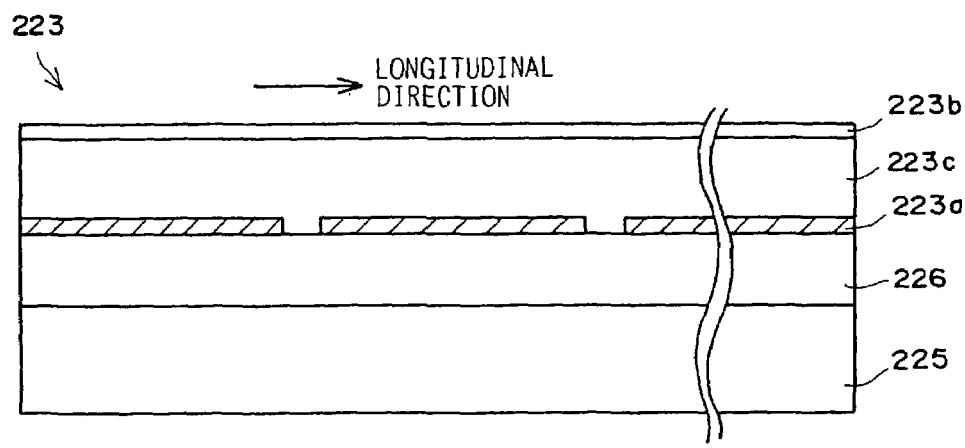
FIG. 21B is a cross-sectional view taken along the main-scanning line of the solid image sensor.
Figure 21C:
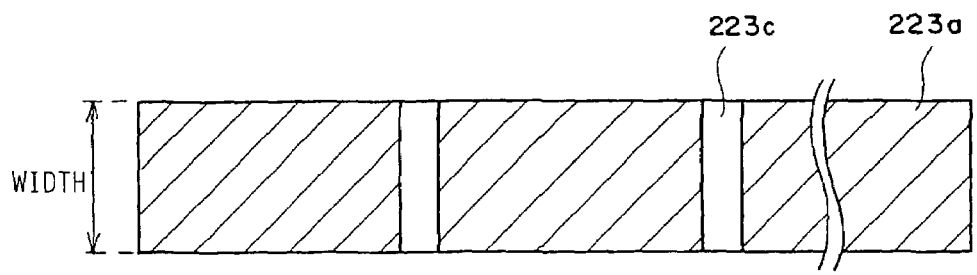
FIG. 21C is a horizontal cross-sectional view of the solid image sensor showing the divided electrode thereof.

As shown in FIGS. 21A to 21C, the solid image sensor 223 comprises a glass substrate 226, a pair of long flat electrodes 223a and 223b and a long photoconductive material layer 223c sandwiched between the flat electrodes 223a and 223b. The photoconductive material layer 223c exhibits conductivity upon exposure to the stimulated emission L4 which impinges upon the photoconductive material layer 223c through the glass substrate 226. The solid image sensor 223 functions as a zero-dimensional sensor though large in length. A stimulating light cut filter 225 is disposed on the light inlet side of the glass substrate 226 (the side of the glass substrate 226 remote from the flat electrode 223a) and the side surface of the glass substrate 226 and the stimulating light cut filter 225 is covered with a light-shielding member 227. When red stimulating light bearing thereon no image information impinges upon the photoconductive material layer 223c, since the photoconductive material layer 223c has slight sensitivity to the stimulating light L3, an offset current corresponding to weak charges generated by the stimulating light L3 is generated in the photoconductive material layer 223. When a stimulating light cut filter 225 is inserted as described above, only blue stimulated emission comes to impinge upon the photoconductive material layer 223c with red light (not shorter than 600 nm) absorbed by the stimulating light cut filter 225, and accordingly generation of such an offset current can be suppressed. Since the photoconductive material layer 223c is low in sensitivity to the red stimulating light not shorter than 600 nm as described above, the stimulating light cut filter 225 may be thinner as compared with when a photomultiplier is employed.

The flat electrode 223a through which the stimulated emission L4 enters the photoconductive material layer 223c is made of a transparent conductive film such as an ITO film so that the stimulated emission L4 can impinge upon the photoconductive material layer 223c. The other flat electrode 223b need not be transparent and may be formed of, for instance, aluminum.

Figure 22A:
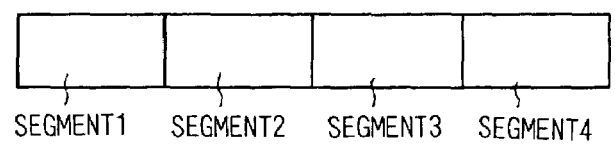
FIGS. 22A to 22C are views for illustrating various ways of dividing the electrode.
Figure 22B:
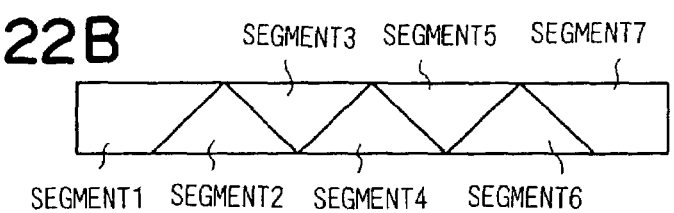
Figure 22C:
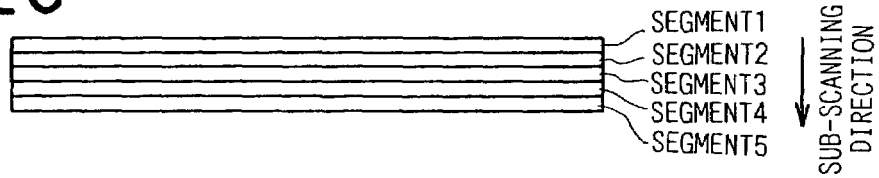

The flat electrode 223a which functions as a stimulated emission receiving face is divided into a plurality of electrode elements in the longitudinal direction thereof (the main scanning direction) as shown in FIGS. 21B and 21C. With this arrangement, a plurality of photoelectric conversion segments which can function independently of each other are formed by the portions of the photoconductive material layer 223c interposed between the respective electrode elements of the flat electrode 223a and the flat electrode 223b. The electrode 223a may be divided in various ways. For example, the electrode 223a may be divided zigzag as shown in FIG. 22B and may be divided in the sub-scanning direction as shown in FIG. 22C. FIG. 22A shows the same division of the electrode 223a as that shown in FIGS. 21B and 21C.

The reason why the solid image sensor 223 is divided into a plurality of photoelectric conversion segments is to distribute the output capacity of the overall solid image sensor 223 to the photoelectric conversion segments. By separately connecting current detecting amplifiers 81 to the photoelectric conversion segments, generation of the dark current is suppressed and the output capacity of each photoelectric conversion segment is reduced, whereby the S/N ratio is improved and an image of a higher quality can be obtained.

For example, when a sensor having a photoconductive material of a-Se is exposed to a radiation of 80 Kev, 0.01 mR, several thousands to ten thousands of electrons are generated in the photoconductive material layer per picture element of 100 μm×100 μm. When the detecting amplifier is of a charge amplifier system, generated noise is represented by a+b×c (unit: e$^-$, capacity noise is represented in terms of the number of electrons) wherein C (pF) represents the output capacity of the photoelectric conversion segment (segment, 1, 2, . . . ) and a and b are constants depending on the detecting amplifier. In a certain amplifier, a=550 and b=6.5, and the capacity noise was 550+6.5 C. In this case, when the output capacity of the photoelectric conversion segment is 100 pF, the capacity noise is 1200 (e$^-$). In accordance with our investigation, when the capacity noise is at such a level, quality of the image is acceptable. That is, from the viewpoint of S/N ratio, it is considered that the capacity noise should be not higher than 1200 (e$^-$), and accordingly, it is preferred that the output capacity of each photoelectric conversion segment be not larger than about 100 pF in the case of the charge amplifier system.

In the case where the detecting amplifier 81 is of a current-voltage conversion system, it has found that quality of the image becomes acceptable when the output capacity is not larger than about 100 pF. That is, also in the case of the current-voltage conversion system, it is preferred that the output capacity of each photoelectric conversion segment not larger than about 100 pF.

Accordingly, the electrode should be divided into a plurality of elements so that the output capacity becomes not larger than 100 pF irrespective of the system of the detecting amplifier 81.

The detecting amplifier of a charge amplifier system utilizes the charging voltage and the discharging voltage of a capacitor generated by charge transfer and should be included in the current-voltage conversion system in view of the fact that an electric current generated by charge transfer is converted to an electric voltage. However, in this specification, the current-voltage conversion system is to be interpreted not to include the charge amplifier system. The detecting amplifiers of the current-voltage conversion system include a logarithmic amplifier.

The material for forming the photoconductive material layer 223c should be a material which exhibits conductivity upon exposure not only to stimulated emission L4 but also to the recording light L2 or momentary light emitted from the stimulable phosphor layer 12 upon exposure to the recording light L2 when preliminary read-out is to be effected simultaneously with recording an image, though may be any material so long as it exhibits electric conductivity upon exposure to stimulated emission L4 emitted from the stimulable phosphor layer 12 when preliminary read-out need not be effected simultaneously with recording an image. In the case where the stimulable phosphor layer 212 emits blue stimulated emission in a wavelength range of not longer than 500 nm (e.g., near 400 nm), it is preferred that the material is a material whose major component is a-Se.

The thickness of the photoconductive material layer 223c is preferably not smaller than 1 μm so that the photoconductive material layer 223c absorbs a sufficient amount of stimulated emission L4, an avalanche amplification effect can be obtained and the level of signal to be taken out can be high enough. Further, it is preferred that the thickness of the photoconductive material layer 223c be as large as possible in order to reduce the distribution capacity and suppress fixed noise, but when the thickness is too large, the voltage of the power source for imparting the electric field becomes too high. Accordingly, in order to increase the ratio of the avalanche amplification effect to the fixed noise while taking into account the voltage of the power source, the thickness of the photoconductive material layer 223c is preferably not smaller than 1 μm and not larger than 100 μm, and more preferably not smaller than 10 m and not larger than 50 μm.

The length of the photoconductive material layer 223c is set substantially the same as the dimension of the stimulable phosphor sheet 211 in the main scanning direction. The width of the photoconductive material layer (a-Se photoconductive film) 223c should be sufficiently smaller than the size of the stimulable phosphor sheet 211. For example, when the size of the stimulable phosphor sheet 211 is 430 mm×430 mm, the width of the photoconductive material layer 223c should be not larger than 50 mm. When the area of the photoconductive material layer 223c is small, generation of an excessive dark current can be avoided and load capacity is reduced, whereby the S/N ratio can be improved as compared with when the stimulable phosphor layer 212 and the photoconductive material layer 223c are of substantially the same area.

The long solid image sensor 223 can be smaller both in weight and size as compared with a long photomultiplier which has been conventionally employed, and accordingly the overall radiation image read system can be smaller in weight and size when the long solid image sensor 223 is employed in place of the long photomultiplier. Further, the long solid image sensor 223 such as 17 inches long can be easily produced at a lower cost than a long photomultiplier or a long Si avalanche photodiode.

Figure 23:
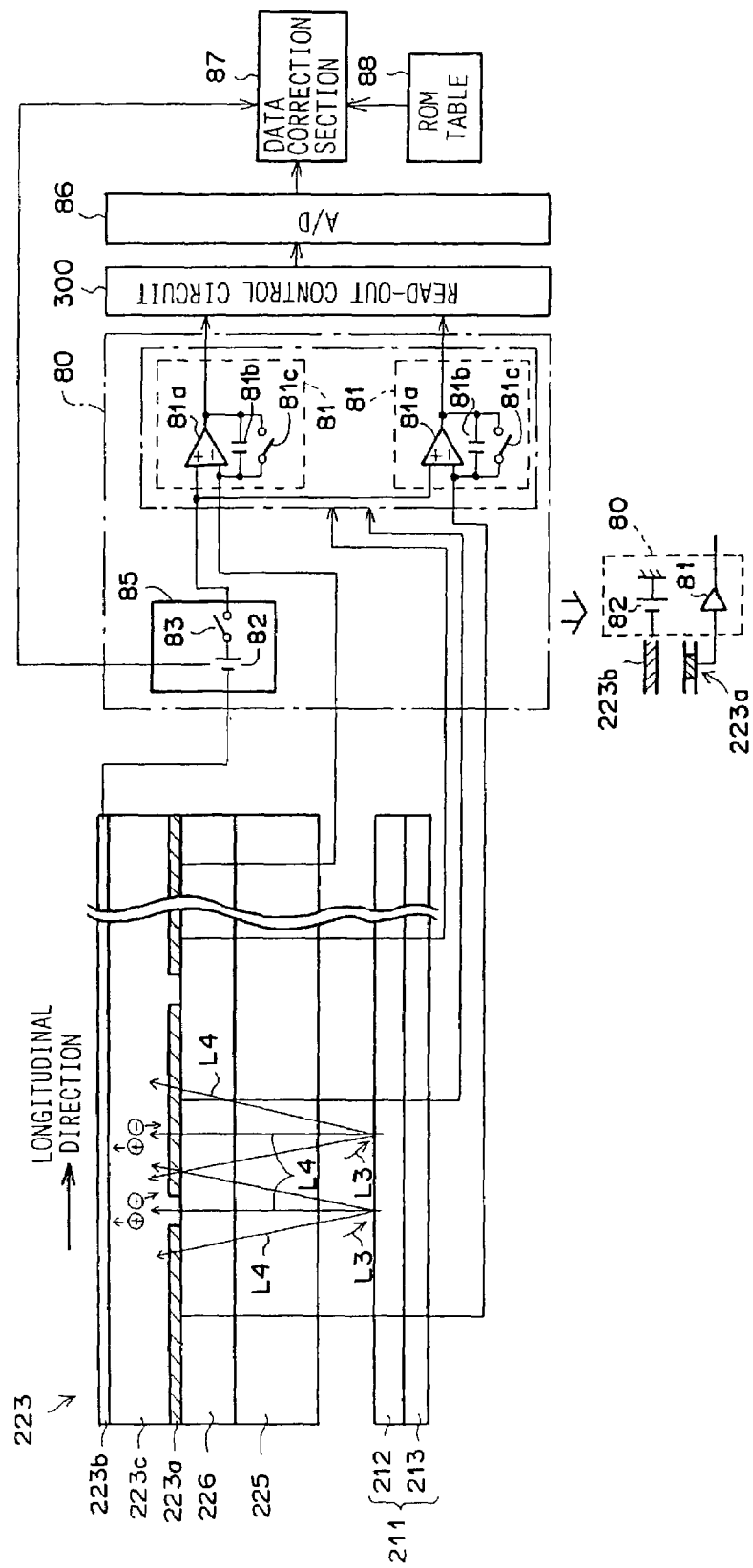
FIG. 23 is a block diagram showing a circuit for reading out an image signal from the solid image sensor when the electrode is divided in the manner shown in FIG. 22A.

FIG. 23 shows a circuit for reading out the electric charges from the solid image sensor 223 and obtaining an image signal. As shown in FIG. 23, the circuit comprises a current detecting circuit 80 connected to the solid image sensor 223, an A/D converter 86, a data correction section 87 and a ROM table 88. The circuit further comprises a read-out control circuit 300 connected between the current detecting circuit 80 and the A/D converter 86. The read-out control circuit 300 is for obtaining an image signal for one picture element by adding a plurality of output signals from the detecting amplifiers 81 which receive stimulated emission from the picture element while switching the output signals in response to scanning of the stimulating light L3.

The current detecting circuit 80 is provided with a detecting amplifier 81 of a charge amplifier system comprising an operational amplifier 81a, an integrating capacitor 81b and switch 81c. The current detecting amplifier 81 detects an electric current generated when electric charges generated upon exposure of the photoconductive material layer 223c to stimulated emission L4 emitted from the stimulable phosphor layer 212 are read out and reads out an image signal representing radiation energy stored on the stimulable phosphor layer 212 disposed on a substrate 213.

As shown in FIG. 23, the current detecting circuit 80 is provided with a plurality of current detecting amplifiers 81, and to the inversion input terminals (−) of the operational amplifiers 81a are discretely connected the electrode elements of the stripe electrode 223. That is, the flat electrode 223a which functions as a stimulated emission receiving face is divided in the longitudinal direction (the main scanning direction) into a plurality of electrode elements to form photoelectric conversion segments which function independently of each other. The photoelectric conversion segments are discretely connected to the detecting amplifiers 81. With this arrangement, input capacity of each detecting amplifier 81 is reduced and the stability of the circuit can be ensured.

Further, the current detecting circuit 80 is provided with an electric voltage imparting means 85 which comprises a power source 82 and a switch 83 and imparts a predetermined electric voltage between the electrodes 223a and 223b of the solid image sensor 223, thereby applying an electric field to the photoconductive material layer 223c. The positive pole of the power source 82 is connected to non-inversion input terminals (+) of the respective operational amplifiers 81a by way of the switch 83. The voltage of the power source 82 is set so that the potential gradient in the photoconductive material layer 223c becomes not lower than $10^6$V/cm and an avalanche amplification effect is generated in the photoconductive material layer 223c.

The A/D converter 86, the data correction section 87 and the ROM table 88 connected downstream of the current detecting circuit 80 are for correcting fluctuation in output data due to fluctuation in the voltage of the power source 82. When the photoconductive material layer 223c whose major component is a-Se is used under an electric field which generates an avalanche amplification effect in the photoconductive material layer 223c, the photoconductive material layer 223c becomes sensitive to fluctuation of the electric voltage. Accordingly, it is preferred that fluctuation of the voltage of the power source 82 be suppressed. It is further preferred that fluctuation in the output data with fluctuation in the voltage of the power source 82 be stored and the output data be corrected according to fluctuation of the voltage of the power source 82 during read-out of the image signal by, for instance, software processing. For this purpose, fluctuation in the output data with fluctuation in the voltage of the power source 82 is stored in the ROM table 88 and the data correction section 87 watches fluctuation in the voltage of the power source 82 (more strictly the voltage across the electrodes 223a and 223b) during image read-out and corrects the output data according to the fluctuation of the voltage of the power source.

When the image signal is to be read out from the stimulable phosphor sheet 211, the switch 83 is closed so that an electric voltage is imparted between the electrodes 223a and 223b by way of the switch 83 and an imaginary short circuit of the operational amplifier 81a, and an electric field is applied to the photoconductive material layer 223c.

Then the stimulating light L3 in the form of a line beam is caused to scan the entire area of the stimulable phosphor sheet 211 with the electric field kept applied to the photoconductive material layer 223c. That is, while the stimulable phosphor sheet 211 storing thereon a radiation image is conveyed in the direction of arrow Y (sub-scanning) by the endless belts 215a and 215b, the stimulating light L3 emitted from the laser 216 is deflected by the rotary polygonal mirror 218 to impinge upon the stimulable phosphor sheet 211 through the scanning lens 219 and scan the stimulable phosphor sheet 211 in the main scanning direction shown by the arrow X substantially perpendicular to the sub-scanning direction. The parts of the stimulable phosphor sheet 211 exposed to the stimulating light L3 emit stimulated emission L4, which is blue light near 400 nm, and the stimulated emission L4 impinges upon the solid image sensor 223.

In the photoconductive material layer 223c of the solid image sensor 223, positive and negative charges are generated upon exposure to the stimulated emission L4 in proportion to the amount of the stimulated emission L4. Since an electric field is applied to the photoconductive material layer 223c, the negative charges transfer toward the electrode 223a and the positive charges transfer toward the electrode 223b.

Further since a high electric field not lower than $10^6$V/cm has been applied between the electrode elements 223a and 223b corresponding to the read-out line and an avalanche amplification effect is generated, whereby generation of positive and negative charges in the photoconductive material layer 223c sharply increases. The quantum efficiency of the stimulable phosphor layer 212 is low and the stimulated emission L4 from the stimulable phosphor layer 212 is weak. Accordingly, the amount of charges (the number of signal photons) generated by exposure to the stimulated emission is small. However, by virtue of the avalanche amplification effect, generation of the charges is multiplied and a sufficiently strong signal can be obtained, whereby the S/N ratio can be increased.

The operation amplifiers 81a provided between the electrodes 223a and 223b detect currents generated by said transfer of the charges, whereby an image signal is obtained. That is, an image signal representing the radiation image is obtained. Since the thickness of the photoconductive material layer 223c the major component of which is a-Se is set not smaller than 1 μm and not larger than 100 μm, the quantum efficiency to the blue stimulated emission, e.g., at 400 nm, can be higher, e.g., 60 to 70%, than that in a photomultiplier or an avalanche photodiode using Si. Further since the read-out is effected with an electric field such as to generate an avalanche amplification effect applied to the photoconductive material layer 223c and correction for compensating for fluctuation of the voltage of the power source is effected, the S/N ratio of the image can be greatly improved.

Further since fluctuation of the output data due to fluctuation of the voltage of the power source 82 is corrected by the data correction section and the ROM table 88, the output data can be stably obtained without being affected by fluctuation of the power source voltage, whereby the S/N ratio of the image signal can be further improved.

Further since the major component of the photoconductive material layer 223c is a-Se, the ratio of the sensitivity to the stimulated emission (near 400 nm) to that to the stimulating light (600 to 700 nm) can be sufficiently large. For example, in a state where no avalanche amplification effect is obtained, the ratio of the sensitivity to blue light (470 nm) to that to red light (680 nm) is about 35 when the thickness of the a-Se layer is 10 μm. This value is very large as compared with that (ratio of 2 when a photomultiplier is employed as the photoelectric convertor means. As the thickness of the a-Se layer is smaller, the sensitivity to red light lowers and the blue/red sensitivity ratio increases and when an avalanche amplification effect is available, the blue/red sensitivity ratio further increases.

Figure 24A:
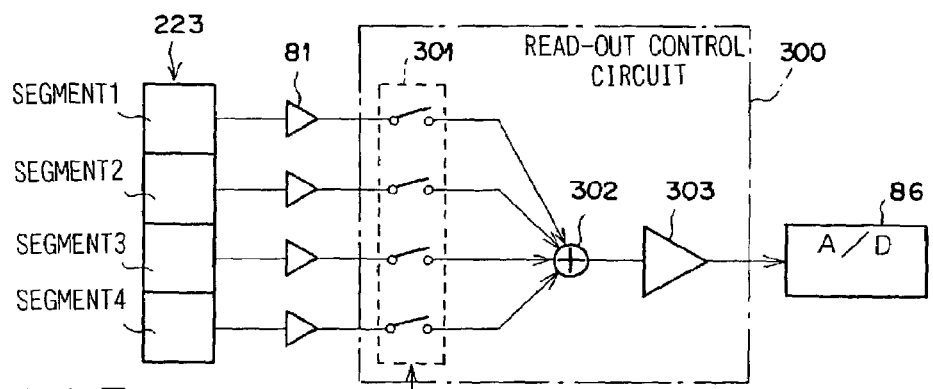
FIG. 24A is a block diagram showing in detail a part of the circuit shown in FIG. 23.
Figure 24B:
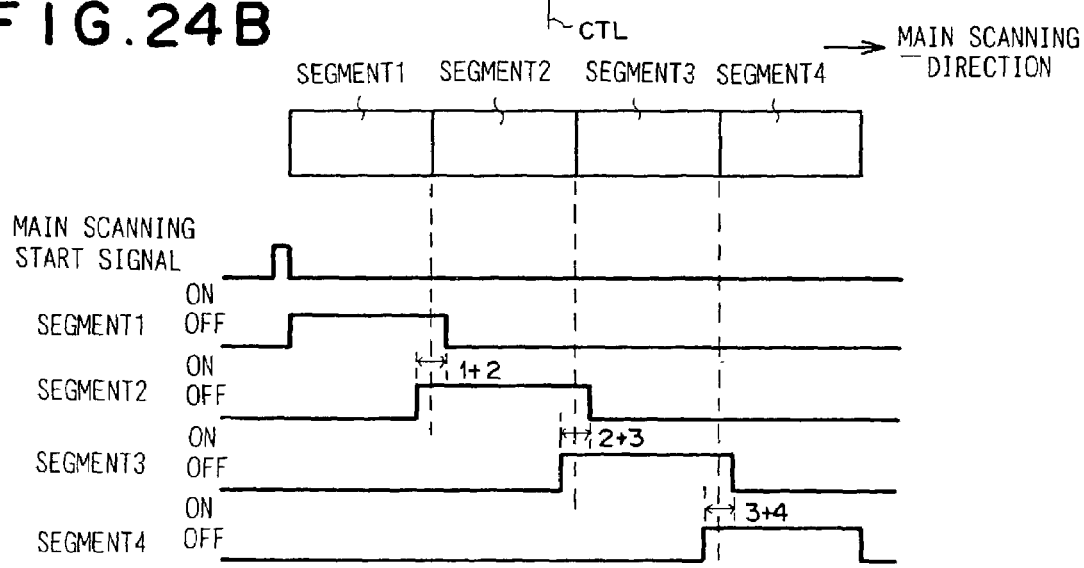
FIG. 24B is a view for illustrating the operation of the circuit shown in FIG. 24A when the electrode is divided in the manner shown in FIG. 22A.

The effect of dividing the flat electrode 223a which forms the stimulated emission receiving face will be described with reference to FIGS. 24A and 24B, hereinbelow.

The case where the electrode 223a is divided in the manner shown in FIG. 22A will be described first. As shown in FIG. 24A, the read-out control circuit 300 comprises a switching means 301 which switches in response to the main scanning position of the stimulating light L3 the signals from the detecting amplifiers 81 connected to the respective photoelectric conversion segments 1 to 4, an adder means 302 which adds the signals passing through the switching means 301, and a buffer amplifier 303. The output signal of the buffer amplifier 303 is input into the A/D converter 86. The switching means 301 comprises a plurality of movable switches connected between the respective detecting amplifiers 81 and the adder means 302.

A control signal CTL which is generated on the basis of a starting signal representing a start point of the main scanning is input into the switching means 301 from a circuit for controlling the scanning position of the stimulating light L3 (not shown). As shown in FIG. 24B, the switching means 301 switches the signals from the detecting amplifiers 81 in response to the main scanning position of the stimulating light L3. That is, as the stimulating light L3 scans the stimulable phosphor sheet 211 in the main scanning direction, the parts exposed to the stimulating light L3 (picture element positions) emit stimulated emission L4 in sequence. As shown in FIG. 23, the stimulated emission L4 travels obliquely upward as well as just upward. Accordingly, near the boundaries of the photoelectric conversion segments, the stimulated emission L4 from one picture element position impinges upon a plurality of photoelectric conversion segments, and accordingly, if the signals are switched so that an image signal is obtained on the basis of the output signal from only one photoelectric conversion segment, the obtained image signal cannot be constantly sufficient. Accordingly, an image signal for a picture element the stimulated emission from which is received by a plurality of photoelectric conversion segments is obtained by adding the output signals from the detecting amplifiers 81 connected to the photoelectric conversion segments which receive the stimulated emission from the picture element. For example, at the boundary between the segment 1 and the segment 2, the switching means 301 closes the switches connected to the segment 1 and the segment 2 so that the output signals from the corresponding detecting amplifiers 81 are added by the adder means 302. (1+2) At the boundary between the segment 2 and the segment 3, the switching means 301 closes the switches connected to the segment 2 and the segment 3 so that the output signals from the corresponding detecting amplifiers 81 are added by the adder means 302. (2+3) At the boundary between the segment 3 and the segment 4, the switching means 301 closes the switches connected to the segment 3 and the segment 4 so that the output signals from the corresponding detecting amplifiers 81 are added by the adder means 302. (3+4) At the parts other than the boundaries, the switching means 301 closes only one of the switches so that the output signal of only one of the amplifiers 81 is input into the adder means 302.

The case where the electrode 223a is divided in the manner shown in FIG. 22B will be described next. In this case, since the electrode 223a is divided zigzag at angles to the main scanning direction, the stimulated emission L4 impinges upon a plurality of segments at the boundaries therebetween even if the stimulated emission L4 travels only just upward. Accordingly, as in the case shown in FIG. 24B, an image signal for a picture element the stimulated emission from which is received by a plurality of photoelectric conversion segments is obtained by adding the output signals from the detecting amplifiers 81 connected to the photoelectric conversion segments which receive the stimulated emission from the picture element. For example, at the boundary between the segment 1 and the segment 2, the switching means 301 closes the switches connected to the segment 1 and the segment 2 so that the output signals from the corresponding detecting amplifiers 81 are added by the adder means 302. (1+2)

Though, in this case, the period for which the image signals are added becomes longer since the boundaries between the segments are zigzag, the joints of the image signals become more smooth and unevenness of an image can be avoided since the stimulated emission gradually shifts from one segment to another. Taking into account the part of the stimulated emission L4 which travels obliquely upward, the period for which the image signals are added may be further extended in the manner similar to that shown in FIG. 24B.

When the electrode 223a is divided in the sub-scanning direction as shown in FIG. 22C, the switching need not be effected.

A radiation image read-out system in accordance with an eleventh embodiment of the present invention will be described with reference to FIGS. 26A to 26C and 27, hereinbelow.

FIGS. 26A to 26C show the solid image sensor employed in this embodiment. As shown in FIGS. 26A to 26C, the electrodes 223a and 223b are divided in the main scanning direction in the same manner into a plurality of elements so that each element of one of the electrode is opposed to one of the elements of the other electrode with the photoconductive material layer 223c intervening therebetween. With this arrangement, a plurality of photoelectric conversion segments which function independently of each other are formed.

The purpose of dividing not only the electrode 223a but also the electrode 223b is for not only distributing the output capacity of the overall solid image sensor 223 to the segments in order to reduce the dark current and/or the output capacity but also facilitating controlling on and off (active and inactive) of the segments.

FIG. 27 shows a circuit for obtaining an image signal from the solid image sensor shown in FIGS. 26A to 26C with the electrodes 223a and 223b are divided in the manner shown in FIG. 22A.

In this embodiment, the read-out control means 300 comprises an adder means 302 which is connected to the elements of the electrode 223a of the segment 1 to segment 4 and adds the signals from the respective elements of the electrode 223a, a buffer amplifier 303, a switching means 304 which is connected to the elements of the electrode 223b of the segment 1 to segment 4 and switches on and off of the segments in response to the scanning position of the stimulating light L3, and a plurality of discrete power sources 382a which discretely supply a predetermined voltage to the elements of the electrode 223b through the switching means 304. The output signal of the buffer amplifier 303 is input into the A/D converter 86. The switching means 304 is provided with a plurality of switches connected between the elements of the electrode 223b and the discrete power sources 382a. A control signal CTL is input into the switching means 304 from a circuit for controlling the scanning position of the stimulating light L3 (not shown). The operation of the switching means 304 is substantially the same as that shown in FIG. 24B except that the segments are turned on and off independently of each other and the output signals of the segments are added. That is, in this embodiment, the switching means 304 controls on and off the segments by controlling on and off of the electric voltages applied to the respective segments from the discrete power sources 382a or on and off of the electric fields applied to the photoconductive material layer 223c between the elements of the electrodes 223a and 223b. With this arrangement, only photoelectric conversion segments which are effective in reading out the image signal, that is, only the segments which are actually exposed to the stimulated emission L4, can be made active while the other photoelectric conversion segments kept inactive. Accordingly influence of the dark current in the solid image sensor 223 and/or false signals due to residual charges can be suppressed, influence of flare can be avoided and the S/N ratio can be greatly improved. This effect cannot be obtained by simply dividing the photoelectric convertor means, for instance, in the tenth embodiment.

An image signal for a picture element the stimulated emission from which is received by a plurality of photoelectric conversion segments is obtained by adding the output signals from the segments which receive the stimulated emission from the picture element by the adder means 302 in the basically the same manner as described above in conjunction with FIG. 24B.

Further since the segments which simultaneously receive stimulated emission from one picture element shift with the scanning position of the stimulating light L3. Accordingly, the image signals from the segments to be added are switched in response to the scanning of the stimulating light L3. This switching is carried out by turning on and off the segments by the switching means 304. When the electrodes are divided in the manner shown in FIG. 22B, the switching is carried out in the same manner as that described above in conjunction with FIG. 25B.

Though, in the tenth and eleventh embodiments, the electrode of a long zero-dimensional solid image sensor is divided in the main scanning direction or in the sub-scanning direction, the electrode of a zero-dimensional solid image sensor which is square and is smaller than the stimulable phosphor sheet in area may be divided in the main scanning direction or in the sub-scanning direction. Also in this case, it is preferred that the outputs of actually effective photoelectric conversion segments be added and the actually effective photoelectric conversion segments be switched in response to the scanning position of the stimulating light.

What is claimed is:

1. An image read-out method of obtaining an image signal bearing thereon image information by use of a stimulable phosphor sheet having a layer of stimulable phosphor which emits stimulated emission in proportion to the stored energy of radiation upon exposure to stimulating light and a solid image sensor having a photoconductive material layer which exhibits electric conductivity upon exposure to the stimulated emission from the stimulable phosphor sheet, and by scanning with stimulating light a stimulable phosphor sheet which has been exposed to radiation and has stored thereon an image, causing the photoconductive material layer to be exposed to stimulated emission emitted from the stimulable phosphor sheet upon exposure to the stimulating light, and detecting electric charges generated in the photoconductive material layer upon exposure to the stimulated emission, comprising:

using the solid image sensor having a photoconductive material layer having an area smaller than the area of the stimulable phosphor sheet and the stimulated emission receiving face of the solid image sensor is divided into a plurality of photoelectric conversion segments, and discretely connecting a plurality of image signal obtaining means to the respective photoelectric conversion segments to detect electric charges generated in the photoelectric conversion segments, and obtaining an image signal for one picture element by adding a plurality of image signals obtained from a plurality of image signal obtaining means, said plurality of image signal obtaining means being respectively connected to a plurality of photoelectric conversion segments which receive stimulated emission from the picture element, and said plurality if image signal obtaining means being connected to an adder, wherein the plurality of image signals comprise signals obtained from adjacent photoelectric conversion elements having activation times that overlap for at least a period of time.

2. An image read-out method as defined in claim 1 in which the image signals from the image signal obtaining means which are to be added are switched in response to scanning of the stimulating light.

3. An image read-out method as defined in claim 1 in which the stimulable phosphor sheet having a layer of stimulable phosphor which is stimulated by stimulating light in a wavelength range of not shorter than 600 nm and emits stimulated emission in a wavelength range of not longer than 500 nm is used, and the solid image sensor having a photoconductive material layer whose major component is a-Se is used.

4. An image read-out method as defined in claim 1 wherein the output capacitance of each of said photoelectric conversion segments is not larger than 100 pF.

5. An image read-out method of obtaining an image signal bearing thereon image information by use of a stimulable phosphor sheet having a layer of stimulable phosphor which emits stimulated emission in proportion to the stored energy of radiation upon exposure to stimulating light and a solid image sensor having a photoconductive material layer which exhibits electric conductivity upon exposure to the stimulated emission from the stimulable phosphor sheet, and by scanning with stimulating light a stimulable phosphor sheet which has been exposed to radiation and has stored thereon an image, causing the photoconductive material layer to be exposed to stimulated emission emitted from the stimulable phosphor sheet upon exposure to the stimulating light, and detecting electric charges generated in the photoconductive material layer upon exposure to the stimulated emission by applying an electric field to the photoconductive material layer, comprising:
  using a solid image sensor whose photoconductive material layer has an area smaller than the area of the stimulable phosphor sheet and whose stimulated emission receiving face is divided into a plurality of photoelectric conversion segments, and
  activating the photoelectric conversion segments to be active or inactive independently of each other, such that a timing of activation of adjacent photoconversion elements overlaps for at least a period of time.

6. An image read-out method as defined in claim 5 in which the photoelectric conversion segments are made active or inactive by controlling application of the electric field to the photoconductive material layer.

7. An image read-out method as defined in claim 5 in which making active or inactive the photoelectric conversion segment is controlled in response to scanning of the stimulating light.

8. An image read-out method as defined in claim 5 in which an image signal for one picture element is obtained by adding a plurality of output signals from a plurality of photoelectric conversion segments which receive stimulated emission from the picture element.

9. An image read-out method as defined in claim 8 in which the output signals from the photoelectric conversion segments which are to be added are switched in response to scanning of the stimulating light.

10. The method of claim 8, wherein at least two of the plurality of photoelectric conversion segments are located adjacent to each other and provide image signals during activation times that overlap for at least a period of time.

11. An image read-out method as defined in claim 5 in which the stimulable phosphor sheet having a layer of stimulable phosphor which is stimulated by stimulating light in a wavelength range of not shorter than 600 nm and emits stimulated emission in a wavelength range of not longer than 500 nm is used, and the solid image sensor having a photoconductive material layer whose major component is a-Se is used.

12. An image read-out method as defined in claim 5 wherein the output capacitance of each of said photoelectric conversion segments is not larger than 100 pF.

13. An image read-out system comprising
  a stimulating light source which emits stimulating light,
  a stimulating light scanning means which causes the stimulating light emitted from the stimulating light source to scan a stimulable phosphor sheet having a layer of stimulable phosphor which emits stimulated emission in proportion to the stored energy of radiation upon exposure to the stimulating light,
  a solid image sensor having a photoconductive material layer which exhibits electric conductivity upon exposure to the stimulated emission from the stimulable phosphor sheet, and
  an image signal obtaining means which detects electric charges generated in the photoconductive material layer of the solid image sensor when the stimulable phosphor sheet is exposed to the stimulating light and stimulated emission emitted from the stimulable phosphor sheet impinges upon the photoconductive material, and obtains an image signal representing an image stored on the stimulable phosphor sheet, wherein
  the solid image sensor has a photoconductive material layer having an area smaller than the area of the stimulable phosphor sheet and the stimulated emission receiving face of the solid image sensor is divided into a plurality of photoelectric conversion segments, and
  a plurality of image signal obtaining means are discretely connected to the respective photoelectric conversion segments,
and further comprising an adder connected to said plurality of image signal obtaining means, said adder obtaining an image signal for one picture element by adding a plurality of image signals obtained from a plurality of image signal obtaining means, which are respectively connected to a plurality of photoelectric conversion segments which receive stimulated emission from the picture element,
  wherein the adder adds the plurality of image signals, said plurality of image signals comprise signals obtained from adjacent photoelectric conversion elements having activation times that overlap for at least a period of time.

14. An image read-out system as defined in claim 13 further comprising a switching means which switches the image signals from the image obtaining means which are to be added in response to scanning of the stimulated light.

15. An image read-out system as defined in claim 13 in which the stimulable phosphor sheet has a layer of stimulable phosphor which is stimulated by stimulating light in a wavelength range of not shorter than 600 nm and emits stimulated emission in a wavelength range of not longer than 500 nm, and the solid image sensor has a photoconductive material layer whose major component is a-Se.

16. An image read-out system comprising
  a stimulating light source which emits stimulating light,
  a stimulating light scanning means which causes the stimulating light emitted from the stimulating light source to scan a stimulable phosphor sheet having a layer of stimulable phosphor which emits stimulated emission in proportion to the stored energy of radiation upon exposure to the stimulating light,
  a solid image sensor having a photoconductive material layer which exhibits electric conductivity upon exposure to the stimulated emission from the stimulable phosphor sheet,
  an electric voltage imparting means which imparts an electric voltage to the photoconductive material layer of the solid image sensor to apply an electric field to the photoconductive material layer and
  an image signal obtaining means which detects electric charges generated in the photoconductive material layer of the solid image sensor when the stimulable phosphor sheet is exposed to the stimulating light and stimulated emission emitted from the stimulable phosphor sheet impinges upon the photoconductive material with the electric field applied to the photoconductive material layer, and obtains an image signal representing an image stored on the stimulable phosphor sheet wherein the solid image sensor has a photoconductive material layer having an area smaller than the area of the stimulable phosphor sheet and the stimulated emission receiving face of the solid image sensor is divided into a plurality of photoelectric conversion segments, and there is provided a control means which makes active or inactive the photoelectric conversion segments independently of each other, such that a timing of activation of adjacent photoconversion elements overlaps for at least a period of time.

17. An image read-out system as defined in claim 16 in which the control means makes active or inactive the photoelectric conversion segments by controlling application of the electric field to the photoconductive material layer.

18. An image read-out system as defined in claim 16 in which the control means makes active or inactive the photoelectric conversion segments in response to scanning of the stimulating light.

19. An image read-out system as defined in claim 16 further comprising an adder means which obtains an image signal for one picture element by adding a plurality of output signals from a plurality of photoelectric conversion segments which receive stimulated emission from the picture element.

20. An image read-out system as defined in claim 19 further comprising a switching means which switches the output signals from the photoelectric conversion segments which are to be added in response to scanning of the stimulating light.

21. The system of claim 19, wherein at least two of the plurality of photoelectric conversion segments are located adjacent to each other and provide image signals during activation times that overlap for at least a period of time.

22. An image read-out system as defined in claim 16 in which the stimulable phosphor sheet has a layer of stimulable phosphor which is stimulated by stimulating light in a wavelength range of not shorter than 600 nm and emits stimulated emission in a wavelength range of not longer than 500 nm, and the solid image sensor has a photoconductive material layer whose major component is a-Se.

* * * * *

UNITED STATES PATENT AND TRADEMARK OFFICE
CERTIFICATE OF CORRECTION

PATENT NO. : 7,211,818 B2 Page 1 of 1
APPLICATION NO. : 10/267674
DATED : May 1, 2007
INVENTOR(S) : Shinji Imai and Hiroaki Yasuda It is certified that error appears in the above-identified patent and that said Letters Patent is hereby corrected as shown below:

Column 52, line 50, please delete "if" and insert --of--.

Signed and Sealed this

Twenty-first Day of August, 2007

JON W. DUDAS
*Director of the United States Patent and Trademark Office*